(12) United States Patent
Lee et al.

(10) Patent No.: US 12,544,360 B2
(45) Date of Patent: Feb. 10, 2026

(54) PHARMACEUTICAL COMPOSITION FOR PREVENTING OR TREATING CORONAVIRUS DISEASE-19

(71) Applicants: KOREA ADVANCED INSTITUTE OF SCIENCE AND TECHNOLOGY, Daejeon (KR); INSTITUT PASTEUR KOREA, Gyeonggi-do (KR)

(72) Inventors: Sang Yup Lee, Daejeon (KR); Woo Dae Jang, Daejeon (KR); Seungtaek Kim, Gyeonggi-do (KR); Sangeun Jeon, Gyeonggi-do (KR)

(73) Assignees: KOREA ADVANCED INSTITUTE OF SCIENCE AND TECHNOLOGY, Daejeon (KR); INSTITUT PASTEUR KOREA, Gyeonggi-Do (KR)

( * ) Notice: Subject to any disclaimer, the term of this patent is extended or adjusted under 35 U.S.C. 154(b) by 1030 days.

(21) Appl. No.: 17/625,327

(22) PCT Filed: Apr. 27, 2021

(86) PCT No.: PCT/KR2021/005306
§ 371 (c)(1),
(2) Date: Jan. 6, 2022

(87) PCT Pub. No.: WO2021/221435
PCT Pub. Date: Nov. 4, 2021

(65) Prior Publication Data
US 2022/0257567 A1    Aug. 18, 2022

(30) Foreign Application Priority Data

Apr. 29, 2020  (KR) .................... 10-2020-0052509
Sep. 29, 2020  (KR) .................... 10-2020-0127319

(51) Int. Cl.
*A61K 31/4184*  (2006.01)
*A61K 31/122*  (2006.01)
(Continued)

(52) U.S. Cl.
CPC ........ *A61K 31/4184* (2013.01); *A61K 31/122* (2013.01); *A61K 31/444* (2013.01);
(Continued)

(58) Field of Classification Search
CPC .............. A61K 31/4184; A61K 31/444; A61K 31/519; A61K 31/496; A61K 31/501; Y02A 50/30
See application file for complete search history.

(56) References Cited

U.S. PATENT DOCUMENTS

2006/0142383 A1    6/2006   Shen et al.

FOREIGN PATENT DOCUMENTS

WO    WO-2021214296 A1 * 10/2021 ............. A61K 31/44

OTHER PUBLICATIONS

Agostini ML, Andres EL, Sims AC, et al. Coronavirus Susceptibility to the Antiviral Remdesivir (GS-5734) Is Mediated by the Viral Polymerase and the Proofreading Exoribonuclease. mBio. 2018;9(2):e00221-18. Published Mar. 6, 2018. doi: 10.1128/mBio.00221-18 (Year: 2018).*

(Continued)

*Primary Examiner* — Kortney L. Klinkel
(74) *Attorney, Agent, or Firm* — HULTQUIST, PLLC; Steven J. Hultquist

(57) ABSTRACT

The present invention relates to a pharmaceutical composition for preventing or treating coronavirus disease 2019, and more specifically to a pharmaceutical composition for preventing or treating coronavirus disease 2019 found by drug repositioning technology using drug virtual screening technology. The pharmaceutical composition for preventing or (Continued)

treating coronavirus disease 2019 according to the present invention is a composition obtained by finding new uses for drugs, which have already been proven effective, for preventing or treating coronavirus disease 2019 by drug repositioning technology. The pharmaceutical composition is useful because it has significantly lower side effects than new drugs and can be rapidly applied to clinical practice.

5 Claims, 28 Drawing Sheets

(51) Int. Cl.
    *A61K 31/444*     (2006.01)
    *A61K 31/4709*     (2006.01)
    *A61K 31/501*     (2006.01)
    *A61K 31/519*     (2006.01)
    *A61P 31/14*     (2006.01)

(52) U.S. Cl.
    CPC ........ *A61K 31/4709* (2013.01); *A61K 31/501* (2013.01); *A61K 31/519* (2013.01); *A61P 31/14* (2018.01)

(56) References Cited

OTHER PUBLICATIONS

Chandel, V., et al., "In silico identification of potent FDA approved drugs against Coronovirus COVID-19 main protease: A drug repurposing approach", Chemical Biology Letters, 2020, pp. 166-175, vol. 7, No. 3, Publisher: Scienceln Pubs.

Ghaffari, M.H., et al., "Anti-SARS-CoV and Anti-cancer Effects of Emodin", Advanced Herbal Medicine, 2019, pp. 42-53, vol. 5, No. 2, Publisher: herbmed.skums.ac.ir.

Smith, M., et al., "Repurposing Therapeutics for COVID-19: Supercomputer-Based Docking to the SARS-CoV-2 Viral Spike Protein and Viral Spike Protein-Human ACE2 Interface", Biological and Medicinal Chemistry, 2020, Page(s) doi:10.26434/chemrxiv.11871. v4, vol. 4.

Zhou, Y., et al., "Network-based drug repurposing for novel coronavirus 2019-nCoV/SARS-CoV-2", Cell Discovery, 2020, Page(s) https://doi.org/10.1038/s41421-020-0153-3, vol. 6, No. 14, Publisher: www.nature.com/celldisc.

Berrenbaum, M.C., "What is Synergy?", Pharmacological reviews, 1989, pp. 93-141, vol. 1989, No. 41, Publisher: The American Society for Pharmacology and Experimental Therapeutics.

Bliss, C.I., et al., "The Toxicity of Poisons Applied Jointly", Annals of applied biology, 1939, pp. 585-615, vol. 26, No. 3.

Chen, X., et al., "The Molecular Aspect of Antitumor Effects of Protease Inhibitor Nefamostat Mesylate and Its Role in Potential Clinical Applications", Frontiers in Oncology, 2019, Page(s) doi:10.3389/fonc.2019.00852, vol. 9, No. 852, Publisher: www.frontiersin.org.

Holshue M.L., et al., "First Case of 2019 Novel Coronavirus in the United States", The New England Jornal of Medicine, 2020, pp. 929-936, vol. 382, No. 10, Publisher: nejm.org.

Jin, Z., et al., "Structure of Mpro from SARS-CoV-2 and discovery of its inhibitors", Nature, 2020, pp. 1-5; https://doi.org/10.1038/s41586-020-2223-y, Publisher: www.nature.com.

Ianevski, A., et al., "SynergyFinder—a web application for analyzing drug combination dose-response matrix data", Bioinformatics, 2017, pp. 2413-2415; doi:10.1093/bioinformatics/btx162, vol. 33, No. 15, Publisher: Oxford.

Lo, M.K., et al., "GS-5734 and its parent uncleoside analog inhibit Filo-, Pneumo-, and Paramyxoviruses", Scientific Reports, 2017, p. 43395; doi:10.1038/srep43395, vol. 7, Publisher: www.nature.com/scientificreports.

Loewe, S., "The problem of synergism and antagonism of combined drugs", Arzneimittel-Forschung, 1953, pp. 285-290, vol. 3, No. 6, Publisher: subito Documents from libraries.

Mutch, E., et al., "The role of esterases in the metabolism of ciclesonide to desisobutyryl-ciclesonide in human tissue", Biochemical Pharmacology, 2007, pp. 1657-1664, vol. 73, Publisher: Elsevier.

Verdecchia, P., et al., "The pivotal link between ACE2 deficiency and SARS-CoV-2 infection", European Journal of Internal Medicine, 2020, Page(s) doi:https://doi.org/10.1016/j.ejim.2020.04.037.

Yadav, B., et al., "Corrigendum to Searching for drug synergy in complex dose-response landscapes using an interaction potency model", Computational and Structural Biotechnology Journal, 2015, Page(s) http://dx.doi.org/10.1016/j.csbj.2017.07.003, vol. 15, No. 387, Publisher: Elsevier.

Yin, W., et al., "Structural basis for inhibition of the RNA-development RNA polymerase from SARS-CoV-2 by remdesivir", Science, 2020, Pages(s) 10.1126/science.abc1560 (2020), Publisher: www.sciencemag.org.

Zhou, P., et al., "A pneumonia outbreak associated with a new coronovitus of probable bat origin", Nature, 2020, pp. 270-273, vol. 579, No. 7798.

Office Action Issued in Japanese Patent Application No. 2022-506385 on Mar. 16, 2023.

Ko, W-C, et al., "Arguments in favour of remdesivir for treating SARS-CoV-2 infections", International Journal of Antimicrobial Agents, 2020, 105933, vol. 55, Publisher: Elsevier.

Wang, M., et all., "Remdesivir and chloroquin effectively inhibit the recently emerged novel coronovirus (2019-nCOV) in vitro", Cell Research, 2020, pp. 269-271, vol. 30.

English Translation of Office Action Issued in Japanese Patent Application No. 2022-506385 on Mar. 16, 2023.

\* cited by examiner

| Chloroquine | | Lopinavir | | Remdesivir | |
|---|---|---|---|---|---|
| IC$_{50}$ (μM) | CC$_{50}$ (μM) | IC$_{50}$ (μM) | CC$_{50}$ (μM) | IC$_{50}$ (μM) | CC$_{50}$ (μM) |
| 7.95 | >150 | 11.41 | >50 | 9.49 | >50 |
| 8.52 | >150 | 10.57 | >50 | 10.22 | >50 |
| 10.19 | >150 | 11.02 | >50 | 10.55 | >50 |

PHARMACEUTICAL COMPOSITION FOR PREVENTING OR TREATING CORONAVIRUS DISEASE-19

CROSS-REFERENCE TO RELATED APPLICATIONS

This is a United States national phase under 35 USC § 371 of International Patent Application No. PCT/KR2021/005306 filed Apr. 27, 2021, which in turn claims priority under 35 USC § 119 of Korean Patent Application No. 10-2020-0052509 filed Apr. 29, 2020 and Korean Patent Application No. 10-2020-0127319 filed Sep. 29, 2020. The disclosures of all such applications are hereby incorporated herein by reference in their respective entireties, for all purposes.

BACKGROUND OF THE INVENTION

Field of the Invention

The present invention relates to a pharmaceutical composition for preventing or treating coronavirus disease 2019, and more specifically to a pharmaceutical composition for preventing or treating coronavirus disease 2019 found by drug repositioning technology using drug virtual screening technology.

Description of the Related Art

Coronaviruses are enveloped, single-stranded positive-sense RNA viruses with a genome size of 25 to 22 kb, and are relatively large viruses among RNA viruses known so far. Coronavirus has a specific structure having a halo- or crown-like appearance due to club-shaped protrusions that stick out of the viral envelopes, and took their name from "corona" which means crown in Latin. Coronaviruses that have been found in various birds and animals such as bats, birds, cats, dogs, cows, pigs and mice since first found in chickens in 1937 are divided into four groups (alpha-, beta-, gamma-, and delta-corona viruses). The alpha- and beta-coronavirus groups primarily infect mammals, and the gamma-and delta-coronavirus groups can be found in birds. Coronaviruses are known to cause various diseases such as gastrointestinal and respiratory diseases in animals. Human coronaviruses that infect humans comprise HCoV-229E and HCoV-OC43 discovered in the 1960s, and HCoV-NL63 (2004) and HCoV-HKU1 (2005) discovered after the SARS pandemic. Although these coronaviruses are generally known to be related to upper respiratory tract infections, they may also cause serious lung diseases in immunodeficient patients. It has been reported that the infection rate for coronavirus increases mainly in winter or early spring, and it is known that the proportion of adult cold patients caused by coronavirus as a pathogen is quite high.

Coronavirus disease 2019 is a viral respiratory disease that occurred in Wuhan, China in December 2019. It is also called 'Wuhan pneumonia', 'novel coronavirus infection', or 'COVID-19'. It is a pandemic disease caused by a novel coronavirus, which infects through the respiratory tract, and shows a highly contagious characteristic at the beginning of infection with few symptoms. After infection, coronavirus disease 2019 develops into pneumonia after symptoms such as sore throat, high fever, cough and difficulty breathing. As coronavirus disease 2019 began to spread worldwide, the World Health Organization declared a pandemic of this disease in March 2020.

Coronavirus disease 2019 (COVID-19) mainly attacks the respiratory tract. When infected, the virus invades the lungs, and symptoms such as high fever, cough and difficulty breathing occur, and symptoms similar to pneumonia appear, and in severe cases, the alveoli are damaged, leading to death due to respiratory failure. The incubation period of coronavirus disease 2019 is 3 to 7 days, but it can last up to 14 days. On Jan. 30, 2020, China announced that there were cases where the incubation period had increased to 23 days. It has been reported that coronavirus disease 2019 spreads even during the incubation period when symptoms do not appear.

Severe acute respiratory syndrome coronavirus 2 (SARS-COV-2) is a virus that causes coronavirus disease 2019. Human-to-human transmission of the virus has been confirmed in the academic world, and this coronavirus is spread mainly through close contact with respiratory droplets from cough or runny nose, especially within a 2 m radius (www.cdc.gov/coronavirus/2019-ncov/about/transmission-.html). Touching the eyes, nose or mouth after touching a surface or object contaminated with the virus is another cause of coronavirus disease 2019 infection. The RNA of the virus was also found in stool samples from infected patients (ML. Holshue et al., N Engl J Med. Vol. 382, pp. 929-936, 2020).

The entry of SARS-CoV-2 into the cell is mediated by the binding of the spike (S) viral protein, a 1273 amino acid long protein which belongs to the viral envelope and protrudes outwards with a 'corona' like appearance, to the angiotensin converting enzyme 2 (ACE2) receptors. ACE2 mediates cell entry of three coronavirus strains (SARS-CoV, NL63 and SARSCoV-2), and in particular, SARS-CoV and SARS-CoV2 share 76% identity in the amino acid sequence, thereby explaining the tendency of these viruses to bind to ACE2. The first step of the viral entry process is the binding of the N-terminal portion of the viral protein unit S1 to the pocket of the ACE2 receptor. The second step, which is believed to be of utmost importance for viral entry, is protein cleavage between the S1 and S2 units, which is mediated by the receptor transmembrane protease serine 2 (TMPRSS2), a member of the Hepsin/TMPRSS subfamily (Polo V. et al., European Journal of Internal Medicine, 2020).

Meanwhile, drug repositioning is one of new drug development strategies for identifying new indications for drugs that are already on the market or failed for reasons other than stability in the clinical stage. Drug repositioning is to identify the effect on a new indication through the same drug target, or to find a new drug target and prove that the drug target is effective in a new indication. Drug repositioning has advantages in that it can drastically reduce the cost and time required for discovery of drug candidates and targets candidates whose safety has already been clinically ensured, and thus it solves the problem of failure in the intermediate clinical stage due to drug safety issues.

Drug virtual screening technology aims to rapidly construct a compound library composed of active compounds, which are expected to be effective, through a computer prior to production of an actual compound library. Virtual drug screening is usually performed by sequentially applying various strategies such as ligand-based screening, pharmacophore-based screening, and protein structure-based screening. In ligand-based screening, compounds with high two-dimensional or three-dimensional structural similarity are searched for in a database using the structure of an active compound, which is already known to be active against a drug target, as a reference. Pharmacophore-based screening is a method of screening compounds having similar three-dimensional arrangement information about specific functional groups of molecules that exhibit pharmacological action. Protein structure-based screening is a method of evaluating candidates by calculating the affinity of a compound for a drug target through docking simulation. As an evaluation function for calculating energy in this process, a force-field based method, an empirical method, a knowledge-based method, a consensus scoring method, etc. may be used.

The drug repositioning method using drug virtual screening is one of the efficient new drug development methods that can produce maximum effect at low cost, and is evaluated as the best technology for quickly screening drug candidates in emergency situations such as a virus pandemic.

Coronavirus disease 2019 caused more than 140 million confirmed cases and more than 3 million deaths worldwide until April 2021, and is posing a fatal threat to human health. However, treatments and vaccines with clearly proven antiviral effects have not yet been developed. Currently, drugs such as Kaletra, chloroquine, Ciclesonide, Nafamostat, Levovir and Remdesivir are undergoing clinical trials for the treatment of coronavirus disease 2019 through drug repositioning technology.

Kaletra is sold under the brand name of Lopinavir/ritonavir (LPV/r), is used as an AIDS treatment, and is known as a protease inhibitor that blocks the replication of HIV (www.drugs.com/monograph/lopinavir-and-ritonavir.html).

Chloroquine is a drug used to prevent and treat malaria in areas affected by malaria. Certain types of malaria, resistant strains, and complicated cases typically require different or additional medication. It is known that chloroquine is also occasionally used for amebiasis that is occurring outside the intestines, rheumatoid arthritis, and lupus erythematosus (www.drugs.com/monograph/aralen-phosphate.html).

Ciclesonide is known as a glucocorticoid used to treat asthma and allergic rhinitis, and is known to have side effects such as headache, nasal bleeding and intranasal infection (Mutch E et al., Biochemical Pharmacology, Vo.73 (10), pp. 1657-64, 2007).

Nafamostat, a serine protease inhibitor, is known to function as a short-acting anticoagulant, an antiviral agent and an anticancer agent, and is used to inhibit breakdown of fibrinogen into fibrin, and is known to prevent the destruction of blood cells in dengue fever (Chen X et al., Front Oncol. Vol. 9, pp. 852, 2019).

Levovir is known to be an antiviral agent for inhibiting viral proliferation in chronic hepatitis B virus infection patients with confirmed replication of active virus and confirmed elevation of serum aminotransferase www.health.kr/searchDrug/result_drug.asp?drug_cd=A11AOOOOO9960).

Remdesivir is an antiviral agent composed of a specific nucleotide analog prodrug. Remdesivir was originally developed by Gilead Sciences for use as a drug for the treatment of Ebola hemorrhagic fever and Marburg virus, but in several subsequent experiments, it was found that Remdesivir exerts antiviral effects against single-stranded RNA viruses such as respiratory syncytial virus, Junin virus, Lassa fever virus, Henipavirus, and coronaviruses (comprising MERS and SARS viruses) (Michael K. Lo et al., Scientific reports, Vol. 7, pp. 43395, 2017).

Accordingly, the present inventors have made extensive efforts to solve the above-described problems and develop a drug for treating coronavirus disease 2019, and as a result, have found therapeutic agent candidates, which bind to the Mpro or RdRP of SARS-Coronavirus-2 (SARS-CoV-2) and inhibit the function of the Mpro or RdRP, through drug repositioning using drug virtual screening. In addition, the present inventors have treated primate cells (Vero) and human lung cells (Calu-3) with the found therapeutic agent candidates together with SARS-CoV-2 virus, thereby finding therapeutic agents that exhibit an excellent anti-SARS-CoV-2 effect at a low $IC_{50}$ value. Furthermore, the present inventors have verified the synergistic effect of the found drugs, confirmed a drug combination and concentration showing an excellent synergistic effect, thereby completing the present invention.

The above information disclosed in this Background section is only for enhancement of understanding of the background of the present invention. Therefore, it may not contain information that forms the conventional art that is already known in the art to which the present invention pertains.

SUMMARY OF THE INVENTION

Therefore, it is one object of the present invention to provide a pharmaceutical composition for preventing or treating coronavirus disease 2019.

Another object of the present invention is to provide a method of treating coronavirus disease 2019 using the composition.

Still another object of the present invention is to provide the use of the composition for preventing or treating coronavirus disease 2019.

To achieve the above objects, the present invention provides a pharmaceutical composition for preventing or treating coronavirus disease 2019 (COVID-19), the pharmaceutical composition comprising a compound that binds specifically to the Mpro of SARS-CoV-2 or a compound that binds specifically to the RdRP of SARS-CoV-2.

The present invention also provides a pharmaceutical composition for preventing or treating coronavirus disease 2019 (COVID-19), the pharmaceutical composition comprising two or more compounds selected from the group consisting of blonanserin, emodin, omipalisib, tipifarnib and remdesivir.

The present invention also provides a method for preventing or treating coronavirus disease 2019 (COVID-19), the method comprising a step of administering the composition.

The present invention also provides a method for treating coronavirus disease 2019 (COVID-19), the method comprising a step of administering, to a patient, a compound that binds specifically to the Mpro of SARS-CoV-2 or a compound that binds specifically to the RdRP of SARS-CoV-2.

The present invention also provides a method for preventing or treating coronavirus disease 2019 (COVID-19), the method comprising a step of co-administering two or more compounds selected from the group consisting of blonanserin, emodin, omipalisib, tipifarnib and remdesivir.

The present invention also provides the use of the composition for preventing or treating coronavirus disease 2019 (COVID-19)

The present invention also provides the use of the composition for the manufacture of a medicament for preventing or treating coronavirus disease 2019 (COVID-19).

DETAILED DESCRIPTION OF THE INVENTION

Unless otherwise defined, all technical and scientific terms used in the present specification have the same meanings as commonly understood by those skilled in the art to which the present disclosure pertains. In general, the nomenclature used in the present specification is well known and commonly used in the art.

In the present invention, a database of the structures of drugs, which were previously approved or are now in clinical trials, was constructed, and whether or not the drugs would bind to a specific target protein of SARS-CoV-2 was analyzed based on various criteria, thereby finding high antiviral effects against anti-SARS-CoV-2, thereby confirming drugs for preventing or treating coronavirus disease 2019.

Coronavirus variants have been continuously found, and there is a concern that drug resistance problems due to the variants may occur. Thus, the present inventors have determined two enzymes (Mpro and RdRp), which have highly conserved sequences compared to those of other coronaviruses (SARS-CoV and MERS-CoV) while playing a key role in viral replication, as drug targets suitable for treatment (Zhou, P. et al. Nature, (2020) 579(7798), 270-273).

That is, in one example of the present invention, compounds having a certain degree of similarity or more were selected by comparing the ligand shapes of three-dimensional structures (1,865,400) in which 6,218 compounds collected from various databases bind to Mpro and RdRp, which are proteins of SARS-CoV-2, and drug candidates were screened based on docking energy, similarity of interaction patterns, etc.

Figure 1:
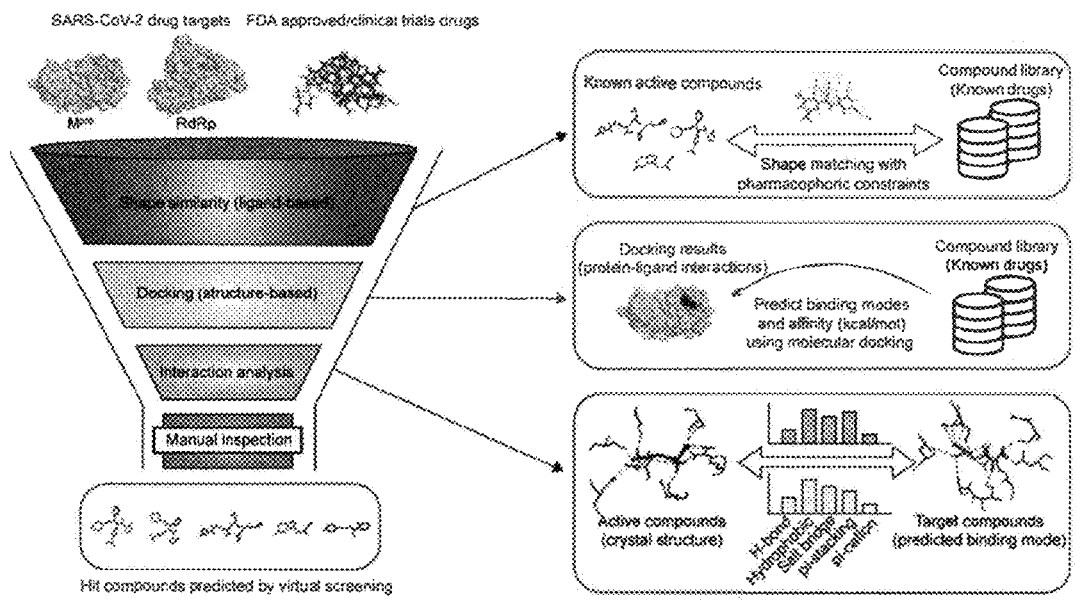
FIG. 1 shows a drug virtual screening procedure used in the present invention.

Thereafter, cells infected with SARS-CoV-2 were treated with each of the screened candidates, and compounds exhibiting antiviral effects were finally selected as drugs for treating coronavirus disease 2019 (FIG. 1). In addition, the finally selected drugs for treating coronavirus disease 2019 were co-administered, and the dose-dependent antiviral effect of each drug or the antiviral effect of a combination of the drugs was evaluated.

Therefore, in one aspect, the present invention is directed to a pharmaceutical composition for preventing or treating coronavirus disease 2019 (COVID-19), the pharmaceutical composition comprising either a compound that binds specifically to the Mpro of SARS-CoV-2 or a compound that binds specifically to the RdRP of SARS-CoV-2, wherein the compound that binds specifically to the Mpro is selected from the group consisting of Alobresib, CE-326597, blonanserin and emodin, and the compound that binds specifically to the RdRP is selected from the group consisting of hypericin, omipalisib, LGH-447, NS-3728, tipifarnib, valopicitabine, Elsamitrucin, NRC-AN-019, denufosol and isatoribine.

As used herein, the term "Mpro" refers to a protease which degrades the polypeptide of a virus to produce proteins that make up the virus and proteins essential for replication (Jin, Z. et al. Nature, (2020) 1-5). In the present invention, an inhibitor of the active site of Mpro may inhibit the synthesis of proteins essential to viral proliferation, and thus may exhibit an antiviral effect. As used herein, the term "RdRp" refers to an RNA replicase, an enzyme that plays a direct role in RNA replication of the virus. A representative drug that inhibits RdRp is remdesivir, and the mechanism of action thereof has been identified by the three-dimensional protein structure (Yin, W. et al. Science (2020)). In the present invention, the inhibitor of the active site of Mpro may exhibit an antiviral effect by inhibiting the viral replication process.

In the present invention, examples of compounds that bind to the Mpro or RdRP of SARS-CoV-2 comprise, but art not limited to, those shown in Table 7 in the Examples. In the present invention, the compound that binds specifically to the Mpro may have a docking energy of −7.0 kcal/mol or less, more preferably −7.5 kcal/mol or less, for the Mpro.

In the present invention, the compound that binds specifically to the Mpro may inhibit protein synthesis by specifically binding to the Mpro protein of SARS-CoV-2.

In the present invention, the compound that binds specifically to the RdRP may have a docking energy of −6.4 kcal/mol or less, more preferably −6.7 kcal/mol or less, for the RdRP.

In the present invention, the compound that binds specifically to the RdRP may inhibit viral replication by specifically binding to the RdRP protein of SARS-CoV-2.

In the present invention, the compound that binds specifically to the Mpro is preferably blonanserin or emodin, more preferably emodin.

In the present invention, the compound that binds specifically to the RdRP is preferably selected from the group consisting of hypericin, omipalisib, LGH-447, NS-3728, and tipifarnib, and is more preferably omipalisib or tipifarnib.

Meanwhile, in another example of the present invention, the finally selected single candidate drugs (blonanserin, emodin, omipalisib and tipifarnib) and the clinically approved COVID-19 treatment remdesivir were combined randomly and injected into a cell line, and then the dose-dependent antiviral effect of each drug or the antiviral effect of each combination of the drugs was evaluated. The synergistic effect of each combination of the confirmed candidate drugs was evaluated based on a concentration-response matrix and four synergy evaluation models (1. Loewe additivity model; 2. Bliss independence model, 3) Zero Interaction Potency (ZIP) model, and 4) Highest Single Agent (HSA) model), and the combination and optimal combinations and concentrations of compounds showing high synergistic effects were determined. In particular, 10 combinations of any two compounds selected from among blonanserin, emodin, omipalisib, tipifarnib and remdesivir exhibited an excellent synergistic effect improved by 10% to 80% compared to the effect expected when using the compounds alone for the prevention or treatment of COVID-19 (FIGS. 7 to 54).

Therefore, in another aspect, the present invention is directed to a pharmaceutical composition for preventing or treating coronavirus disease 2019 (COVID-19), the pharmaceutical composition comprising two or more compounds selected from the group consisting of blonanserin, emodin, omipalisib, tipifarnib and remdesivir.

In the present invention, the pharmaceutical composition preferably comprises two or more compounds selected from the group consisting of blonanserin, emodin, omipalisib, tipifarnib and remdesivir.

In the present invention, (1) when the composition comprises a combination of tipifarnib and blonanserin, the tipifarnib may be comprised at a concentration of 2.75 to 11 µM, and the blonanserin may be comprised at a concentration of 1.50 to 47.87 µM.

In the present invention, (2) when the composition comprises a combination of tipifarnib and emodin, the tipifarnib may be comprised at a concentration of more than 0 and not more than 11 µM, and the emodin may be comprised at a concentration of 1.97 to 31.45 µM.

In the present invention, (3) when the composition comprises a combination of tipifarnib and omipalisib, the tipifarnib may be comprised at a concentration of more than 0 and not more than 11 µM, and the omipalisib may be comprised at a concentration of more than 0 and not more than 0.25 µM, or the tipifarnib may be comprised at a concentration of 1.38 to 11 µM, and the omipalisib may be comprised at a concentration of more than 0 and not more than 0.25 µM.

In the present invention, (4) when the composition comprises a combination of tipifarnib and remdesivir, the tipifarnib may be comprised at a concentration of more than 0 and not more than 11 µM, and the remdesivir may be comprised at a concentration of more than 0 and not more than 20.18 µM.

In the present invention, (5) when the composition comprises a combination of blonanserin and emodin, the blonanserin may be comprised at a concentration of more than 0 and not more than 5.98 µM, and the emodin may be comprised at a concentration of 7.86 to 62.9 µM, or the blonanserin may be comprised at a concentration of 5.98 to 47.87 µM, and the emodin may be comprised at a concentration of more than 0 and not more than 62.9 µM.

In the present invention, (6) when the composition comprises a combination of blonanserin and omipalisib, the blonanserin may be comprised at a concentration of more than 0 and not more than 47.87 µM, and the omipalisib may be comprised at a concentration of 0.49 to 1.97 µM, or the blonanserin may be comprised at a concentration of 1.5 to 47.87 µM, and the omipalisib may be comprised at a concentration of more than 0 and not more than 0.49 µM.

In the present invention, (7) when the composition comprises a combination of blonanserin and remdesivir, the blonanserin may be comprised at a concentration of more than 0 and not more than 1.5 µM, and the remdesivir may be comprised at a concentration of more than 0 and not more than 40.36 µM, or the blonanserin may be comprised at a concentration of 5.0 to 40 µM, and the remdesivir may be comprised at a concentration of more than 0 and not more than 40.36.

In the present invention, (8) when the composition s a combination of emodin and omipalisib, the emodin may be contained at a concentration of more than 0 and not more than 125.81 µM, and the omipalisib may be comprised at a concentration of more than 0 and not more than 1.97 µM.

In the present invention, (9) when the composition comprises a combination of emodin and remdesivir, the emodin may be comprised at a concentration of more than 0 and not more than 125.81 µM, and the remdesivir may be comprised at a concentration of more than 0 and not more than 40.36 µM.

In the present invention, (10) when the composition comprises a combination of omipalisib and remdesivir, the omipalisib may be comprised at a concentration of more than and not more than 1.97 µM, and the remdesivir may be comprised at a concentration of more than 0 and not more than 40.36 µM.

In the present invention, the pharmaceutical composition is preferably used for the treatment of primates, and in this case, it may comprise any one of the above-described 10 combinations. More preferably, the pharmaceutical composition comprise a combination of i) remdesivir and tipifarnib, ii) omipalisib and emodin, iii) remdesivir and emodin, iv) remdesivir and omipalisib, v) omipalisib and tipifarnib, or vi) omipalisib and blonanserin.

In the present invention, when the pharmaceutical composition is more preferably used for human treatment, and in this case, it may comprise two or more compounds, preferably two compounds, selected from the group consisting of remdesivir, tipifarnib, omipalisib and emodin.

The composition according to the invention is particularly intended to be used for the treatment of coronavirus disease 2019 (COVID-19).

As used herein, the term "coronavirus disease 2019" means that a human or animal organism has cells infected with SARS-CoV-2. Infection can be established, particularly by performing detection and/or viral titration from a respiratory sample, or by assaying blood-circulating SARS-CoV-2 specific antibodies. Detection in individuals infected with this particular virus is made, particularly by a conventional diagnostic method (PCR) of molecular biology, well known to those of skill in the art.

As used herein, the terms "prevention" and "treatment" should be interpreted in the broadest sense. The term "prevention" means preventing the progression of one or more of clinical symptoms of the disease in a patient who is likely to be exposed to the disease or susceptible to the disease, but has not yet experienced or revealed symptoms of the disease. The "treatment" refers to any action of preventing or reducing the development of the disease or one or more clinical symptoms thereof.

As used herein, the term "treatment" means fighting SARS-CoV-2 infection in a human or animal organism. When at least one composition according to the invention is administered, the rate of viral infection (infection titer) in the organism will be reduced, and preferably the virus can disappear completely from the organism. As used herein, the term "treatment" also means attenuating the symptoms (respiratory syndrome, renal failure, and fever) associated with viral infection.

The composition for preventing or treating coronavirus disease 2019 according to the present invention may further comprise a pharmaceutically acceptable carrier, and may be formulated with the carrier.

As used herein, the term "pharmaceutically acceptable carrier" refers to a carrier or diluent that does not irritate an organism and does not impair the biological activity and characteristics of the compound to be administered. Acceptable pharmaceutical carriers for compositions, which are formulated into liquid solutions, are sterilized and biocompatible, and examples thereof comprise saline, sterile water, Ringer's solution, buffered saline, albumin injection solutions, dextrose solutions, maltodextrin solutions, glycerol, ethanol, and mixtures of one or more thereof. If necessary, other conventional additives such as antioxidants, buffers and bacteriostatic agents may be added. In addition, diluents, dispersants, surfactants, binders and lubricants may be additionally added to prepare injectable formulations such as aqueous solutions, suspensions or emulsions, pills, capsules, granules or tablets.

The composition for preventing or treating coronavirus disease 2019 comprising the compound and the pharmaceutically acceptable carrier according to the present invention may be applied in any dosage form comprising the same as an active ingredient and may be prepared in an oral or parenteral dosage form. Dosage forms of the pharmaceutical composition according to the present invention comprise forms suitable for oral, rectal, nasal, topical (comprising buccal and sublingual), subcutaneous, vaginal or parenteral (comprising intramuscular, subcutaneous and intravenous) administration, or forms suitable for administration by inhalation or insufflation.

Examples of oral dosage forms comprising the composition of the present invention as an active ingredient comprise tablets, troches, lozenges, aqueous or oily suspensions, prepared powders or granules, emulsions, hard or soft capsules, syrups or elixirs. In order to prepare dosage forms such as tablets and capsules, the composition may comprise a binder such as lactose, saccharose, sorbitol, mannitol, starch, amylopectin, cellulose or gelatin, an excipient such as dicalcium phosphate, a disintegrating agent such as corn starch or sweet potato starch, and a lubricant such as calcium stearate, sodium stearyl fumarate or polyethyleneglycol wax, and a capsule formulation may further comprise a liquid carrier such as a fatty oil, in addition to the above-mentioned ingredients.

Examples of parenteral dosage forms comprising the composition of the present invention as an active ingredient comprise forms for injection such as subcutaneous injection, intravenous injection or intramuscular injection, suppository forms, or spray forms such as aerosols inhalable through a breathing apparatus. For preparation of injectable dosage forms, the compositions of the present invention may be mixed with stabilizers or buffers in water to prepare solutions or suspensions which may then be formulated in unit dosage forms of ampules or vials. For suppository administration, compositions for rectal administration such as suppositories or enema preparations comprising a conventional suppository base such as cocoa butter or other glycerides may be formulated. For preparation of a spray formulation such as an aerosol, a propellant may be combined with additives such that a water-dispersed concentrate or wet powder is dispersed.

In another aspect, the present invention is directed to a method for preventing or treating coronavirus disease 2019 (COVID-19), the method comprising a step of administering the composition for preventing or treating coronavirus disease 2019 (COVID-19).

As used herein, the term "administering" means introducing the pharmaceutical composition of the present invention into a patient by any suitable method. The composition of the present invention may be administered through various oral or parenteral routes, as long as it may reach the target tissue. Specifically, the pharmaceutical composition may be administered in a conventional manner via an inhalation, oral, rectal, topical, intravenous, intraperitoneal, intramuscular, intraarterial, transdermal, intranasal, ocular or intradermal route.

The treatment method of the present invention comprises administering a pharmaceutically effective amount of the composition for preventing or treating coronavirus disease 2019 according to the present invention. It will be obvious to those skilled in the art that an appropriate total daily dose can be determined by a physician within the scope of correct medical judgment. The specific therapeutically effective amount for a certain patient preferably depends upon a variety of factors comprising the type and extent of the response to be achieved, as well as the presence of other agents used, the specific composition, and age, body weight, general health conditions, gender and diet of the patient, administration time, administration route and the secretion rate of the composition, treatment period, and drugs used in conjunction with or concurrently with the specific composition, and upon similar factors well-known in the field of medicine. Therefore, the effective amount of the composition for preventing or treating coronavirus disease 2019, which is suitable for the purpose of the present invention, is preferably determined in consideration of the aforementioned factors.

In addition, the treatment method of the present invention may be applied to any animals that may develop coronavirus disease 2019, and the animals comprise humans and primates as well as livestock such as cows, pigs, sheep, horses, dogs and cats.

It is obvious that the composition for use according to the invention comprises the above-described compound, and may also comprise another active compound in addition to suitable pharmaceutically acceptable carriers. The active compound may be compounds enabling the activity of these compounds to be improved, or even other active agents known for a particular activity. These further active compounds may be selected from the pharmaceutical classes of agents mentioned in application WO 2015/157223, namely from the antibacterial agents, antiparasitic agents, neurotransmission inhibitors, estrogen receptor inhibitors, DNA synthesis and replication inhibitors, protein maturation inhibitors, kinase pathway inhibitors, cytoskeleton inhibitors, lipid metabolism inhibitors, anti-inflammatory agents, ion channel inhibitors, apoptosis inhibitors and cathepsin inhibitors. These active compounds may be selected in particular from antibacterial agents, ion channel inhibitors, immunosuppressive agents and antiviral agents. As an antiviral agent, acyclovir can in particular be mentioned.

The pharmaceutical composition of the present invention may comprise at least another antiviral agent in addition to the above compound. It is understood that this antiviral agent will be used at doses necessary to have antiviral action, this dose being designated as being "efficient", this dosage being possibly readily determined by those skilled in the art. For the purposes of the present invention, an antiviral agent designates a compound acting on a virus, by inhibiting and/or slowing and/or preventing the associated viral infection.

Antiviral agents are classified in different categories depending on their mode of action. These comprise, in particular:

nucleotide analogues, which interfere with or stop DNA or RNA synthesis; as well as inhibitors of the enzymes involved in DNA or RNA synthesis (helicase, replicase);

compounds which inhibit the virus maturation steps during its replication cycle;

compounds which interfere with cell membrane binding, or virus entry in host cells (fusion or entry inhibitors);

agents which prevent the virus from being expressed within the host cell after entry, by blocking its disassembly within the cell;

agents which restrict virus propagation to other cells.

One can mention in particular antiviral agents well known to those skilled in the art, intended to fight RNA viruses, such as protease inhibitors, helicase inhibitors, and SARS-CoV-2 virus cell entry inhibitors in target cells.

Among the antiviral agents well known to those skilled in the art, one can mention more precisely ribavirin, a guanosine nucleoside analogue with a wide antiviral spectrum; as well as the interferon which acts by inhibiting viral replication in the host cells.

When the pharmaceutical composition of the present invention comprises another antiviral agent, the other antiviral agent may be selected from the following compounds: ribavirin, an interferon, or a combination thereof.

For the purposes of the invention, by "an interferon" or "the interferon", it is meant a compound belonging to the interferon family, which are glycoproteins secreted by the cells of the immune system.

The interferons are a family of small protein molecules with a molecular weight of about 15,000 to 21,000 Daltons. Three major interferon classes have been identified: alpha, beta and gamma. These 3 main classes are not homogenous themselves and can gather several different interferon molecular species. More than 14 genetically different human alpha interferons have been identified.

It is understood that in the pharmaceutical composition according to the present invention, the interferon which is used will be a recombinant polypeptide, synthesized in laboratory.

In particular, the interferon which is used may be recombinant interferon alpha-2b the efficiency of which on in vivo and in vitro viral replication has been demonstrated.

In another aspect, the present invention is directed to a method for preventing or treating coronavirus disease 2019 (COVID-19), the method comprising a step of administering the composition.

In another aspect, the present invention is directed to a method for preventing or treating coronavirus disease 2019 (COVID-19), the method comprising a step of administering, to a patient, a compound that binds specifically to the Mpro of SARS-CoV-2 or a compound that binds specifically to the RdRP of SARS-CoV-2.

In the present invention, the compound that binds specifically to the Mpro may have a docking energy of −7.0 kcal/mol or less, more preferably −7.5 kcal/mol or less, for the Mpro.

In the present invention, the compound that binds specifically to the Mpro may inhibit protein synthesis by specifically binding to the Mpro protein of SARS-CoV-2.

In the present invention, the compound that binds specifically to the RdRP may have a docking energy of −6.4 kcal/mol or less, more preferably −6.7 kcal/mol or less, for the RdRP.

In the present invention, the compound that binds specifically to the RdRP may inhibit viral replication by specifically binding to the RdRP protein of SARS-CoV-2.

In the present invention, the compound that binds specifically to Mpro may be selected from the group consisting of Alobresib, CE-326597, blonanserin and emodin.

In the present invention, the compound that binds specifically to RdRP may be selected from the group consisting of hypericin, omipalisib, LGH-447, NS-3728, tipifarnib, valopicitabine, elsamitrucin, NRC-AN-019, denufosol and isatoribine.

In the present invention, the compound that binds specifically to Mpro is preferably blonanserin or emodin, more preferably emodin.

In the present invention, the compound that binds specifically to RdRP is preferably selected from the group consisting of hypericin, omipalisib, LGH-447, NS-3728, and tipifarnib, and is more preferably omipalisib or tipifarnib.

In another aspect, the present invention is directed to a method for preventing or treating coronavirus disease 2019 (COVID-19), the method comprising a step of co-administering two or more compounds selected from the group consisting of blonanserin, emodin, omipalisib, tipifarnib and remdesivir.

In the present invention, each compound may be administered at the concentration described above with respect to the composition.

In the present invention, by co-administering two or more compounds selected from the group consisting of blonanserin, emodin, omipalisib, tipifarnib and remdesivir, it is possible to achieve an excellent synergistic effect compared to the use of single drugs.

In the present invention, the co-administration may be performed by administering a mixture (e.g., the pharmaceutical composition of the present invention) obtained by mixing effective amounts of two or more compounds selected from the group consisting of blonanserin, emodin, omipalisib, tipifarnib, and remdesivir.

(1) In the present invention, when a combination of tipifarnib and blonanserin is administered, the tipifarnib may be administered at a concentration of 2.75 to 11 µM, and the blonanserin may be administered at a concentration of 1.50 to 47.87 µM.

(2) In the present invention, when a combination of tipifarnib and emodin is administered, the tipifarnib may be administered at a concentration of more than 0 and not more than 11 µM, and the emodin may be administered at a concentration of 1.97 to 31.45 µM.

(3) In the present invention, when a combination of tipifarnib and omipalisib is administered, the tipifarnib may be administered at a concentration of more than 0 and not more than 11 µM, and the omipalisib may be administered at a concentration of more than 0 and not more than 0.25 µM, or the tipifarnib may be administered at a concentration of 1.38 to 11 µM, and the omipalisib may be administered at a concentration of more than 0 and not more than 0.25 µM.

(4) In the present invention, when a combination of tipifarnib and remdesivir is administered, the tipifarnib may be administered at a concentration of more than 0 and not more than 11 µM, and the remdesivir may be administered at a concentration of more than 0 and not more than 20.18 µm.

(5) In the present invention, when a combination of blonanserin and emodin is administered, the blonanserin may be administered at a concentration of more than 0 and not more than 5.98 µM, and the emodin may be administered at a concentration of 7.86 to 62.9 µM, or the blonanserin may be administered at a concentration of 5.98 to 47.87 µM, and the emodin may be administered at a concentration of more than 0 and not more than 62.9 µM.

(6) In the present invention, when a combination of blonanserin and omipalisib is administered, the blonanserin may be administered at a concentration of more than 0 and not more than 47.87 µM, and the omipalisib may be administered at a concentration of 0.49 to 1.97 µM, or the blonanserin may be administered at a concentration of 1.5 to 47.87 µM, and the omipalisib may be administered at a concentration of more than 0 and not more than 0.49 µM.

(7) In the present invention, when a combination of blonanserin and remdesivir is administered, the blonanserin may be administered at a concentration of more than 0 and not more than 1.5 µM, and the remdesivir may be administered at a concentration of more than 0 and not more than 40.36 µm, or the blonanserin may be administered at a concentration of 5.0 to 40 µM, and the remdesivir may be administered at a concentration of more than 0 and not more than 40.36.

(8) In the present invention, when a combination of emodin and omipalisib is administered, the emodin may be administered at a concentration of more than 0 and not more than 125.81 µM, and the omipalisib may be administered at a concentration of more than 0 and not more than 1.97 µM.

(9) In the present invention, when a combination of emodin and remdesivir is administered, the emodin may be administered at a concentration of more than 0 and not more than 125.81 µM, and the remdesivir may be administered at a concentration of more than 0 and not more than 40.36 µM.

(10) In the present invention, when a combination of omipalisib and remdesivir is administered, the omipalisib may be administered at a concentration of more than 0 and not more than 1.97 µM, and the remdesivir may be administered at a concentration of more than 0 and not more than 40.36 µM.

In the present invention, the compounds to be co-administered may be administered simultaneously or sequentially, and when the compounds are administered sequentially, the order of administration is not limited.

The patient may be a mammal, comprising primates comprising humans and monkeys, and rodents comprising mice and rats. In addition, the patient may be a patient infected with coronavirus, more preferably a coronavirus disease 2019 (COVID-19) patient infected with SARS-CoV-2.

In the present invention, when the method is used for the treatment of primates, any one of the above-described 10 combinations may be administered. More preferably, a combination of i) remdesivir and tipifarnib, ii) omipalisib and emodin, iii) remdesivir and emodin, iv) remdesivir and omipalisib, v) omipalisib and tipifarnib, or vi) omipalisib and blonanserin may be administered.

In the present invention, when the method is used for human treatment, a combination of two or more compounds, preferably two compounds, selected from the group consisting of remdesivir, tipifarnib, omipalisib and emodin, may be administered.

In another aspect, the present invention is directed to the use of the composition for preventing or treating coronavirus disease 2019 (COVID-19).

In another aspect, the present invention is directed to the use of a compound that binds specifically to the Mpro of SARS-CoV-2 or a compound that binds specifically to the RdRP of SARS-CoV-2, for preventing or treating coronavirus disease 2019 (COVID-19).

In another aspect, the present invention is directed to the use of the composition for the manufacture of a medicament for preventing or treating coronavirus disease 2019 (COVID-19).

In another aspect, the present invention is directed to the use of a compound that binds specifically to the Mpro of SARS-CoV-2 or a compound that binds specifically to the RdRP of SARS-CoV-2, for the manufacture of a medicament for preventing or treating coronavirus disease 2019 (COVID-19).

Specific embodiments of each aspect of the present invention may share the same features as disclosed in the above other aspects of the present invention.

The preferred concentration of each compound described in the present specification comprises the critical range unless intentionally excluded, such as "more than" and "less than", and the present invention should be construed as comprising not only the above-described concentration range, but also the range that can be conceived of by a person skilled in the art through the description of the present specification and understood to be substantially the same.

EXAMPLES

Hereinafter, the present invention will be described in more detail with reference to examples. It will be obvious to skilled in the art that these examples serve merely to illustrate the present invention, and the scope of the present invention is not limited by these examples.

Example 1: Construction of Compound Library for Drug Virtual Screening

In order to collect drugs which were previously approved or subjected to clinical trials, 6,218 compounds were collected without duplication were collected using DrugBank (www.drugbank.ca/), ZINC15 (zinc15.docking.org/) and ChEMBL (www.ebi.ac.uk/chembl/) databases.

From DrugBank, each of compound structures categorized as "approved drugs" and "investigated drugs" was downloaded. From ZINC15, all compound structures categorized as "in-trials" were downloaded. From ChEMBL, compounds that have at least one activity among "polymerase", "protease", and "antiviral" items and have undergone at least phase 1 clinical trials were downloaded.

The compound structures collected from the three databases were converted to InChI and then examined for redundancy. Since there were many cases in which most of the nucleic acid analog drugs obtained from the databases existed in the form of prodrugs, the operation of converting the prodrug forms into active forms that actually act in vivo was performed. In the case wherein ribose as a substructure is comprised in the molecule, the operation of attaching triphosphate at the 5'-carbon position was performed in an automated manner. In the case of the nucleic acid analog drug converted into the active form, structures of the prodrug and the active form were comprised in the database for drug virtual screening. The process of converting the compound structure was performed in the Python's script using the open source RDKit package (FIG. 1).

Example 2: Selection of Three-Dimensional Structure of Viral Drug Target for Protein-Ligand Docking

Example 2-1: SARS-CoV-2 Mpro Structure

Figure 2:
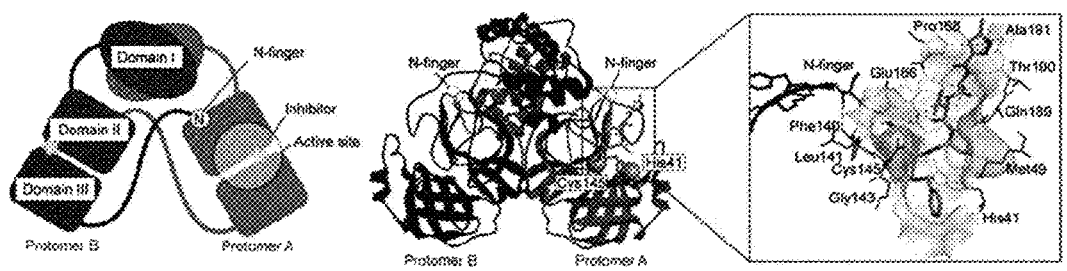
FIG. 2 shows the structure of the drug target Mpro used in the present invention.

Several three-dimensional structures of the main protease (Mpro) of SARS-CoV-2 are stored in the Protein Data Bank database, and thereamong, a structure having an excellent crystal structure resolution of 1.95 Å and comprising an active ligand attached thereto was selected (FIG. 2, PDB ID: 6Y2F). Deletion of two amino acids (Glu47 and Asp48) in the vicinity of the active site was found, and thus this portion was inserted, and then the energy optimization process was performed by the steepest descent method using the GROMACS 4.5 package.

Example 2-2: SARS-CoV-2 RdRp Structure

Figure 3:
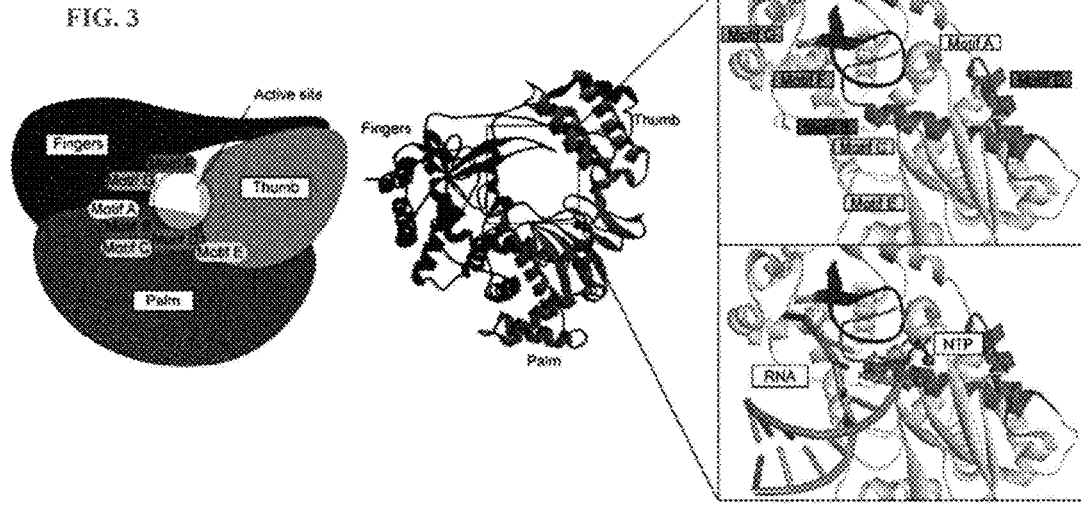
FIG. 3 shows the structure of the drug target RdRp used in the present invention.
Figure 4:
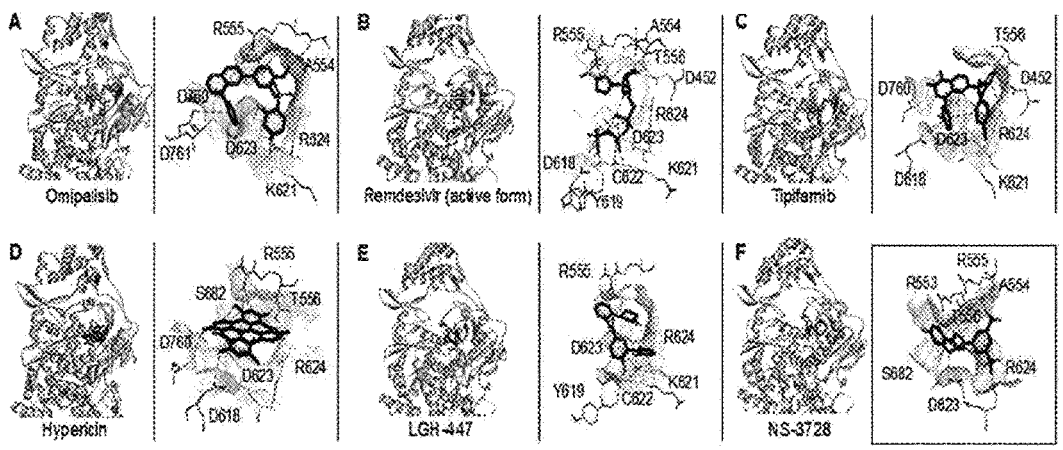
FIG. 4 shows the binding patterns of drug candidates predicted to bind to the drug target RdRp used in the present invention.
Figure 5:
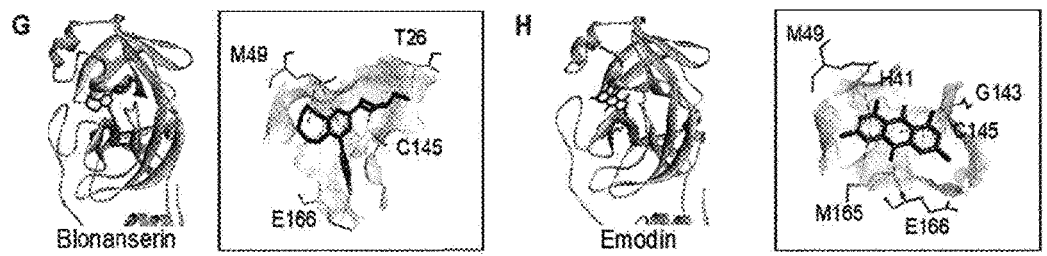
FIG. 5 shows the binding patterns of drug candidates predicted to bind to the drug target Mpro used in the present invention.

As the RdRp structure of SARS-CoV-2, a structure obtained from the Protein Data Bank database and analyzed by cryo-electron microscopy was used (FIG. 3, PDB ID: 6M71). It was confirmed that this structure had a resolution of 2.90 Å and there was not enough space for RNA to bind to the active site to which RNA binds. Thus, molecular dynamics simulation was performed using the GROMACS 4.5 package, and then clustering analysis was performed on snapshots of the protein structure at several time points based on the root mean-square deviation (RMSD) value. Among the protein structures found with high frequency, a structure in which sufficient space is ensured at the active site to which RNA binds was selected as the structure to be used for the final docking simulation. The structure when the actual drug binds to the active site of the protein was simulated as much as possible.

Example 3: Prediction of SARS-CoV-2 Mpro Inhibitors through Drug Virtual Screening

Example 3-1: Screening Using Ligand Shape Similarity

Active compounds known to bind to the SARS-CoV-2 Mpro could be obtained from protein co-crystal structures, and the ligand shape similarity was compared between the compounds of the compound library obtained in Example 1 and these active compounds as a reference structure. Since the compound library obtained in Example 1 is stored as a two-dimensional structure rather than a three-dimensional structure, conversion into the three-dimensional structure was performed. Using the experimental-torsion basic knowledge distance geometry algorithm comprised in the RDKit package, up to 300 three-dimensional conformers with the highest possibility were experimentally generated for each compound. A total of 1,865,400 three-dimensional conformers were generated for 6,218 compounds. Calculation of the ligand shape similarity between these conformers and known active ligands was performed. Calculation of the ligand shape similarity was performed using a total of three methods: USR (Ultrafast Shape Recognition), USRCAT (USR with Credo Atom Types), and ElectroShape. After the average value of the values obtained by the three methods was calculated, the next step, docking simulation analysis, was performed on 4,019 compounds having a value of 0.4 or more.

Example 3-2: Screening Using Docking Simulations

To predict the binding behavior and binding intensity between the protein and each compound, molecular docking simulation was performed using AutoDock Vina. A PDBQT file, an input file of the AutoDock Vina program, was created for each of the protein and the ligand using OpenBabel and MGLTools packages. With reference to the crystal structure (PDB ID: 6Y2F) in which the ligand is bound to the protein active site, a grid box was set from the center of the ligand (12Å*12Å*12 Å). 30 compounds having a docking energy value equal to or lower than −7.0 kcal/mol were selected (Table 1).

TABLE 1

| Compound ID | Docking energy (kcal/mol) | Drug name |
| --- | --- | --- |
| ZINC000003974230 | −9.4 | ZINC000003974230 |
| ZINC000238730509 | −9.0 | ZINC000238730509 |
| ZINC000014096578 | −8.8 | ZINC000014096578 |
| DB14883 | −8.7 | Lorecivivint |
| DB14970 | −8.5 | Alobresib |
| ZINC000003919561 | −8.4 | ZINC000003919561 |
| DB15145 | −8.4 | Ziresovir |
| ZINC000000608087 | −8.3 | Suriclone |
| DB00959 | −8.2 | Methylprednisolone |
| ZINC000000596712 | −8.2 | Sch-37370 |
| DB08883 | −8.2 | Perampanel |
| DB12694 | −8.0 | CE-326597 |
| DB04885 | −8.0 | Cilansetron |
| DB00180 | −7.7 | Flunisolide |
| ZINC000257420679 | −7.6 | ZINC000257420679 |
| DB09223 | −7.5 | Blonanserin |

TABLE 1-continued

| Compound ID | Docking energy (kcal/mol) | Drug name |
|---|---|---|
| ZINC000013487265 | −7.5 | ZINC000013487265 |
| DB00377 | −7.5 | Palonosetron |
| DB04982 | −7.5 | Talampanel |
| ZINC000254010483 | −7.4 | ZINC000254010483 |
| DB15257 | −7.3 | Miladometan |
| ZINC000043757608 | −7.3 | ZINC000043757608 |
| DB03496 | −7.1 | Alvocidib |
| DB07715 | −7.1 | Emodin |
| ZINC000003779555 | −7.1 | ZINC000003779555 |
| ZINC000003872013 | −7.1 | Cgs-15943 |
| DB09290 | −7.1 | Ramosetron |
| ZINC000254010478 | −7.1 | ZINC000254010478 |
| DB11952 | −7.0 | Duvelisib |
| ZINC000095092797 | −7.0 | ZINC000095092797 |
| DB00860 | −7.0 | Prednisolone |

Additionally, 19 compounds having a docking energy value lower than or equal to −7.5 kcal/mol were selected (Table 2).

TABLE 2

| Compound ID | Docking energy (kcal/mol) | Drug name |
|---|---|---|
| ZINC000003974230 | −9.4 | ZINC000003974230 |
| ZINC000238730509 | −9.0 | ZINC000238730509 |
| ZINC000014096578 | −8.8 | ZINC000014096578 |
| DB14883 | −8.7 | Lorecivivint |
| DB14970 | −8.5 | Alobresib |
| ZINC000003919561 | −8.4 | ZINC000003919561 |
| DB15145 | −8.4 | Ziresovir |
| ZINC000000608087 | −8.3 | Suriclone |
| DB00959 | −8.2 | Methylprednisolone |
| ZINC000000596712 | −8.2 | Sch-37370 |
| DB08883 | −8.2 | Perampanel |
| DB12694 | −8.0 | CE-326597 |
| DB04885 | −8.0 | Cilansetron |
| DB00180 | −7.7 | Flunisolide |
| ZINC000257420679 | −7.6 | ZINC000257420679 |
| DB09223 | −7.5 | Blonanserin |
| ZINC000013487265 | −7.5 | ZINC000013487265 |
| DB00377 | −7.5 | Palonosetron |
| DB04982 | −7.5 | Talampanel |

Example 3-3: Screening Using Protein-Ligand Interaction Similarity

The similarity of protein-ligand three-dimensional interaction patterns was compared between active ligands known to bind to the SARS-CoV-2 Mpro and the 30 compounds obtained by docking simulation, and compounds having interactions similar to those of the active ligands were additionally selected. A total of six interactions were considered (hydrogen bonds, hydrophobic contacts, pi-stacking, pi-cation interactions, salt bridges, and halogen bonds). The interaction similarity was quantitatively compared using the Tanimoto similarity measurement method. Whether protein-ligand binding patterns for 20 candidate drugs having an interaction similarity of 0.5 or more would be chemically possible was examined, thereby selecting 10 final candidate drugs (Table 3).

TABLE 3

| Compound ID | Docking energy (kcal/mol) | Drug name |
|---|---|---|
| DB14970 | −8.5 | Alobresib |
| ZINC000003919561 | −8.4 | ZINC000003919561 |

TABLE 3-continued

| Compound ID | Docking energy (kcal/mol) | Drug name |
|---|---|---|
| DB15145 | −8.4 | Ziresovir |
| DB04885 | −8.0 | Cilansetron |
| DB00180 | −7.7 | Flunisolide |
| ZINC000257420679 | −7.6 | ZINC000257420679 |
| DB09223 | −7.5 | Blonanserin |
| ZINC000013487265 | −7.5 | ZINC000013487265 |
| DB00377 | −7.5 | Palonosetron |
| DB04982 | −7.5 | Talampanel |

Example 4: Prediction of SARS-CoV-2 RdRp Inhibitors through Drug Virtual Screening Example 4-1: Screening Using Ligand Shape Similarity Active compounds known to bind to the RdRp proteins of other viruses, which are similar to the SARS-CoV-2 RdRp, could be obtained from protein co-crystal structures, and the ligand shape similarity was compared between the compounds of the compound library obtained in Example 1 and these active compounds as a reference structure. Since the compound library obtained in Example 1 is stored as a two-dimensional structure rather than a three-dimensional structure, conversion to the three-dimensional structure was performed. Using the experimental-torsion basic knowledge distance geometry algorithm comprised in the RDKit package, up to 300 three-dimensional conformers with the highest possibility were experimentally generated for each compound. Calculation of the ligand shape similarity between these conformers and known active ligands was performed. Calculation of the ligand shape similarity was performed using a total of three methods: USR (Ultrafast Shape Recognition), USRCAT (USR with Credo Atom Types), and ElectroShape. After the average value of the values obtained by the three methods was calculated, the next step docking simulation analysis was performed on 4,554 compounds having a value of 0.4 or more.

Example 4-2: Screening Using Docking Simulations

To predict the binding behavior and binding intensity between the protein and each compound, molecular docking simulation was performed using AutoDock Vina. A PDBQT file, an input file of the AutoDock Vina program, was created for each of the protein and the ligand using OpenBabel and MGLTools packages. With reference to the crystal structure (PDB ID: 3N6M) in which the ligand is bound to the protein active site, a grid box was set from the center of the ligand (12Å *12Å *12 Å). 36 compounds having a docking energy value equal to or lower than −6.4 kcal/mol were selected (Table 4).

TABLE 4

| Compound ID | Docking energy (kcal/mol) | Drug name |
|---|---|---|
| DB13014 | −8.9 | Hypericin |
| DB12690 | −7.6 | LY2584702 |
| ZINC000253637382 | −7.5 | ZINC000253637382 |
| ZINC000261494690 | −7.2 | ZINC000261494690 |
| CHEMBL2016761 | −7.1 | Remdesivir (active form) |

TABLE 4-continued

| Compound ID | Docking energy (kcal/mol) | Drug name |
|---|---|---|
| DB15013 | −7.0 | TAK-243 |
| DB12130 | −7.0 | Lorlatinib |
| ZINC000003919561 | −7.0 | ZINC000003919561 |
| DB04703 | −7.0 | Hesperidin |
| DB13920 | −7.0 | Valopicitabine (active form) |
| DB05129 | −6.9 | Elsamitrucin |
| DB00495 | −6.8 | Zidovudine (active form) |
| DB12742 | −6.7 | Amuvatinib |
| CHEMBL3818050 | −6.7 | Favipiravir (active form) |
| DB12703 | −6.7 | Omipalisib |
| DB14883 | −6.7 | Lorecivivint |
| DB14723 | −6.7 | Larotrectinib |
| ZINC000042190959 | −6.7 | ZINC000042190959 |
| DB00266 | −6.6 | Dicoumarol |
| DB04983 | −6.6 | Denufosol |
| DB12817 | −6.6 | Zoliflodacin |
| DB14943 | −6.6 | LGH-447 |
| DB12168 | −6.6 | MK-0557 |
| DB06595 | −6.6 | Midostaurin |
| DB00694 | −6.6 | Daunorubicin |
| ZINC000261494616 | −6.6 | ZINC000261494616 |
| DB12195 | −6.6 | VP-14637 |
| DB05835 | −6.5 | NS3728 |
| DB04960 | −6.5 | Tipifarnib |
| DB06469 | −6.5 | Lestaurtinib |
| ZINC000261494716 | −6.5 | ZINC000261494716 |
| DB02594 | −6.5 | 2'-Deoxycytidine (active form) |
| DB12101 | −6.5 | CC-220 |
| DB00552 | −6.4 | Pentostatin (active form) |
| DB04860 | −6.4 | Isatoribine (active form); |
| DB14917 | −6.4 | Ceralasertib |

Additionally, 18 compounds having a docking energy value lower than or equal to −6.7 kcal/mol were selected (Table 5).

TABLE 5

| Compound ID | Docking energy (kcal/mol) | Drug name |
|---|---|---|
| DB13014 | −8.9 | Hypericin |
| DB12690 | −7.6 | LY2584702 |
| ZINC000253637382 | −7.5 | ZINC000253637382 |
| ZINC000261494690 | −7.2 | ZINC000261494690 |
| CHEMBL2016761 | −7.1 | Remdesivir (active form) |
| DB15013 | −7.0 | TAK-243 |
| DB12130 | −7.0 | Lorlatinib |
| ZINC000003919561 | −7.0 | ZINC000003919561 |
| DB04703 | −7.0 | Hesperidin |
| DB13920 | −7.0 | Valopicitabine (active form) |
| DB05129 | −6.9 | Elsamitrucin |
| DB00495 | −6.8 | Zidovudine (active form) |
| DB12742 | −6.7 | Amuvatinib |
| CHEMBL3818050 | −6.7 | Favipiravir (active form) |
| DB12703 | −6.7 | Omipalisib |
| DB14883 | −6.7 | Lorecivivint |
| DB14723 | −6.7 | Larotrectinib |
| ZINC000042190959 | −6.7 | ZINC000042190959 |

Example 4-3: Screening Using Protein-Ligand Interaction Similarity

The similarity of protein-ligand three-dimensional interaction patterns was compared between active ligands known to bind to the RdRp proteins of other viruses, which are similar to the SARS-CoV-2 RdRp, and the 38 compounds obtained by docking simulation, and compounds having interactions similar to those of the active ligands were additionally selected. A total of six interactions were considered (hydrogen bonds, hydrophobic contacts, pi-stacking, pi-cation interactions, salt bridges, and halogen bonds). The interaction similarity was quantitatively compared using the Tanimoto similarity measurement method. Whether protein-ligand binding patterns for 24 candidate drugs having an interaction similarity of 0.5 or more would be chemically possible was examined, thereby selecting 10 final candidate drugs (Table 6).

TABLE 6

| Compound ID | Docking energy (kcal/mol) | Drug name |
|---|---|---|
| DB13014 | −8.9 | Hypericin |
| ZINC000253637382 | −7.5 | ZINC000253637382 |
| CHEMBL2016761 | −7.1 | Remdesivir (active form) |
| DB15013 | −7.0 | TAK-243 |
| DB04703 | −7.0 | Hesperidin |
| DB13920 | −7.0 | Valopicitabine (active form) |
| DB05129 | −6.9 | Elsamitrucin |
| DB00495 | −6.8 | Zidovudine (active form) |
| CHEMBL3818050 | −6.7 | Favipiravir (active form) |
| ZINC000042190959 | −6.7 | ZINC000042190959 |

Example 5: Experiment on Candidate Compounds in Cells

Example 5-1: Validation of Efficacy of Single Candidate Drugs in Vero Cells

SARS-CoV-2 and each of a total of 38 drugs (comprising 15 compounds that bind specifically to the Mpro and 23 compounds that bind specifically to the RdRP) among the candidate drugs selected in Examples 3 and 4 were injected into Vero cells (monkey kidney cells, purchased from American Type Culture Collection (ATCC)), and then the degree of infection with the virus and the number of cells were quantitatively measured through image analysis using immunofluorescence (Table 7).

Figure 6:
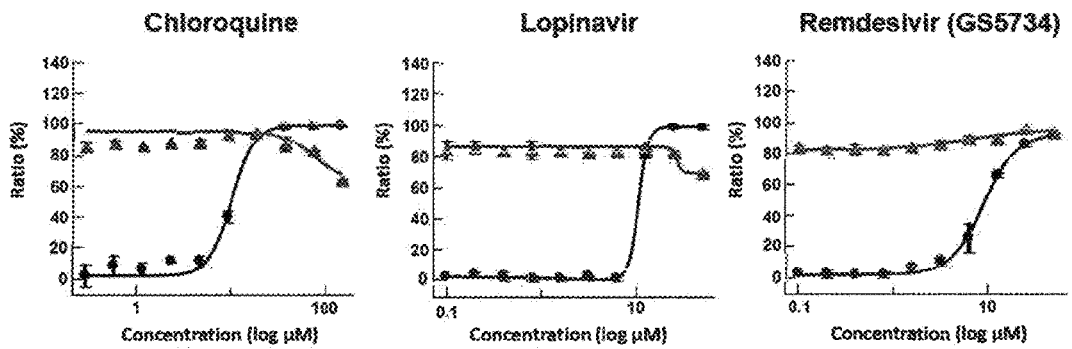
FIG. 6 shows dose-response curves of three reference drugs (chloroquine, lopinavir, and remdesivir) used to compare the antiviral effects of drugs used in the present invention.

Three types of coronavirus disease 2019 treatments (chloroquine, lopinavir, remdesivir), which are currently in use in clinical practice, were used as reference drugs (FIG. 6).

TABLE 7

| Binding to Mpro | Compound ID | Drug name | Binding to RdRP | Compound ID | Drug name |
|---|---|---|---|---|---|
| 1 | DB15145 | Ziresovir | 1 | DB13014 | Hypericin |
| 2 | ZINC596712 | Sch-37370 | 2 | DB12690 | LY2584702 |
| 3 | DB09223 | Blonanserin | 3 | DB15013 | TAK-243 |
| 4 | DB04982 | Talampanel | 4 | DB12130 | Lorlatinib |
| 5 | ZINC000043757608 | Fluorometholone | 5 | DB04703 | Hesperidin |
| 6 | DB07715 | Emodin | 6 | DB00495 | Zidovudine |

TABLE 7-continued

| Binding to Mpro | Compound ID | Drug name | Binding to RdRP | Compound ID | Drug name |
|---|---|---|---|---|---|
| 7 | ZINC000003872013 | Cgs-15943 | 7 | DB12742 | Amuvatinib |
| 8 | DB09290 | Ramosetron | 8 | DB12703 | Omipalisib |
| 9 | DB11952 | Duvelisib | 9 | DB14723 | Larotrectinib |
| 10 | DB00860 | Prednisolone | 10 | DB00266 | Dicoumarol |
| 11 | DB14883 | Lorecivivint | 11 | DB14943 | LGH-447 |
| 12 | DB08883 | Perampanel | 12 | DB06595 | Midostaurin |
| 13 | DB00180 | Flunisolide | 13 | DB00694 | Daunorubicin |
| 14 | DB00377 | Palonosetron | 14 | DB00552 | Pentostatin |
| 15 | DB15257 | Milademetan | 15 | DB12817 | Zoliflodacin |
| | | | 16 | DB12168 | MK-0557 |
| | | | 17 | DB12195 | VP-14637 |
| | | | 18 | DB05835 | NS-3728 |
| | | | 19 | DB04960 | Tipifarnib |
| | | | 20 | DB06469 | Lestaurtinib |
| | | | 21 | DB02594 | 2'-Deoxycytidine |
| | | | 22 | DB12101 | CC-220 |
| | | | 23 | DB14917 | Ceralasertib |

Figure 7:
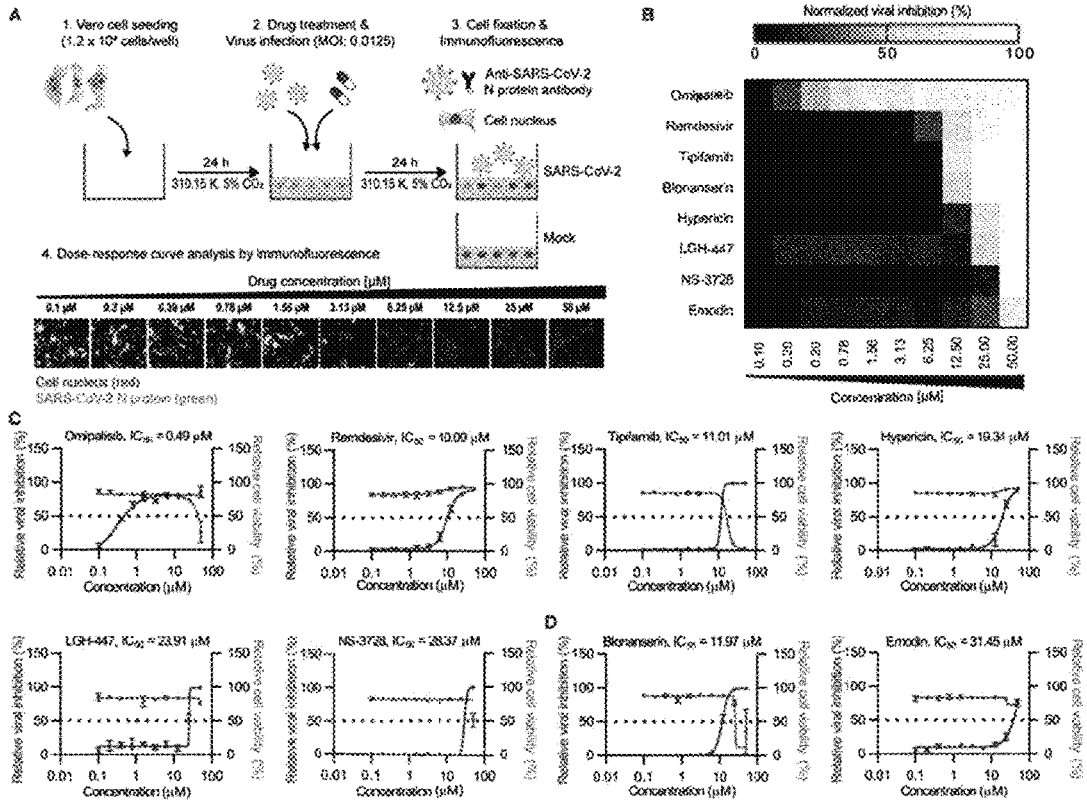
FIG. 7 in part A shows a process of testing the antiviral effects of drugs used in the present invention, in part B shows the dose-dependent antiviral effect of each drug, and in part C shows a dose-response curve of each single drug in Vero cells.

The antiviral activity of each candidate drug was quantitatively measured through a dose-response curve (FIG. 7). As of now, remdesivir is the only drug officially approved by the FDA for use as a treatment for coronavirus disease 2019.

As a result, as shown in Table 8, it was confirmed that the $IC_{50}$ value of omipalisib was 20 times lower than that of remdesivir, and tipifarnib and blonanserin showed $IC_{50}$ values similar to that of remdesivir. Hypericin, LGH-447, NS-3728, and emodin exhibited higher $IC_{50}$ values than remdesivir, but showed significant antiviral activities, and thus the seven compounds were determined as single candidate drugs for the treatment of COVID-19 (FIG. 7).

TABLE 8

| Target | Drug | $IC_{50}$ | Target | Drugs | $IC_{50}$ (µM) |
|---|---|---|---|---|---|
| RdRP | Omipalisib | 0.49 µM | Mpro | Blonanserin | 11.97 µM |
| RdRP | Tipifarnib | 11.01 µM | Mpro | Emodin | 31.45 µM |
| RdRP | Hypericin | 19.34 µM | RdRP(Control) | Remdesivir | 10.09 µM |
| RdRP | LGH-447 | 23.91 µM | (Control) | chloroquine | 8.89 µM |
| RdRP | NS-3728 | 28.37 µM | (Control) | lopinavir | 11.00 µM |

*Chloroquine and lopinavir are not recognized as treatments for coronavirus disease 19, because clinical trials thereof have been discontinued.

Example 5-2: Validation of Efficacy of Single Candidate Drugs in Calu-3 Cells

Evaluation was made as to whether the seven compounds (Table 8) that exhibited antiviral activity against SARS-CoV-2 as determined using the Vero cells in Example 5-1 would also exhibit excellent antiviral activity in Calu-3 cells (human lung cells, purchased from American Type Culture Collection (ATCC)). The degree of infection with the virus and the number of cells were quantitatively measured through image analysis using the same immunofluorescence method as used in evaluation for the Vero cells in Example 5-1. Remdesivir, which is currently clinically used as a treatment for coronavirus disease 2019, was used as a reference drug.

Figure 8:
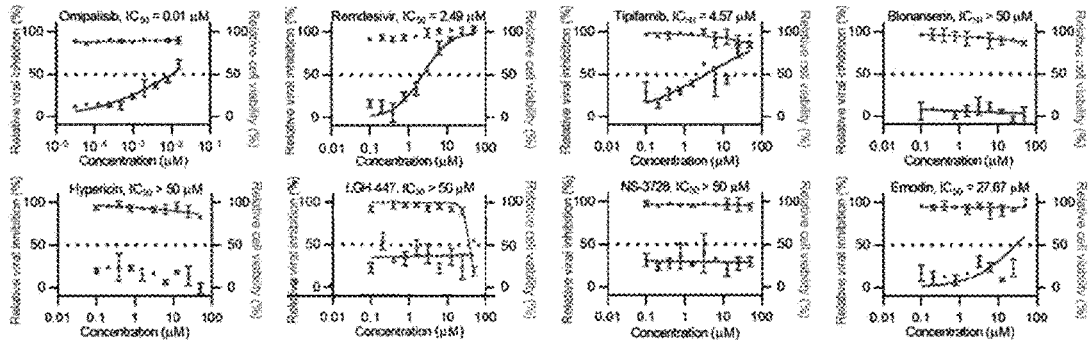
FIG. 8 shows a dose-response curve of each of single drugs (omipalisib, tipifarnib, blonanserin, hypericin, LGH-447, NS-3728 and emodin) in Calu-3 cells.
Figure 9:
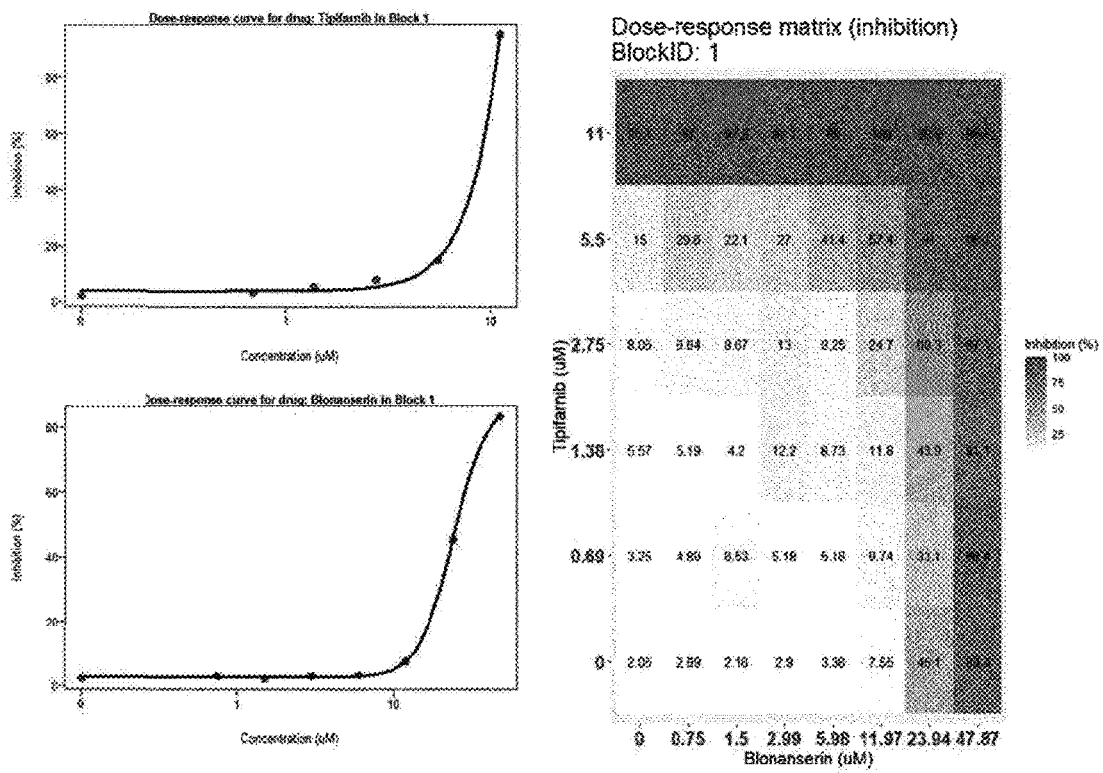
FIG. 9 shows the dose-dependent antiviral effect of a drug combination (tipifarnib and blonanserin) used in the present invention. The left shows a dose-response curve of each single drug, and the right shows a dose-response matrix depending on the dose of each single drug.
Figure 10:
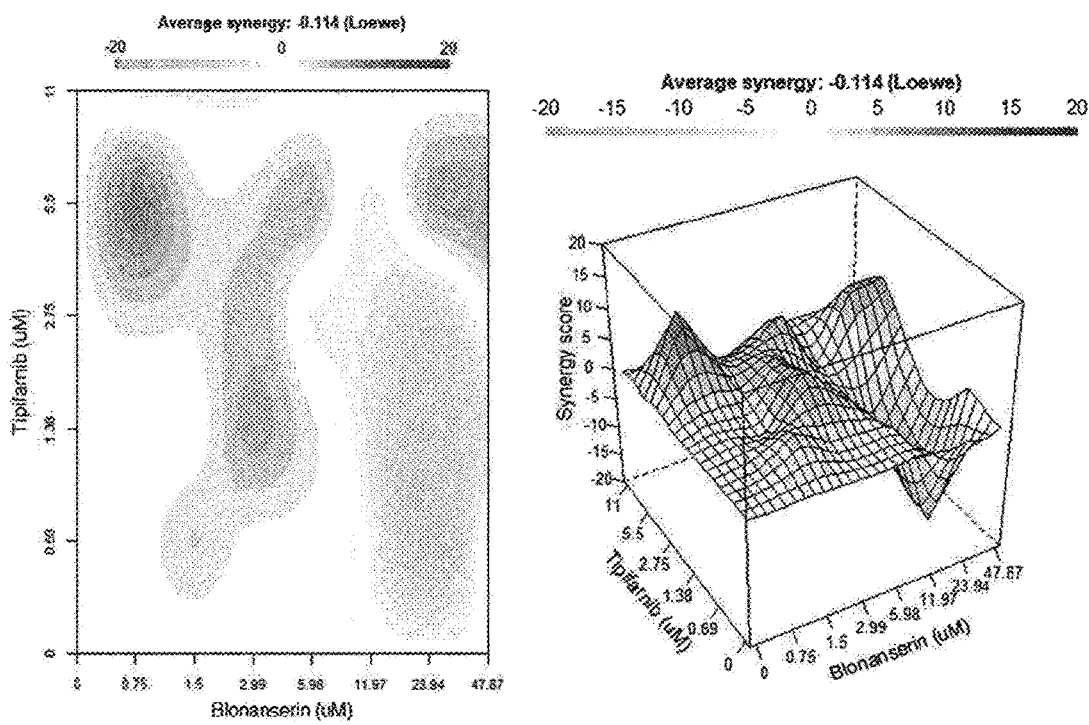
FIG. 10 shows the synergistic antiviral effect of a drug combination (tipifarnib and blonanserin), used in the present invention, based on the Loewe additivity model.

The antiviral activities of the 7 candidate drugs were quantitatively measured through a dose-response curve for each candidate drug (FIG. 8). As a result, it was confirmed that three (omipalisib, tipifarnib and emodin) of the seven candidate drugs also exhibited antiviral activity in the human lung cells (Calu-3). As shown in Table 9, omipalisib showed an $IC_{50}$ value which is 200 times lower than that of remdesivir, and tipifarnib also showed an $IC_{50}$ value similar to that of remdesivir.

TABLE 9

| Target | Drug | $IC_{50}$ | Target | Drug | $IC_{50}$ (µM) |
|---|---|---|---|---|---|
| RdRP | Omipalisib | 0.01 µM | Mpro | Blonanserin | >50 µM |
| RdRP | Tipifarnib | 4.57 µM | Mpro | Emodin | 27.87 µM |
| RdRP | Hypericin | >50 µM | RdRP (Control) | Remdesivir | 2.49 µM |
| RdRP | LGH-447 | >50 µM | | | |
| RdRP | NS-3728 | >50 µM | | | |

Example 5-3: Validation of Synergistic Effect of Drugs

The synergistic effect of a combination of the single drugs whose antiviral activity was experimentally validated was further validated. In order to maximize the effect of the drug combination, two drugs with excellent antiviral activity were selected for each drug target based on $IC_{50}$ (Mpro: blonanserin and emodin; RdRp: omipalisib and tipifarnib). In addition, remdesivir, which is currently the only drug formally approved by the FDA, was also comprised in the drug combination candidate group.

Ten drug combinations were prepared using a total of five drugs, and an experiment for validating the antiviral activity thereof was performed (Table 10). In the same manner as the experimental method for the single drugs, SARS-CoV-2 and each candidate drug combination were injected into Vero cells at different concentrations (eight concentrations obtained by 2-fold serial dilution from the concentration 4 times the $IC_{50}$ value of each single drug), and then a dose-response matrix for each combination was prepared by quantitatively measuring the degree of virus infection and the number of cells through image analysis using immuno-fluorescence (see the right of each of FIGS. 9, 14, 19, 24, 29, 34, 39, 44, 49 and 54).

TABLE 10

| Combination No. | Drug combination |
| --- | --- |
| 1 | Tipifarnib and blonanserin |
| 2 | Tipifarnib and emodin |
| 3 | Tipifarnib and omipalisib |
| 4 | Tipifarnib and remdesivir |
| 5 | Blonanserin and emodin |
| 6 | Blonanserin and omipalisib |
| 7 | Blonanserin and remdesivir |
| 8 | Emodin and omipalisib |
| 9 | Emodin and remdesivir |
| 10 | Omipalisib and remdesivir |

The SynergyFinder program (Ianevski, A. et al., Bioinformatics, Vol. 33(15), pp. 2413-2415, 2017) was used to evaluate the synergistic effect of the drugs on antiviral activity based on the dose-response matrix of each drug combination. Evaluation of the synergistic effects of the drugs was performed using four evaluation models as follows: 1) Loewe additivity model (Loewe, S., Arzneimittel-forschung, Vol. 3, pp. 285-290, 1953); 2) Bliss independence model (Bliss, C. I., Annals of applied biology, Vol. 26(3), pp. 585-615, 1939); 3) Zero Interaction Potency (ZIP) model (Yadav, B. et al., Computational and structural biotechnology journal, Vol. 13, pp. 504-513, 2015); 4) Highest Single Agent (HSA) model (Berenbaum, M. C., Pharmacological reviews, Vol. 41(2), pp. 93-141, 1989).

For each of the drug combinations shown in FIGS. 9 to 58, the model with the highest score among the average synergy scores of the four models was selected, and the optimal concentration of each drug combination was selected based on the concentration showing a high synergic effect (red color) in the corresponding model (Table 11).

TABLE 11

| Combination No. | Drug combination/ concentration (μM) | |
| --- | --- | --- |
| 1 | Tipifarnib | Blonanserin |
|   | 2.75 to 11 | 1.50 to 47.87 |
| 2 | Tipifarnib | Emodin |
|   | 0 to 11 | 1.97 to 31.45 |
| 3 | Tipifarnib | Omipalisib |
|   | 0 to 11 | 0 to 0.25 |
|   | 1.38 to 11 | 0.25 to 1.97 |
| 4 | Tipifarnib | Remdesivir |
|   | 0 to 11 | 0 to 20.18 |

TABLE 11-continued

| Combination No. | Drug combination/ concentration (μM) | |
| --- | --- | --- |
| 5 | Blonanserin | Emodin |
|   | 0 to 5.98 | 7.86 to 62.9 |
|   | 5.98 to 47.87 | 0 to 62.9 |
| 6 | Blonanserin | Omipalisib |
|   | 1.5 to 47.87 | 0 to 0.49 |
|   | 0 to 47.87 | 0.49 to 1.97 |
| 7 | Blonanserin | Remdesivir |
|   | 0 to 1.5 | 0 to 40.36 |
|   | 5.0 to 40 | 0 to 40.36 |
| 8 | Emodin | Omipalisib |
|   | 0 to 125.81 | 0 to 1.97 |
| 9 | Emodin | Remdesivir |
|   | 0 to 125.81 | 0 to 40.36 |
| 10 | Omipalisib | Remdesivir |
|   | 0 to 1.97 | 0 to 40.36 |

* Combination Nos. 8, 9 and 10 showed high synergic effects in the entire range

Figure 11:
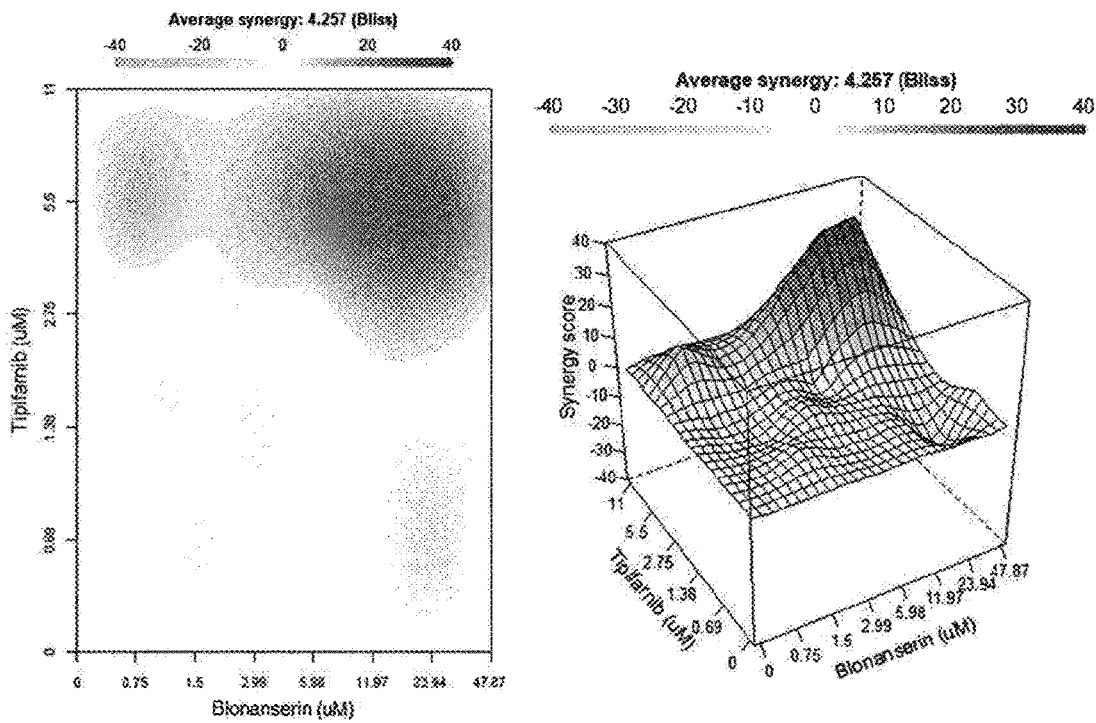
FIG. 11 shows the synergistic antiviral effect of a drug combination (tipifarnib and blonanserin), used in the present invention, based on the Bliss independence model.
Figure 12:
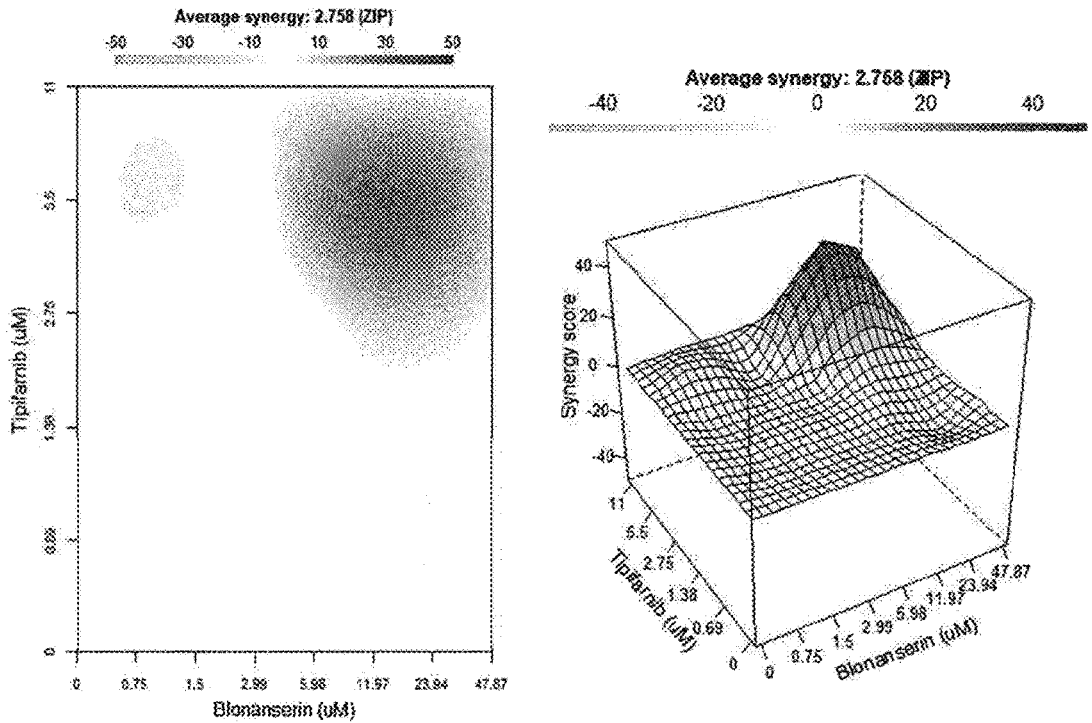
FIG. 12 shows the synergistic antiviral effect of a drug combination (tipifarnib and blonanserin), used in the present invention, based on the Zero Interaction Potency (ZIP) model.
Figure 13:
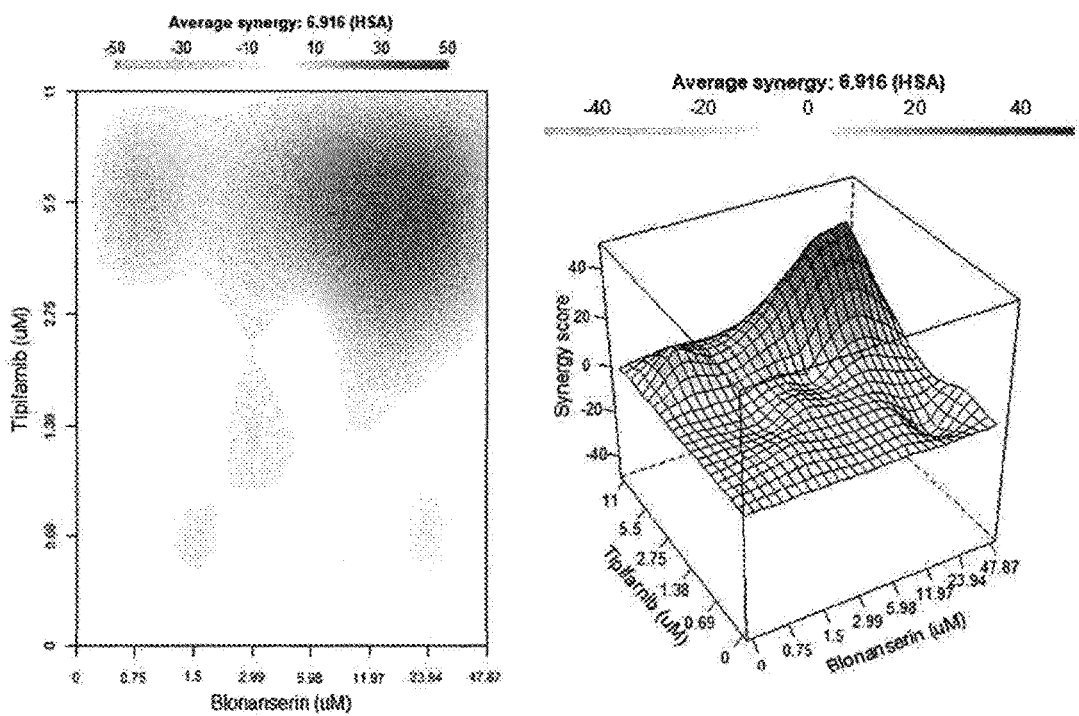
FIG. 13 shows the synergistic antiviral effect of combinatorial drugs (tipifarnib and blonanserin), used in the present invention, based on the Highest Single Agent (HSA) model.
Figure 14:
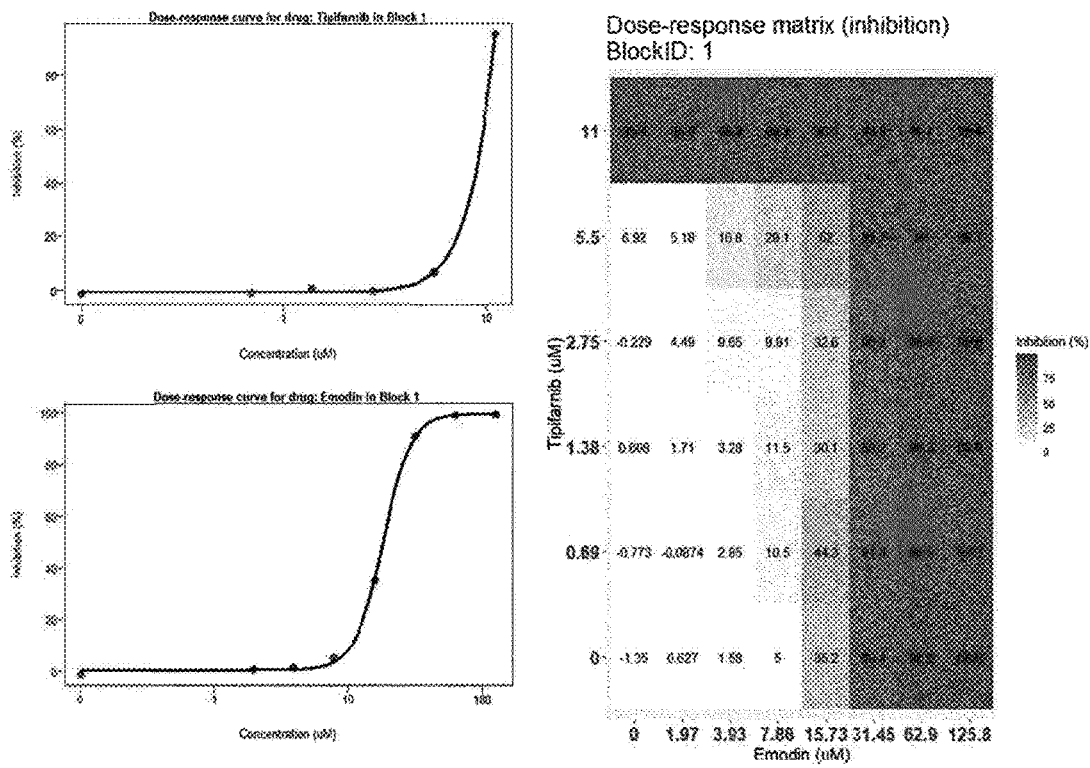
FIG. 14 shows the dose-dependent antiviral effect of a drug combination (tipifarnib and emodin) used in the present invention. The left shows a dose-response curve of each single drug, and the right shows a dose-response matrix depending on the dose of each single drug.
Figure 15:
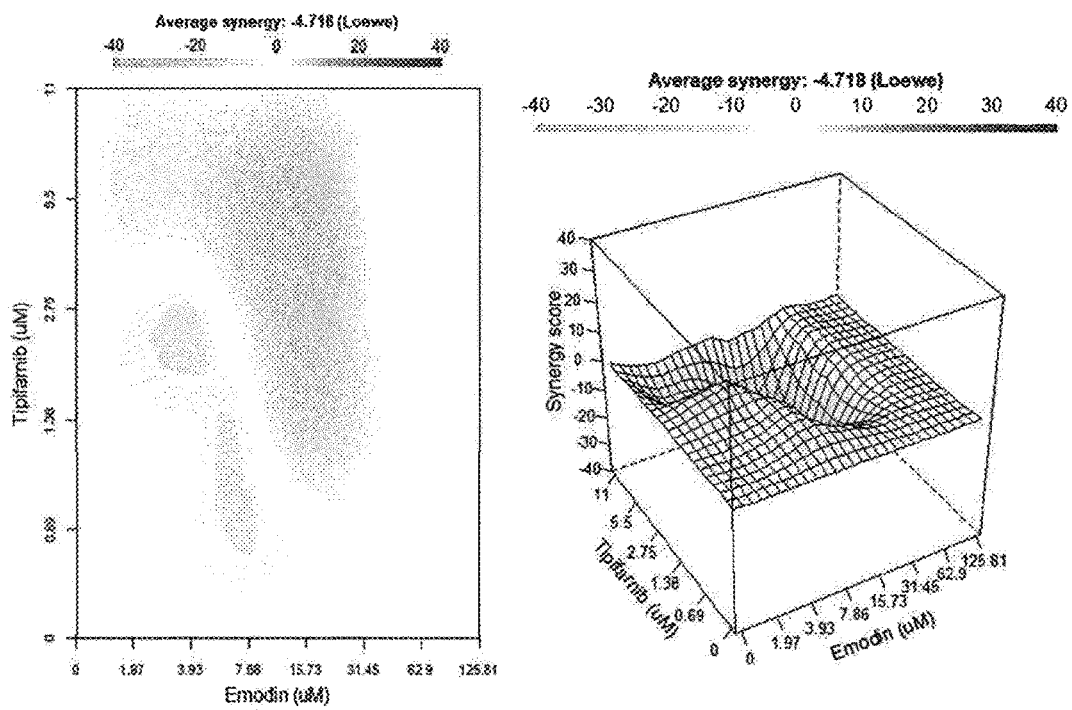
FIG. 15 shows the synergistic antiviral effect of a drug combination (tipifarnib and emodin), used in the present invention, based on the Loewe additivity model.

The synergistic effect of the combination of tipifarnib and blonanserin was found in the section where the tipifarnib concentration was 2.75 to 11 μM and the blonanserin concentration was 1.5 to 47 μM, based on the drug combination prediction model (FIGS. 11 to 13). In particular, in the section where the tipifarnib concentration was 5.5 μM and the blonanserin concentration was 23 μM, the antiviral activity improved by 40% compared to the expected effect of the drug combination prediction model (FIG. 13).

Figure 16:
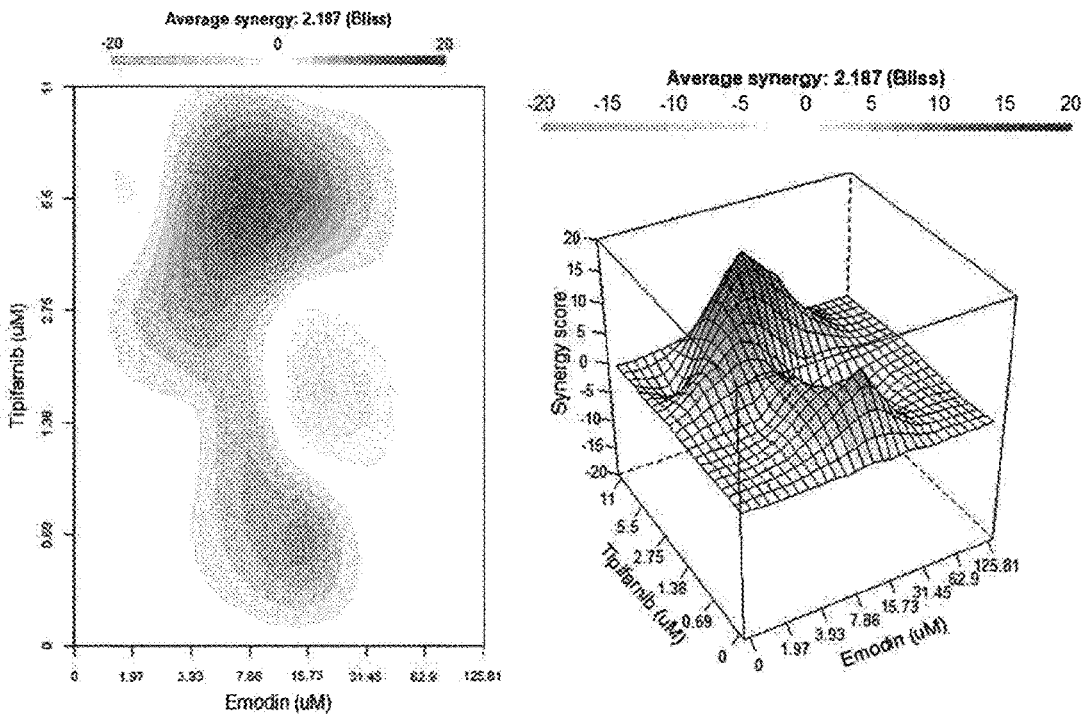
FIG. 16 shows the synergistic antiviral effect of a drug combination (tipifarnib and emodin), used in the present invention, based on the Bliss independence model.
Figure 17:
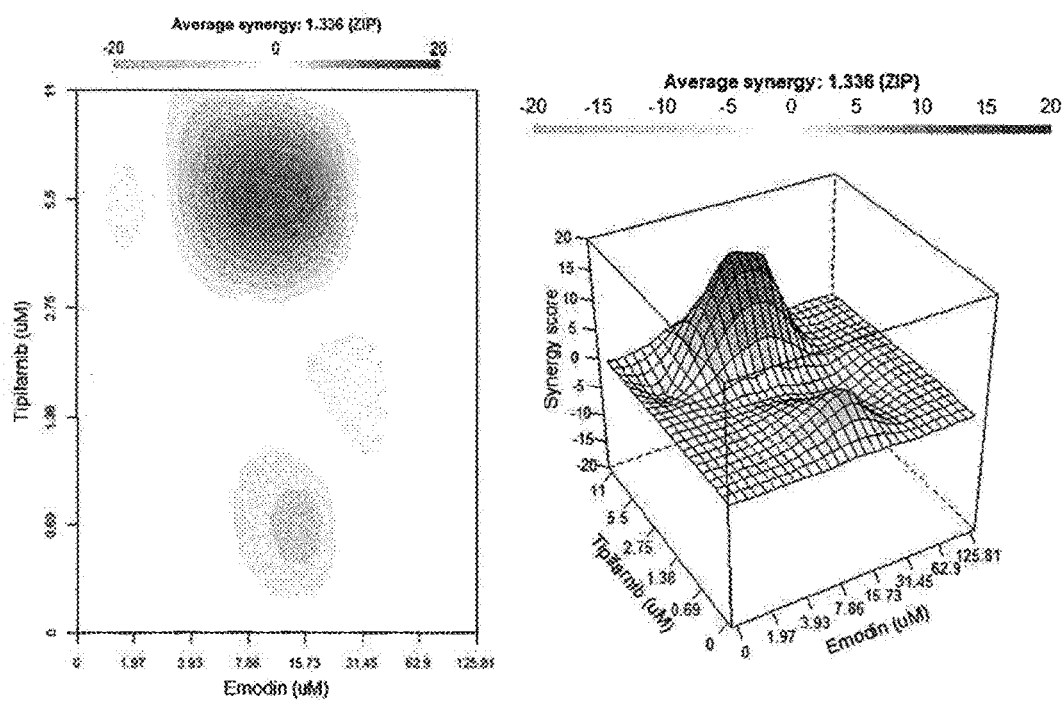
FIG. 17 shows the synergistic antiviral effect of a drug combination (tipifarnib and emodin), used in the present invention, based on the Zero Interaction Potency (ZIP) model.
Figure 18:
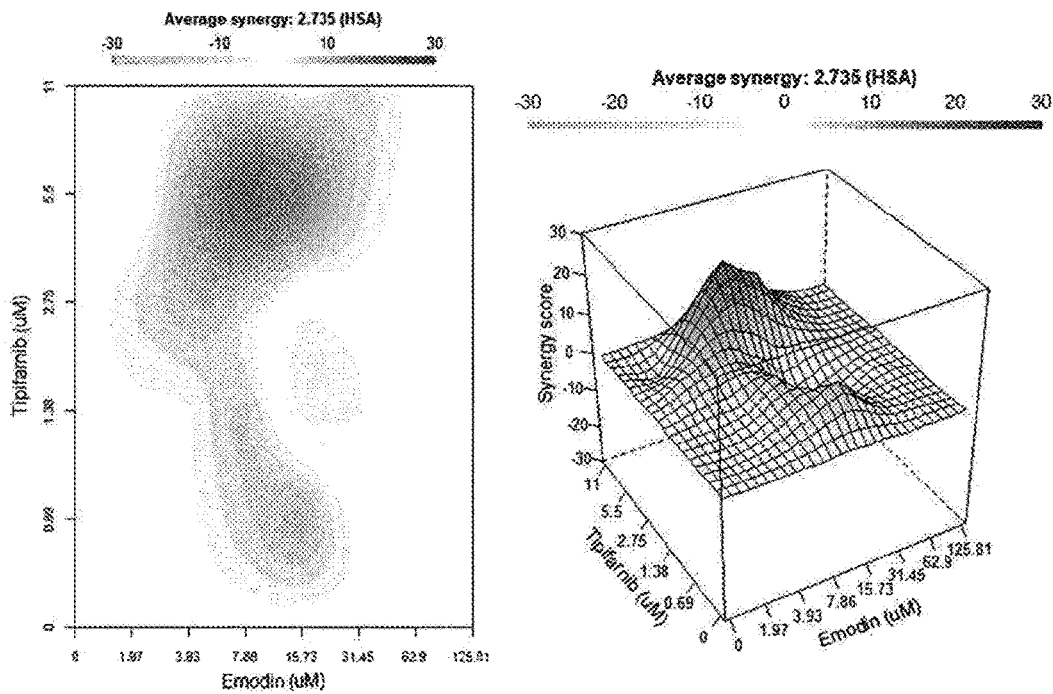
FIG. 18 shows the synergistic antiviral effect of a drug combination (tipifarnib and emodin), used in the present invention, based on the Highest Single Agent (HSA) model.
Figure 19:
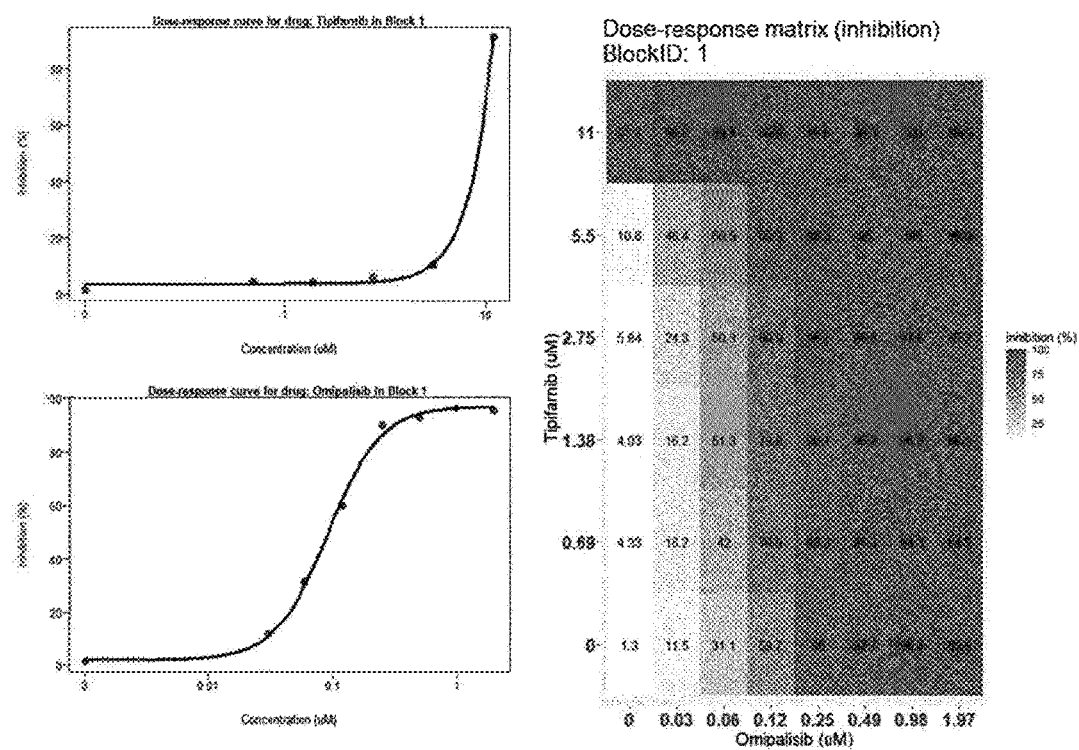
FIG. 19 shows the dose-dependent antiviral effect of a drug combination (tipifarnib and omipalisib) used in the present invention. The left shows a dose-response curve of each single drug, and the right shows a dose-response matrix depending on the dose of each single drug.
Figure 20:
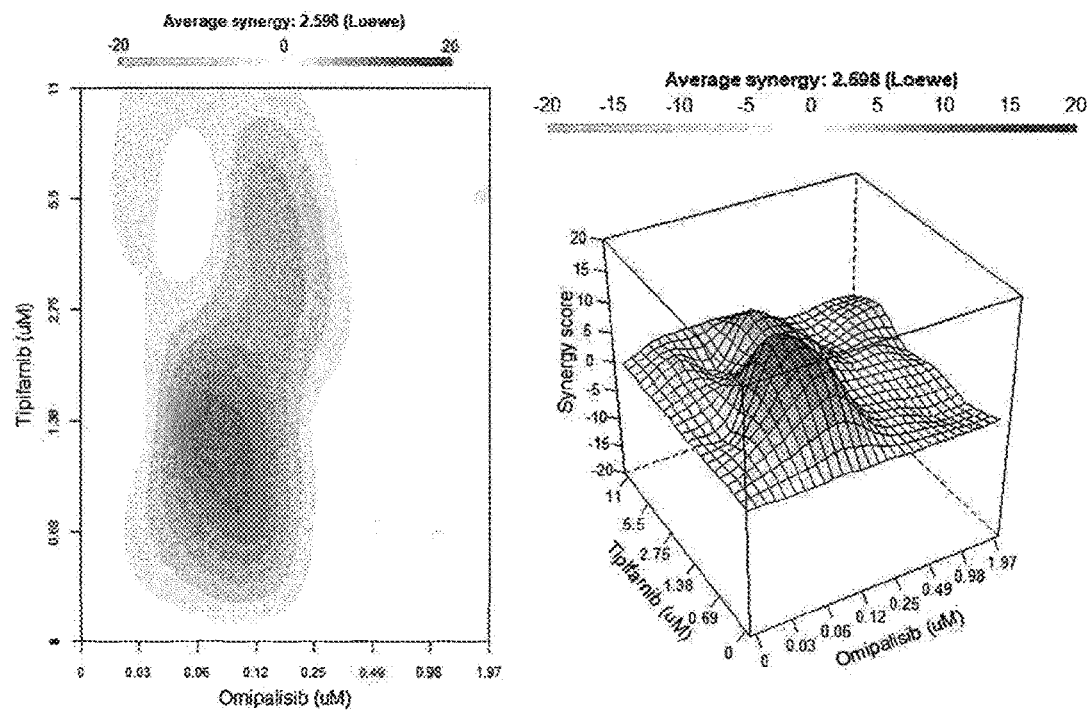
FIG. 20 shows the synergistic antiviral effect of a drug combination (tipifarnib and omipalisib), used in the present invention, based on the Loewe additivity model.

The synergistic effect of the combination of tipifarnib and emodin was found in the section where the tipifarnib concentration was 0 to 11 μM and the emodin concentration was 1.97 to 31.45 μM, based on the drug combination prediction model (FIGS. 16 to 18). In particular, in the section where the tipifarnib concentration was 5.5 μM and the emodin concentration was 8 μM, the antiviral activity improved by 20% compared to the expected effect of the drug combination prediction model (FIGS. 16 to 18).

Figure 21:
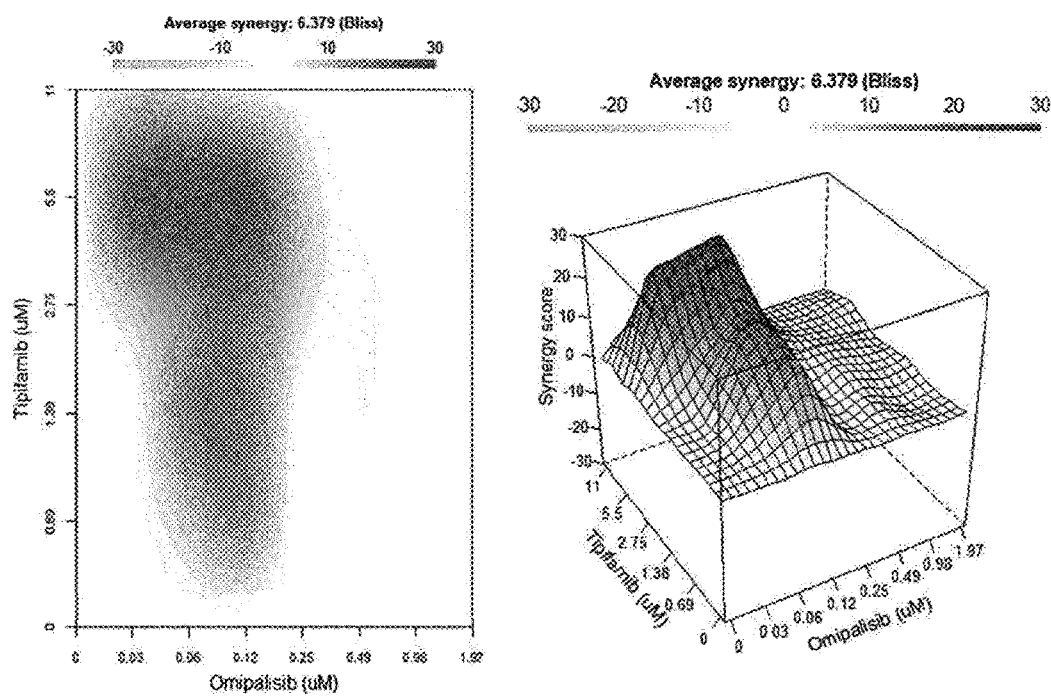
FIG. 21 shows the synergistic antiviral effect of a drug combination (tipifarnib and omipalisib), used in the present invention, based on the Bliss independence model.
Figure 22:
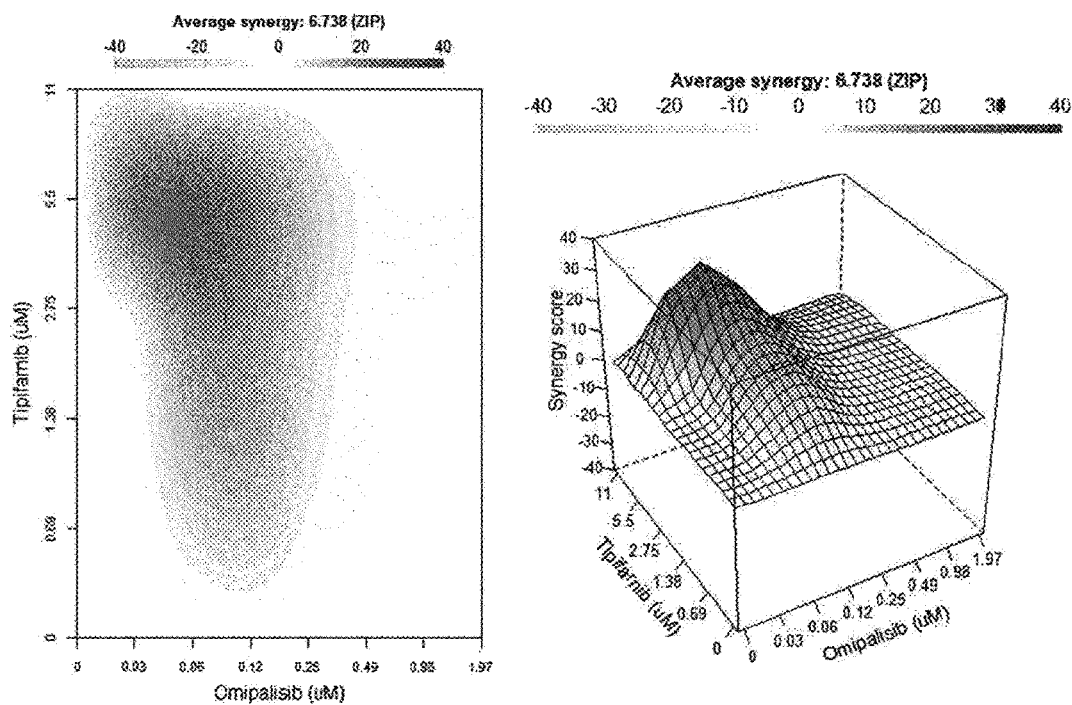
FIG. 22 shows the synergistic antiviral effect of a drug combination (tipifarnib and omipalisib), used in the present invention, based on the Zero Interaction Potency (ZIP) model.
Figure 23:
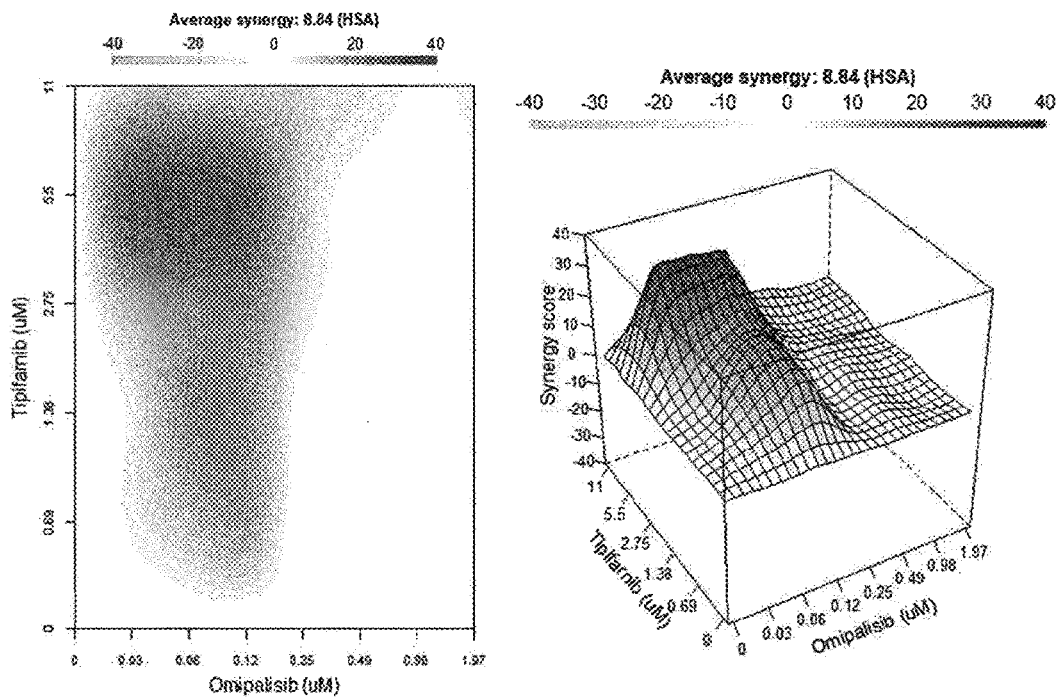
FIG. 23 shows the synergistic antiviral effect of a drug combination (tipifarnib and omipalisib), used in the present invention, based on the Highest Single Agent (HSA) model.
Figure 24:
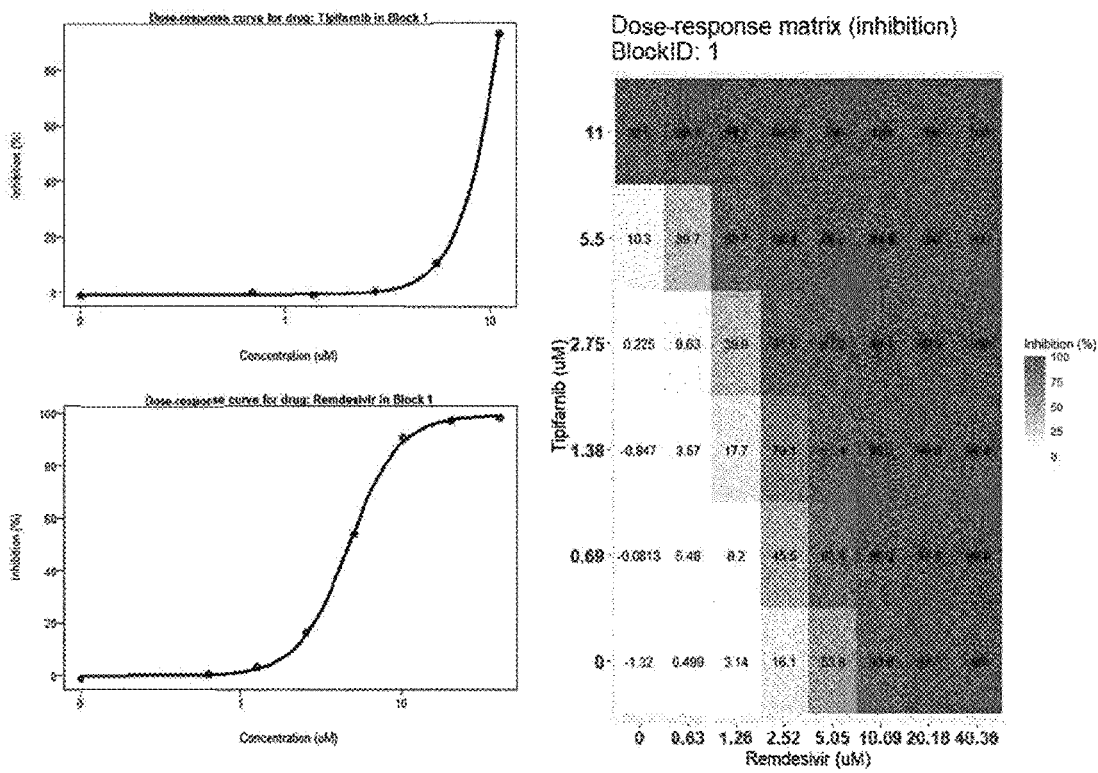
FIG. 24 shows the dose-dependent antiviral effect of a drug combination (tipifarnib and remdesivir) used in the present invention. The left shows a dose-response curve of each single drug, and the right shows a dose-response matrix depending on the dose of each single drug.
Figure 25:
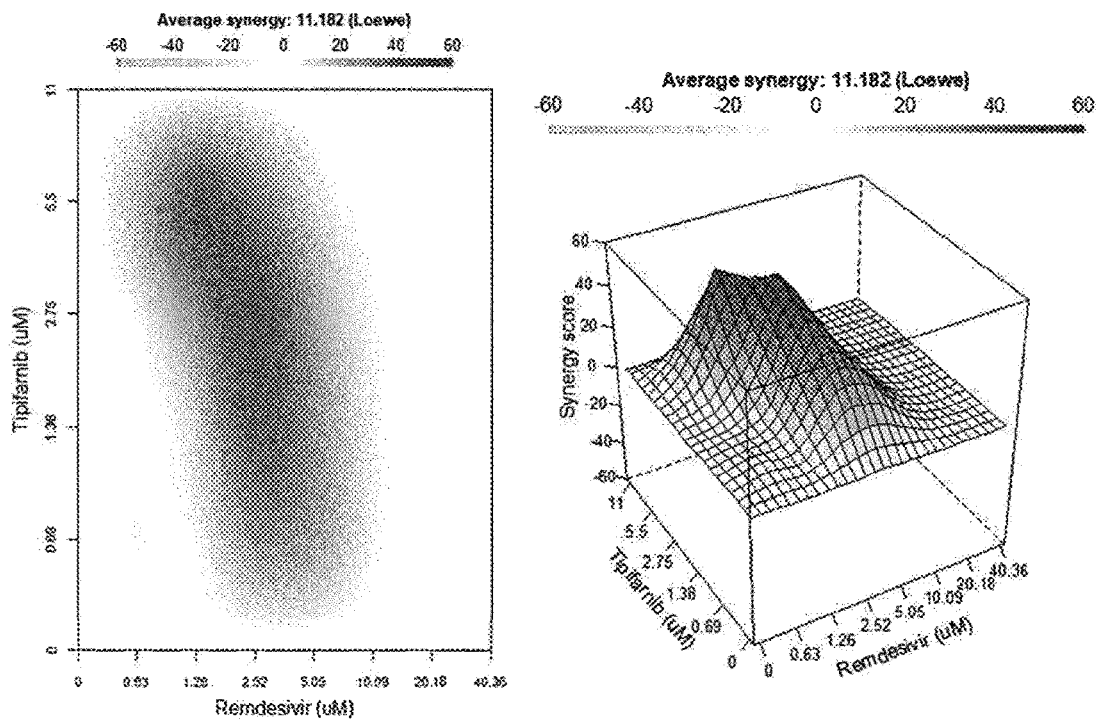
FIG. 25 shows the synergistic antiviral effect of a drug combination (tipifarnib and remdesivir), used in the present invention, based on the Loewe additivity model.

The synergistic effect of the combination of tipifarnib and omipalisib was found in the section where the tipifarnib concentration was 0 to 11 μM and the omipalisib concentration was 0.5 μM or less, based on the drug combination prediction model (FIGS. 20 to 23). In particular, in the section where the tipifarnib concentration was 5.5 μM and the omipalisib concentration was around 0.06 μM, the antiviral activity improved by 30% compared to the expected effect of the drug combination prediction model (FIGS. 21 to 23).

Figure 26:
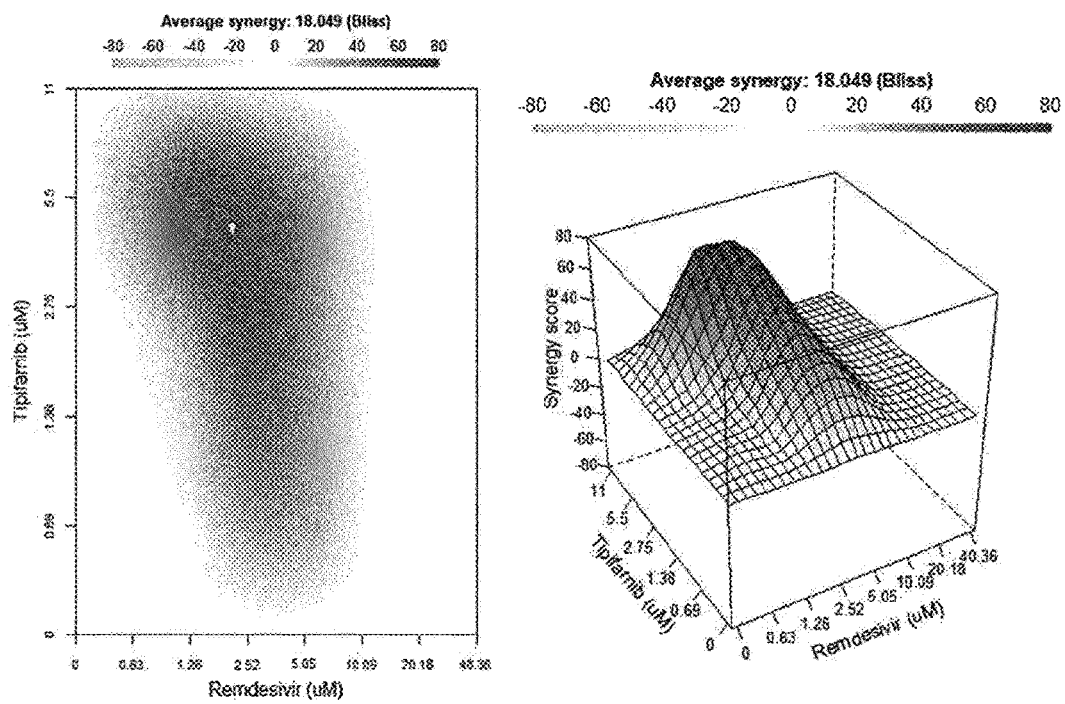
FIG. 26 shows the synergistic antiviral effect of a drug combination (tipifarnib and remdesivir), used in the present invention, based on the Bliss independence model.
Figure 27:
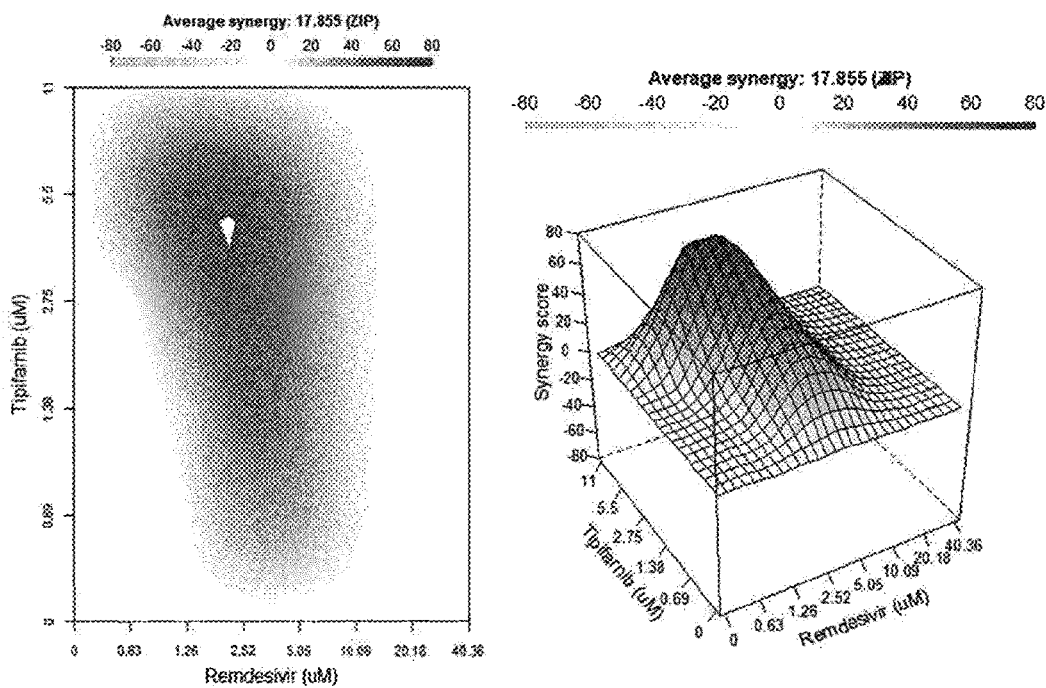
FIG. 27 shows the synergistic antiviral effect of a drug combination (tipifarnib and remdesivir), used in the present invention, based on the Zero Interaction Potency (ZIP) model.
Figure 28:
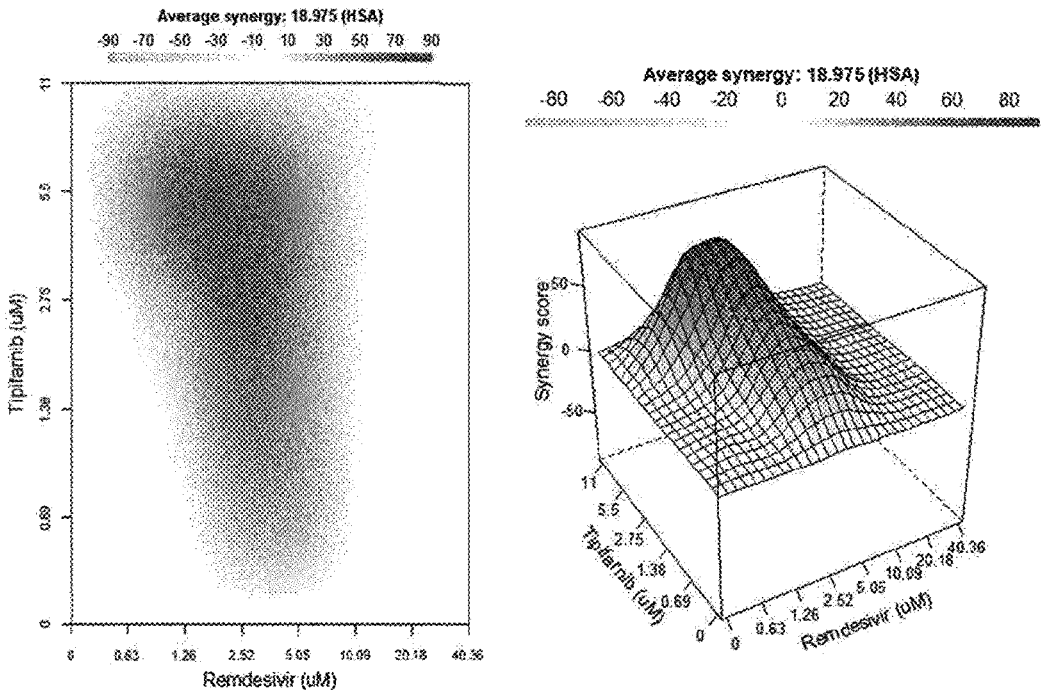
FIG. 28 shows the synergistic antiviral effect of a drug combination (tipifarnib and remdesivir), used in the present invention, based on the Highest Single Agent (HSA) model.
Figure 29:
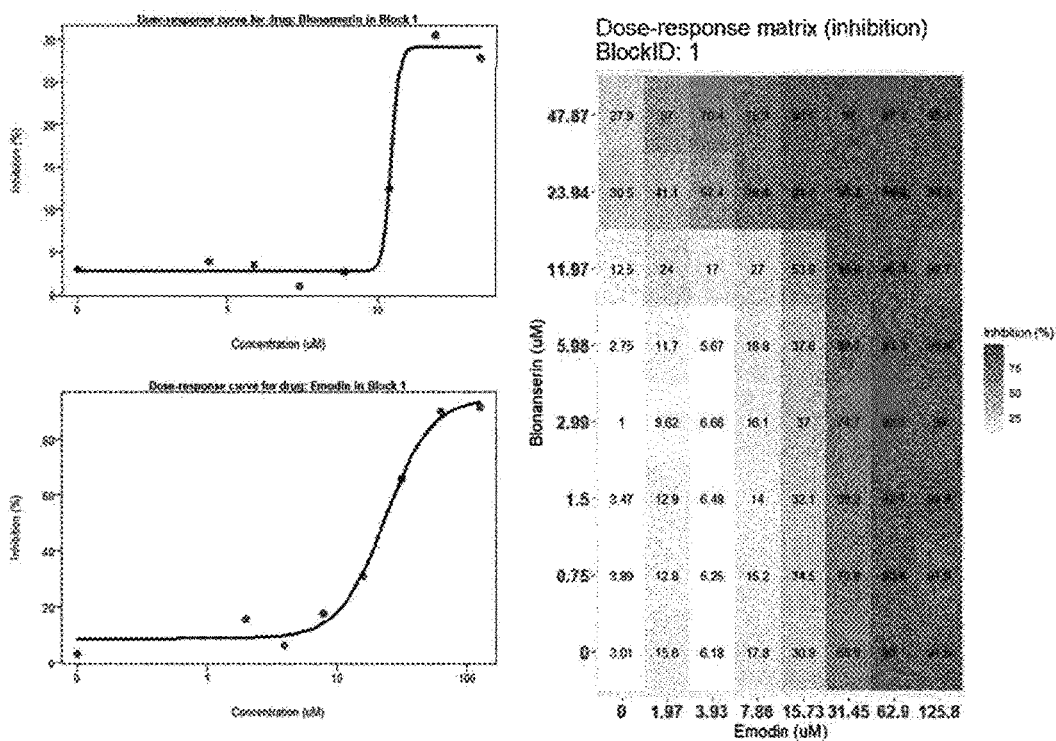
FIG. 29 shows the dose-dependent antiviral effect of a drug combination (blonanserin and emodin) used in the present invention. The left shows a dose-response curve of each single drug, and the right shows a dose-response matrix depending on the dose of each single drug.
Figure 30:
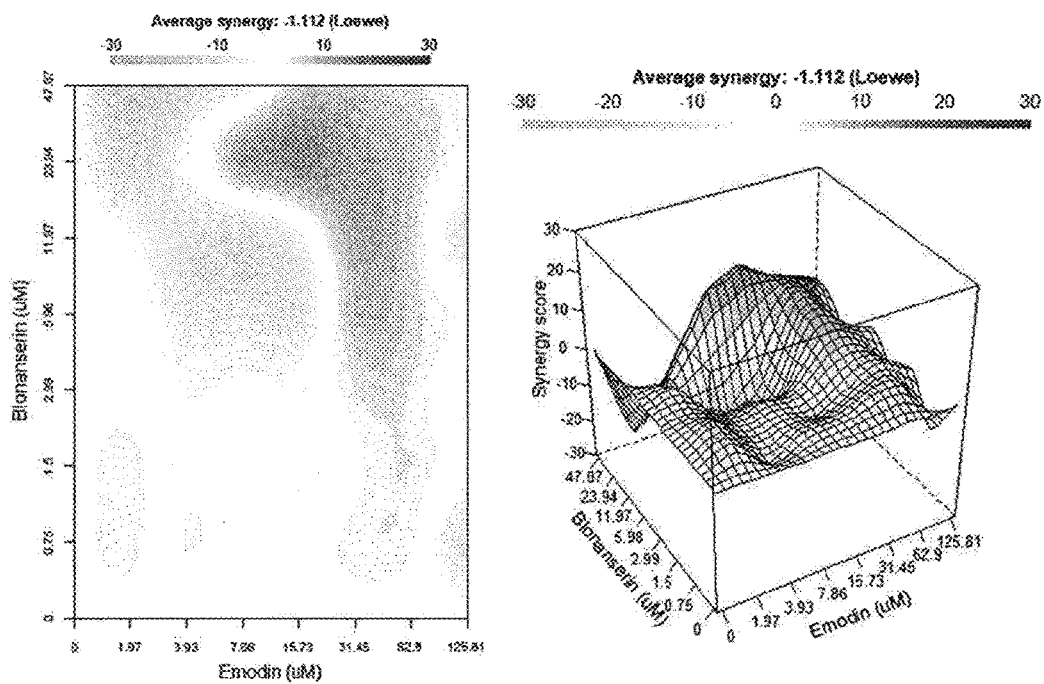
FIG. 30 shows the synergistic antiviral effect of a drug combination (blonanserin and emodin), used in the present invention, based on the Loewe additivity model.
Figure 31:
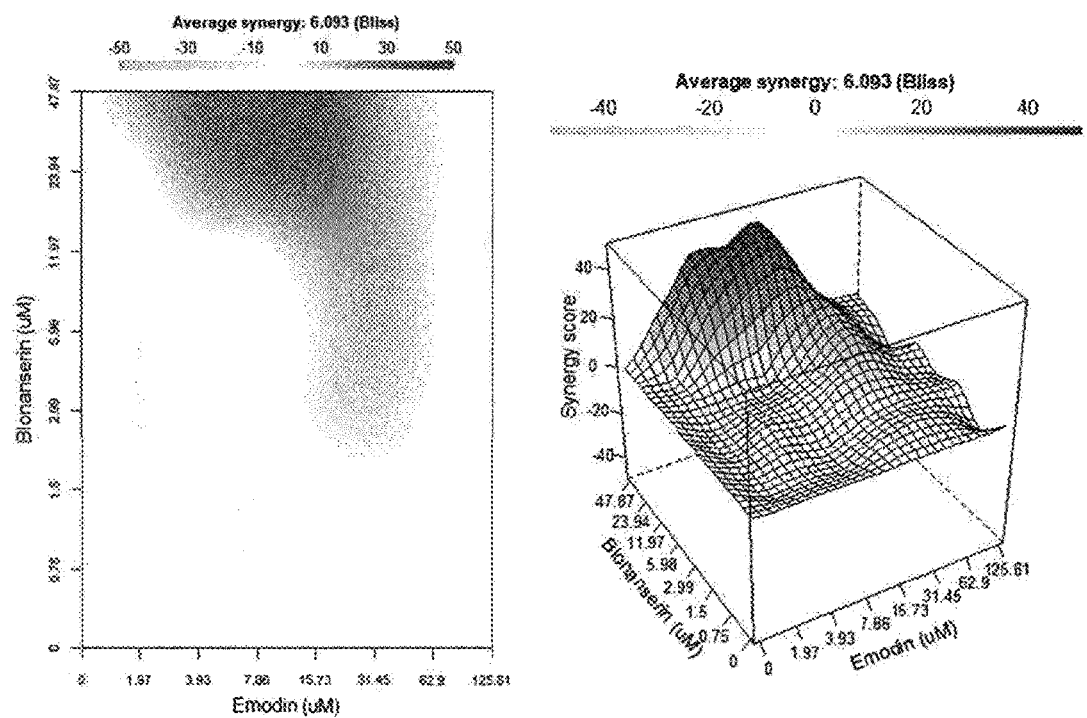
FIG. 31 shows the synergistic antiviral effect of a drug combination (blonanserin and emodin), used in the present invention, based on the Bliss independence model.
Figure 32:
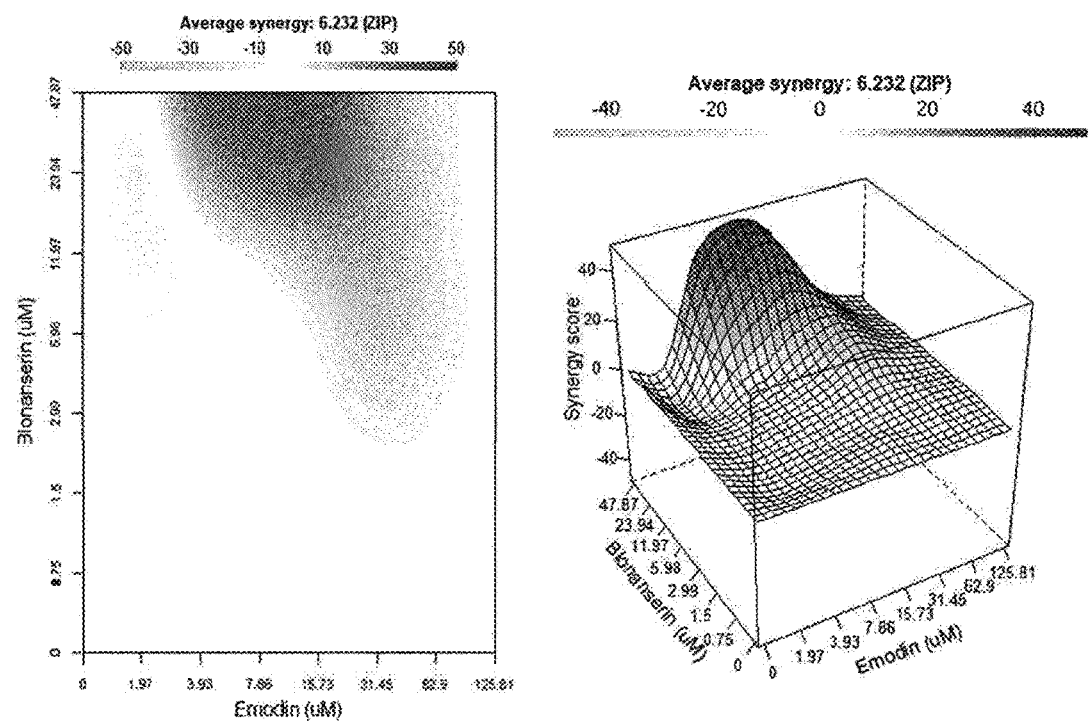
FIG. 32 shows the synergistic antiviral effect of a drug combination (blonanserin and emodin), used in the present invention, based on the Zero Interaction Potency (ZIP) model.

The synergistic effect of the combination of tipifarnib and remdesivir was found in the section where the tipifarnib concentration was 0 to 11 μM and the remdesivir concentration was 0 to 20 μM, based on the drug combination prediction model (FIGS. 25 to 28). In particular, in the section where the tipifarnib concentration was 5.5 μM and the remdesivir concentration was around 2.5 μM, the antiviral activity improved by 60% compared to the expected effect of the drug combination prediction model (FIGS. 26 to 28).

Figure 33:
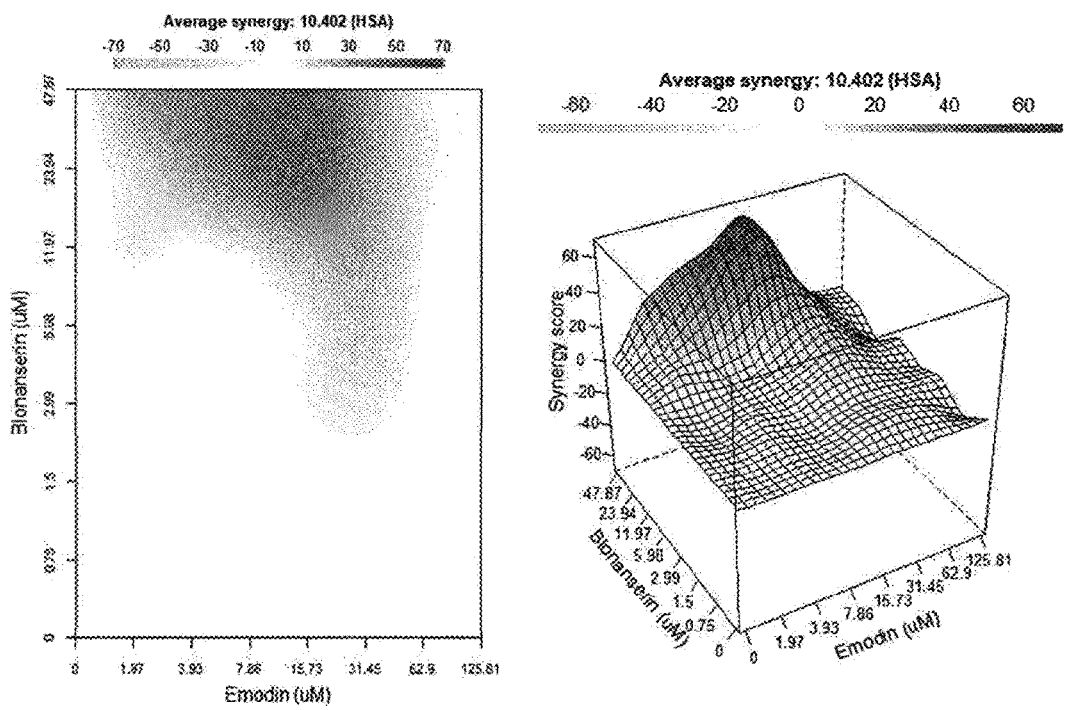
FIG. 33 shows the synergistic antiviral effect of a drug combination (blonanserin and emodin), used in the present invention, based on the Highest Single Agent (HSA) model.
Figure 34:
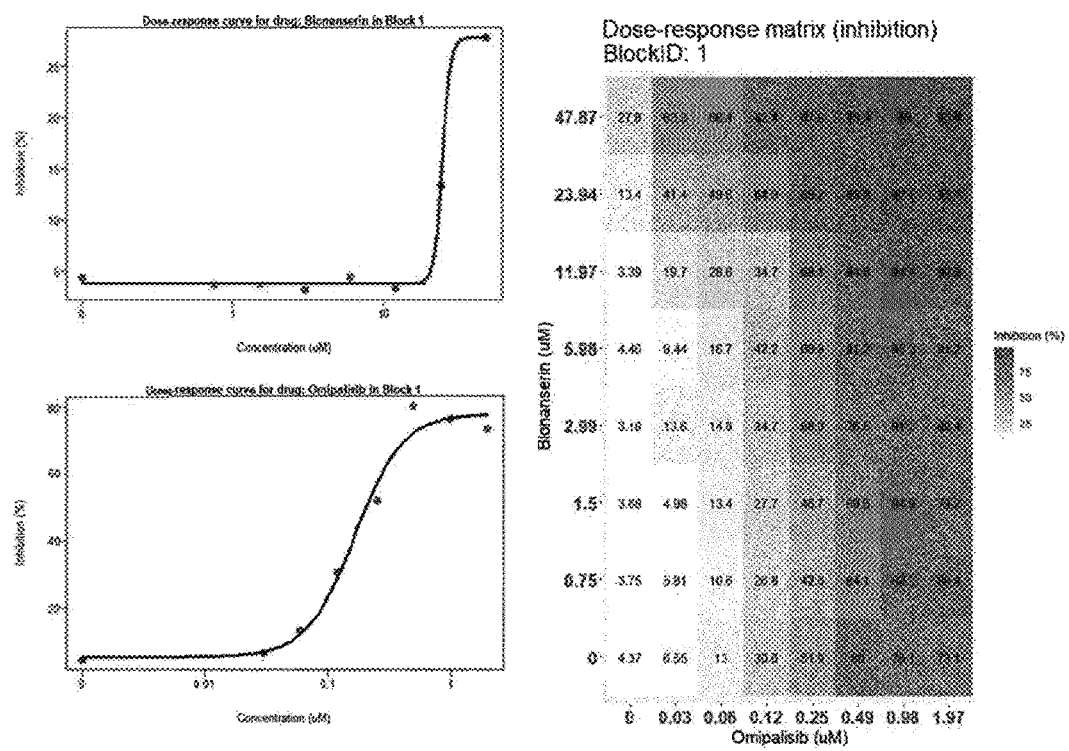
FIG. 34 shows the dose-dependent antiviral effects of a drug combination (blonanserin and omipalisib) used in the present invention. The left shows a dose-response curve of each single drug, and the right shows a dose-response matrix depending on the dose of each single drug.
Figure 35:
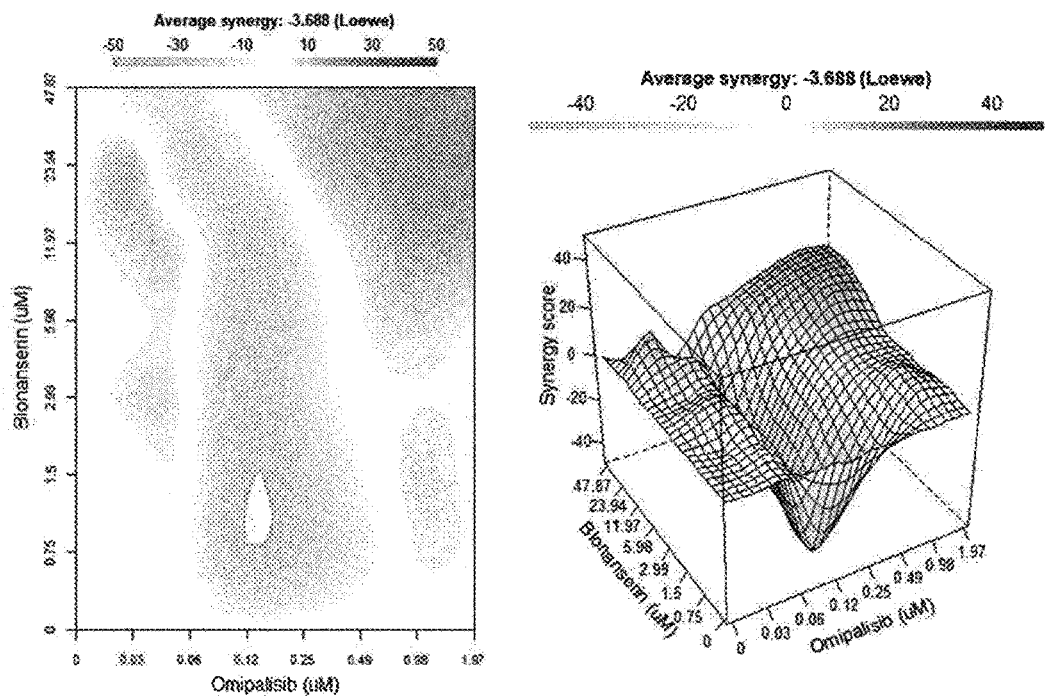
FIG. 35 shows the synergistic antiviral effect of a drug combination (blonanserin and omipalisib), used in the present invention, based on the Loewe additivity model.

The synergistic effect of the combination of blonanserin and emodin was found in the section where the blonanserin concentration was 5.98 to 47.87 μM and the emodin concentration was 0 to 62.9 μM, based on the drug combination prediction model (FIG. 33). In particular, in the section where the blonanserin concentration was around 25 μM and the emodin concentration was around 15, the antiviral activity improved by 60% compared to the expected effect of the drug combination prediction model (FIG. 33).

Figure 36:
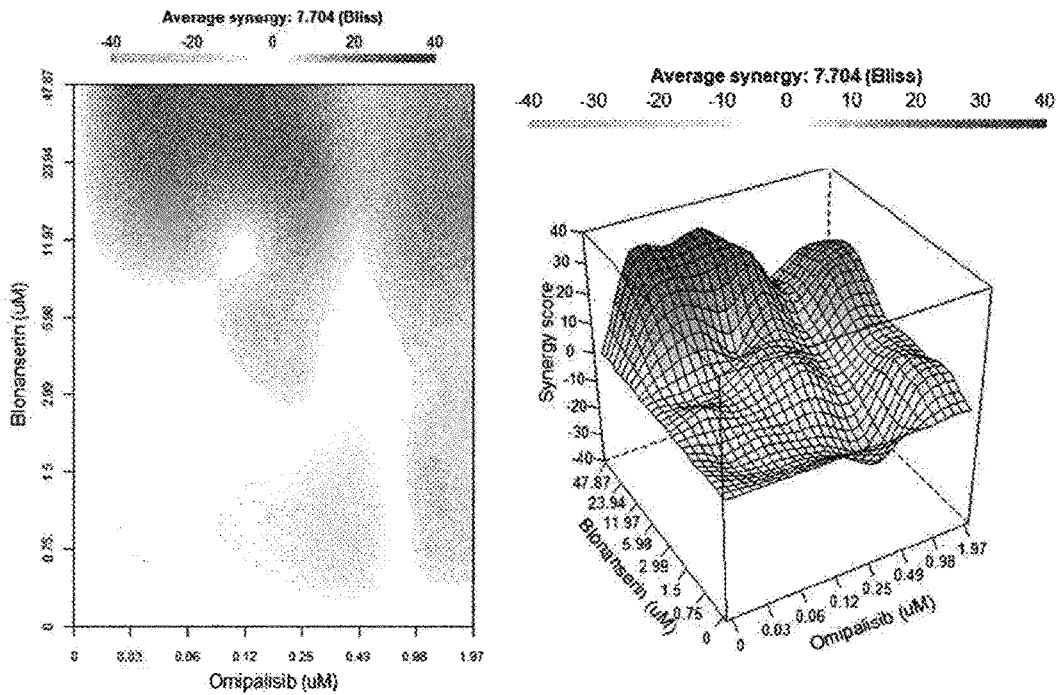
FIG. 36 shows the synergistic antiviral effect of a drug combination (blonanserin and omipalisib), used in the present invention, based on the Bliss independence model.
Figure 37:
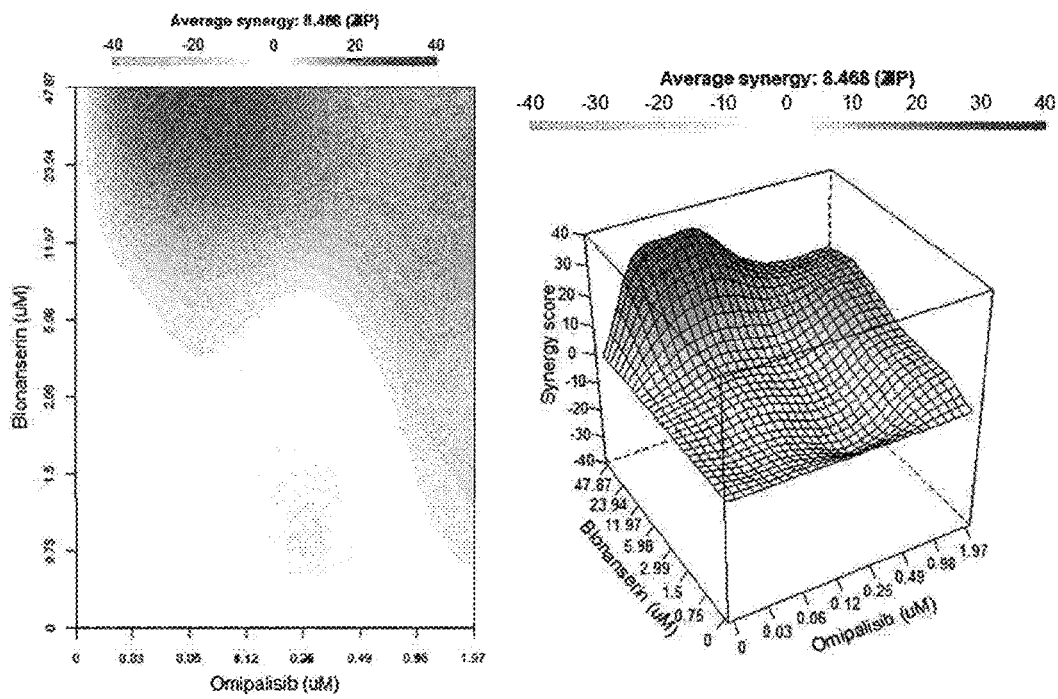
FIG. 37 shows the synergistic antiviral effect of a drug combination (blonanserin and omipalisib), used in the present invention, based on the Zero Interaction Potency (ZIP) model.
Figure 38:
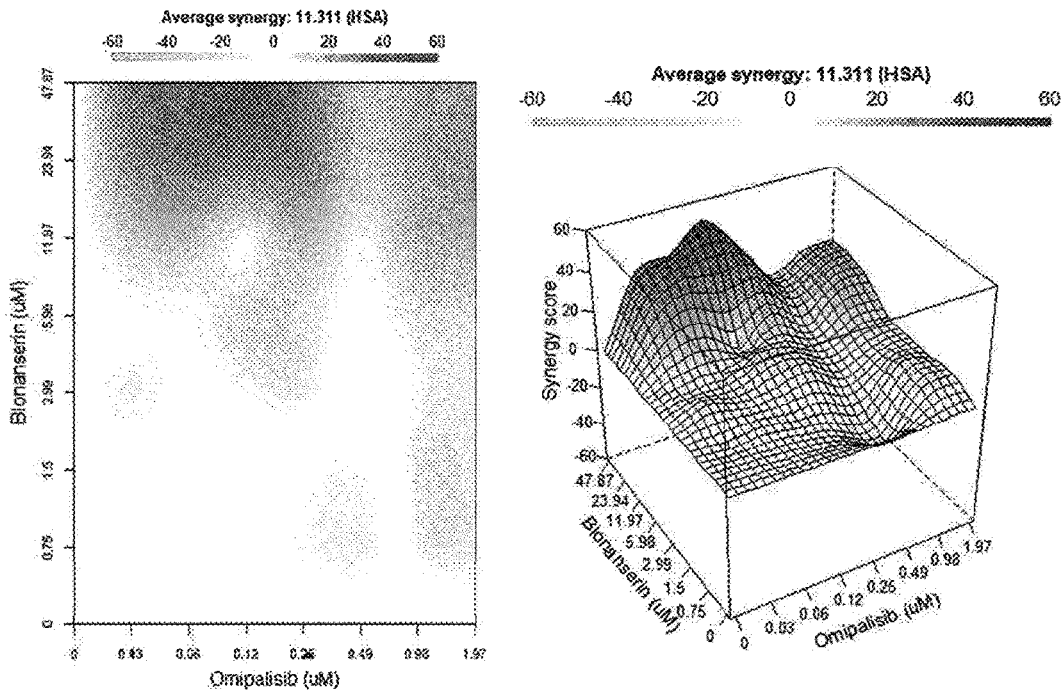
FIG. 38 shows the synergistic antiviral effect of a drug combination (blonanserin and omipalisib), used in the present invention, based on the Highest Single Agent (HSA) model.
Figure 39:
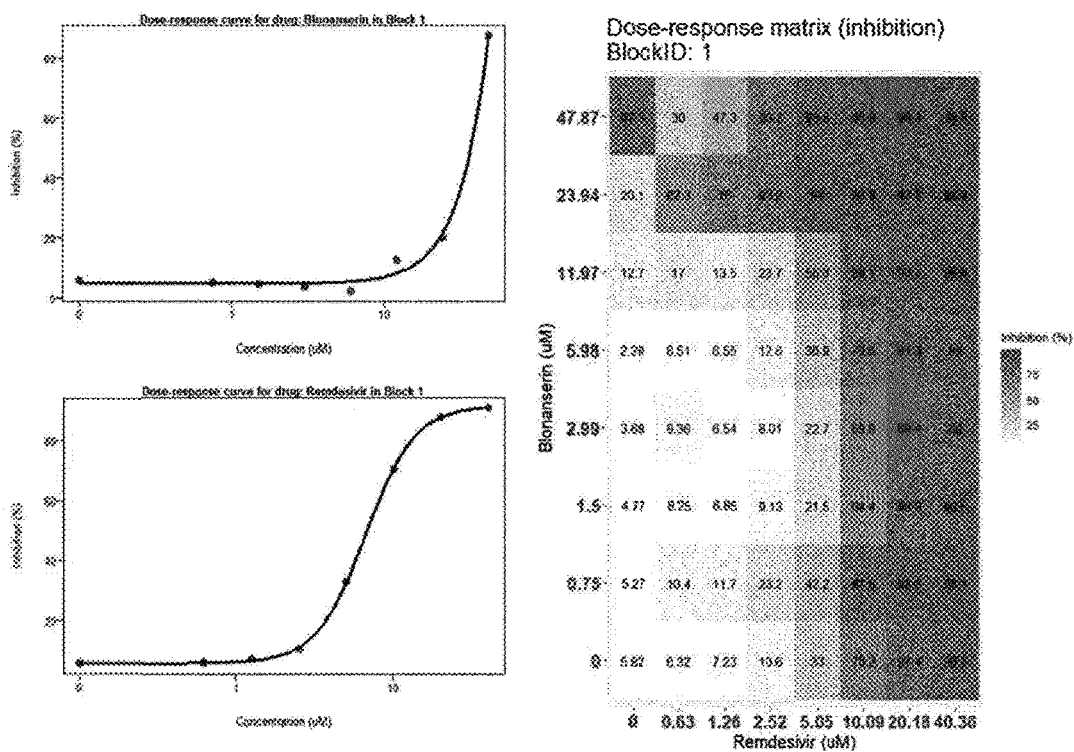
FIG. 39 shows the dose-dependent antiviral effect of a drug combination (blonanserin and remdesivir) used in the present invention. The left shows a dose-response curve of each single drug, and the right shows a dose-response matrix depending on the dose of each single drug.
Figure 40:
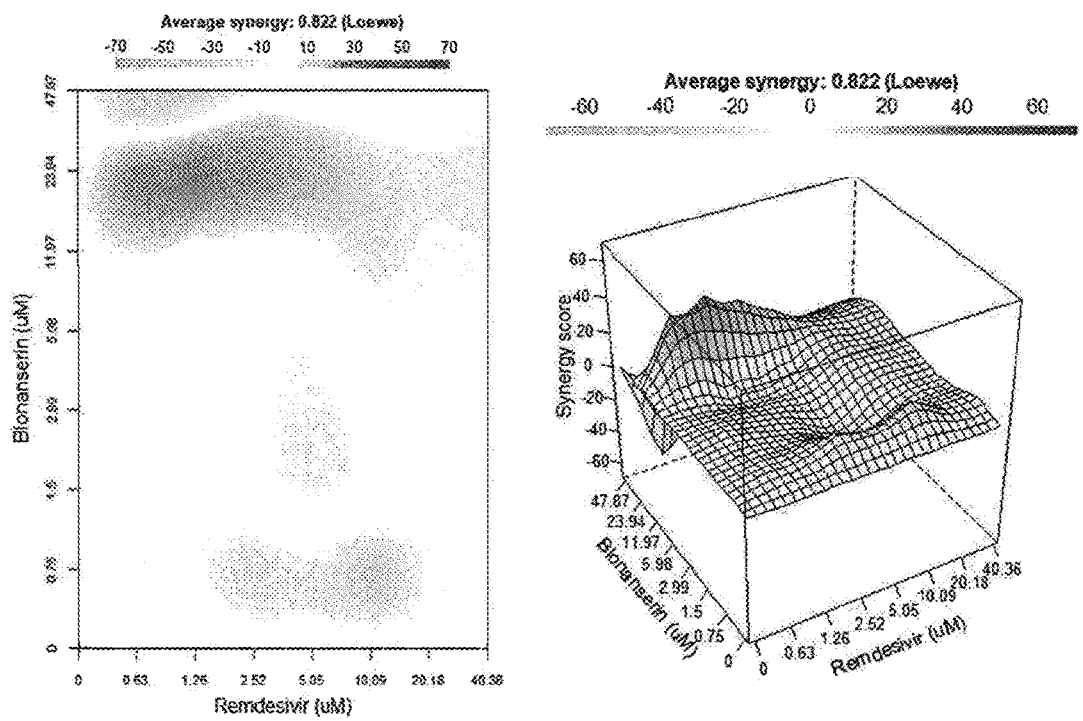
FIG. 40 shows the synergistic antiviral effect of a drug combination (blonanserin and remdesivir), used in the present invention, based on the Loewe additivity model.

The synergistic effect of the combination of blonanserin and omipalisib was found in the section where the blonanserin concentration was 2.99 to 47.87 µM and the omipalisib concentration was 0 to 1.97 µM, based on the drug combination prediction model (FIGS. 36 to 38). In particular, in the section where the blonanserin concentration was around 40 µM and the omipalisib concentration was around 0.12 µM, the antiviral activity improved by 30 to 60% compared to the expected effect of the drug combination prediction model (FIGS. 36 to 38).

Figure 41:
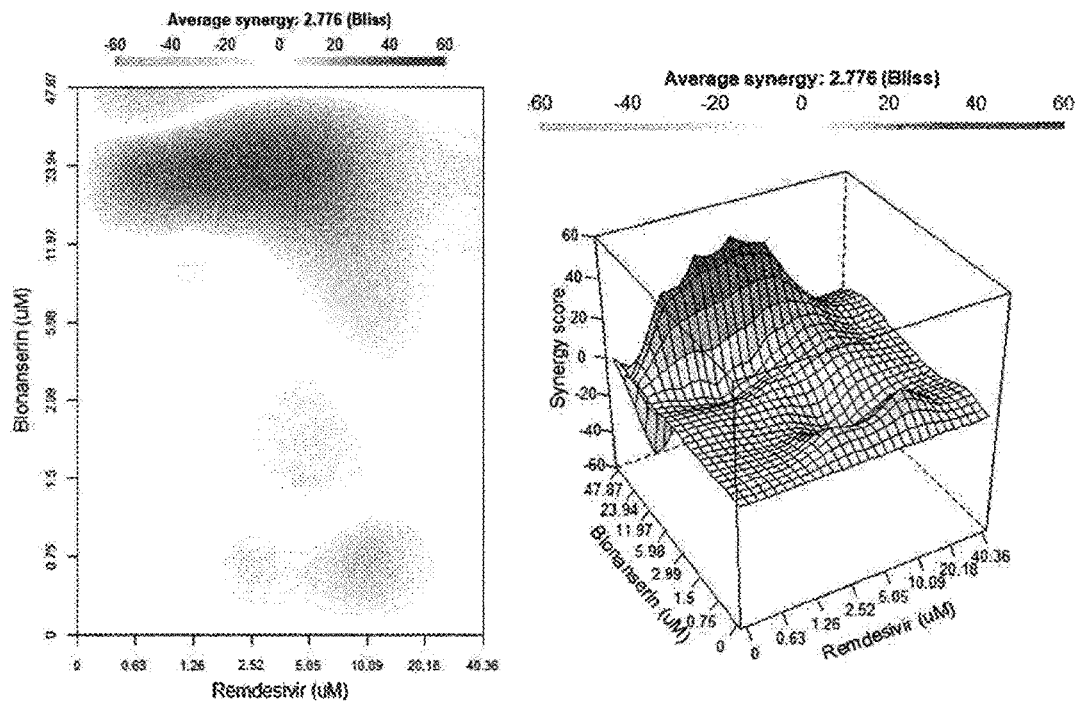
FIG. 41 shows the synergistic antiviral effect of a drug combination (blonanserin and remdesivir), used in the present invention, based on the Bliss independence model.
Figure 42:
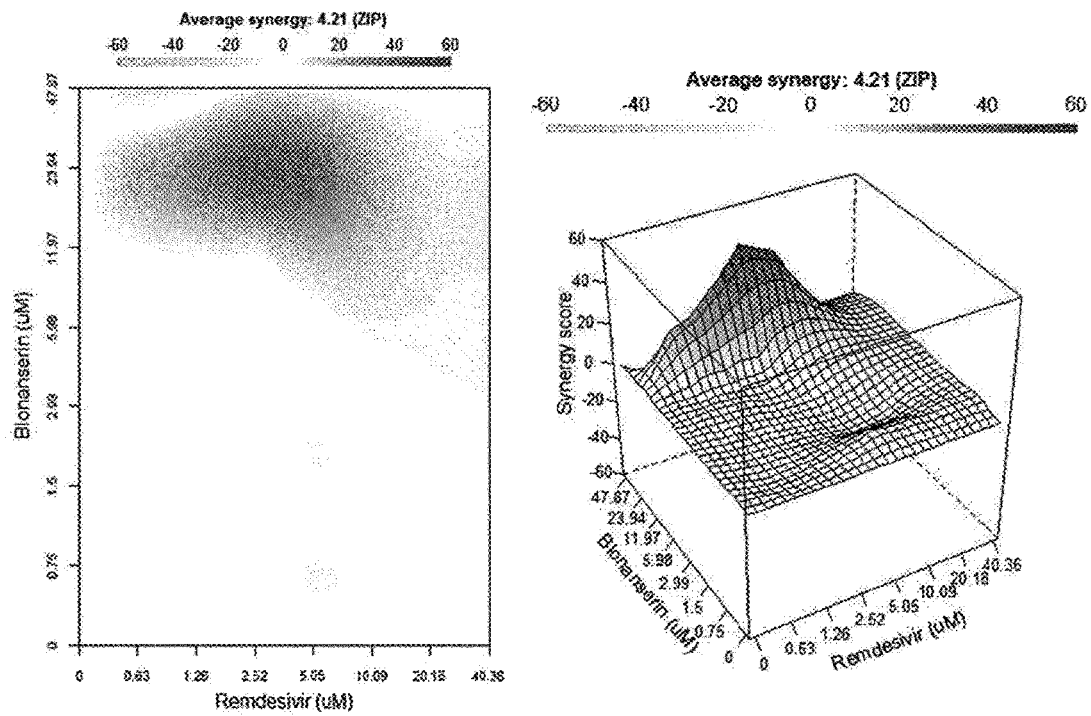
FIG. 42 shows the synergistic antiviral effect of a drug combination (blonanserin and remdesivir), used in the present invention, based on the Zero Interaction Potency (ZIP) model.
Figure 43:
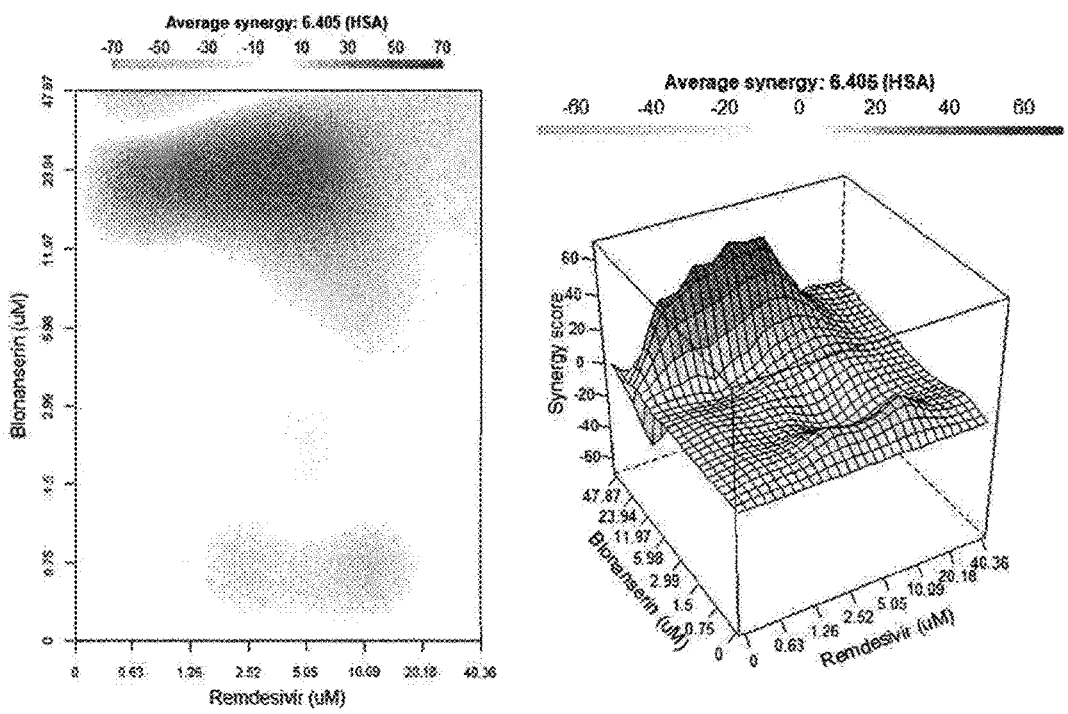
FIG. 43 shows the synergistic antiviral effect of a drug combination (blonanserin and remdesivir), used in the present invention, based on the Highest Single Agent (HSA) model.
Figure 44:
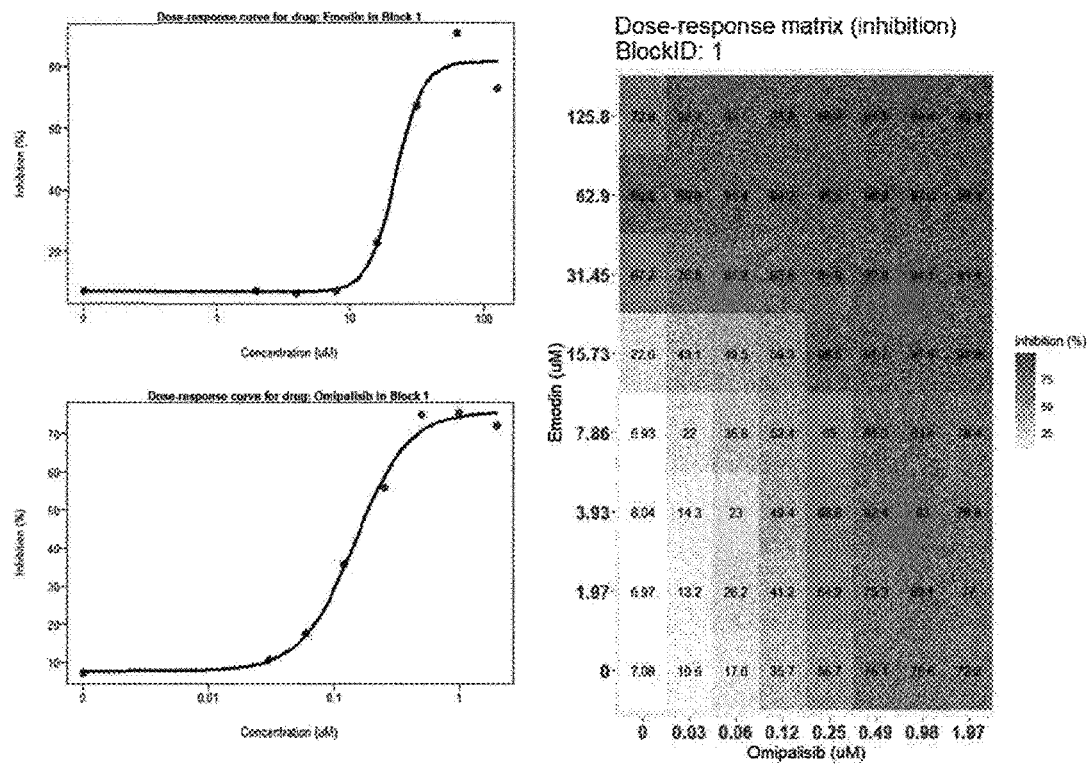
FIG. 44 shows the dose-dependent antiviral effect of a drug combination (emodin and omipalisib) used in the present invention. The left shows a dose-response curve of each single drug, and the right shows a dose-response matrix depending on the dose of each single drug.
Figure 45:
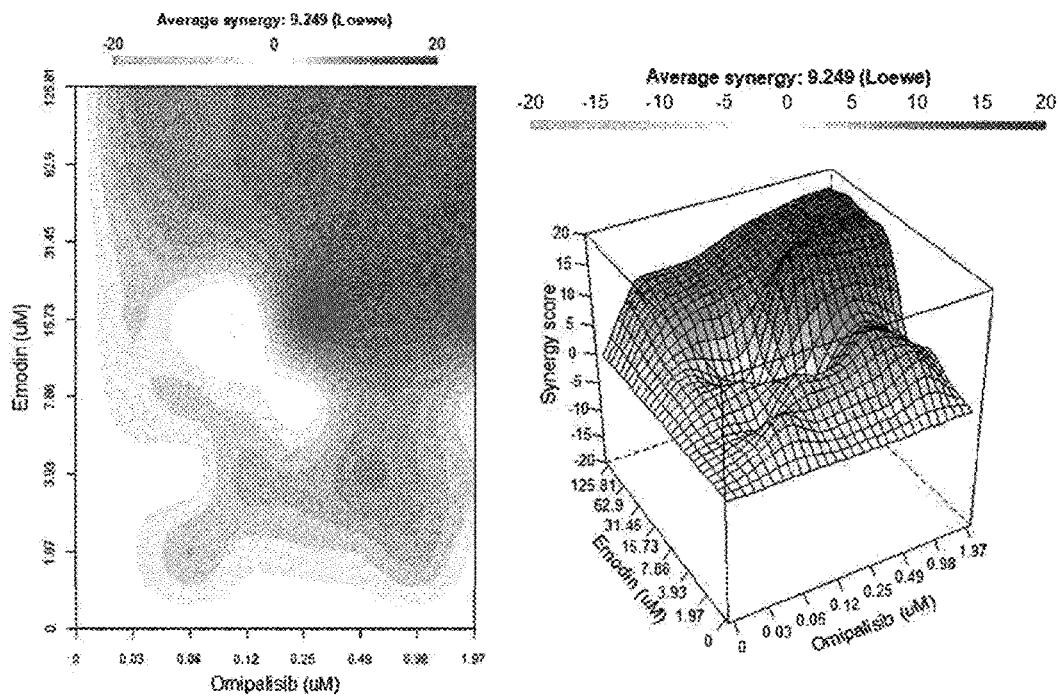
FIG. 45 shows the synergistic antiviral effect of a drug combination (emodin and omipalisib), used in the present invention, based on the Loewe additivity model.
Figure 46:
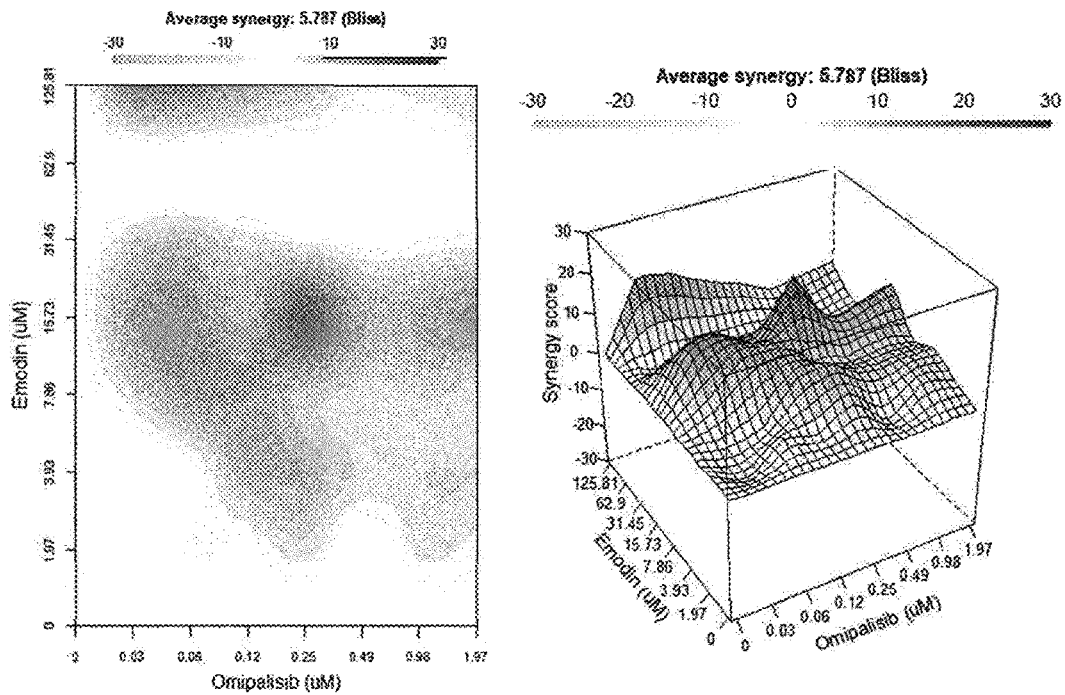
FIG. 46 shows the synergistic antiviral effect of a drug combination (emodin and omipalisib), used in the present invention, based on the Bliss independence model.
Figure 47:
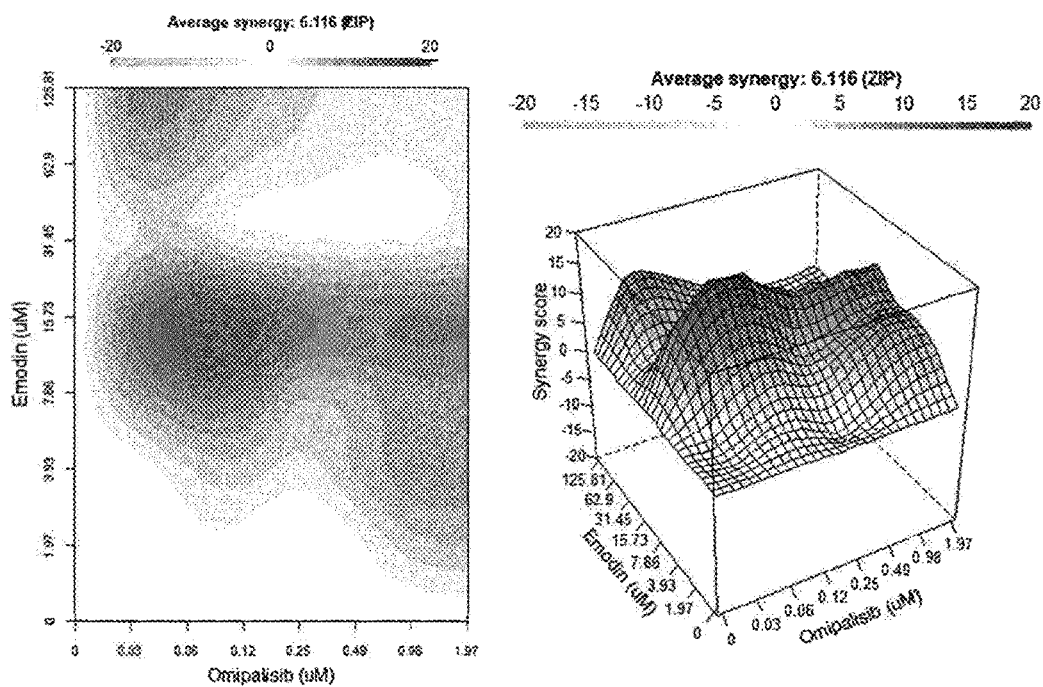
FIG. 47 shows the synergistic antiviral effect of a drug combination (emodin and omipalisib), used in the present invention, based on the Zero Interaction Potency (ZIP) model.

The synergistic effect of the combination of blonanserin and remdesivir was found in the section where the blonanserin concentration was 5.98 to 47.87 µM and the remdesivir concentration was 0 to 40.36 µM, based on the drug combination prediction model (FIGS. 40 to 43). In particular, in the section where the blonanserin concentration was around 23.94 µM and the remdesivir concentration was around 2.52 µM, the antiviral activity improved by 50% compared to the expected effect of the drug combination prediction model (FIGS. 41 to 43).

Figure 48:
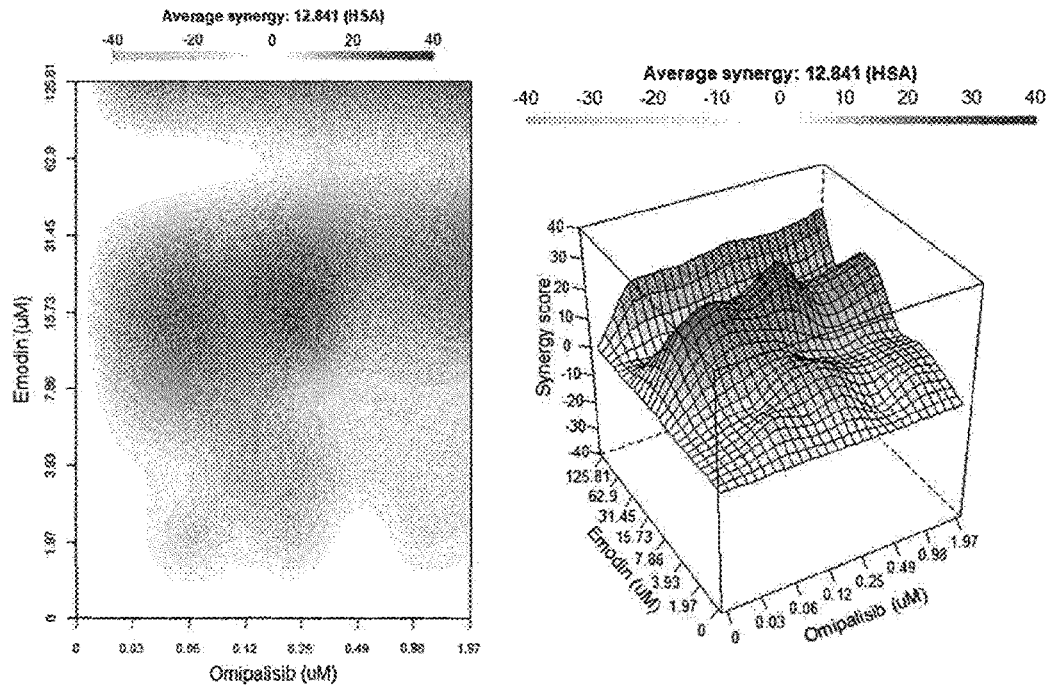
FIG. 48 shows the synergistic antiviral effect of a drug combination (emodin and omipalisib), used in the present invention, based on the Highest Single Agent (HSA) model.
Figure 49:
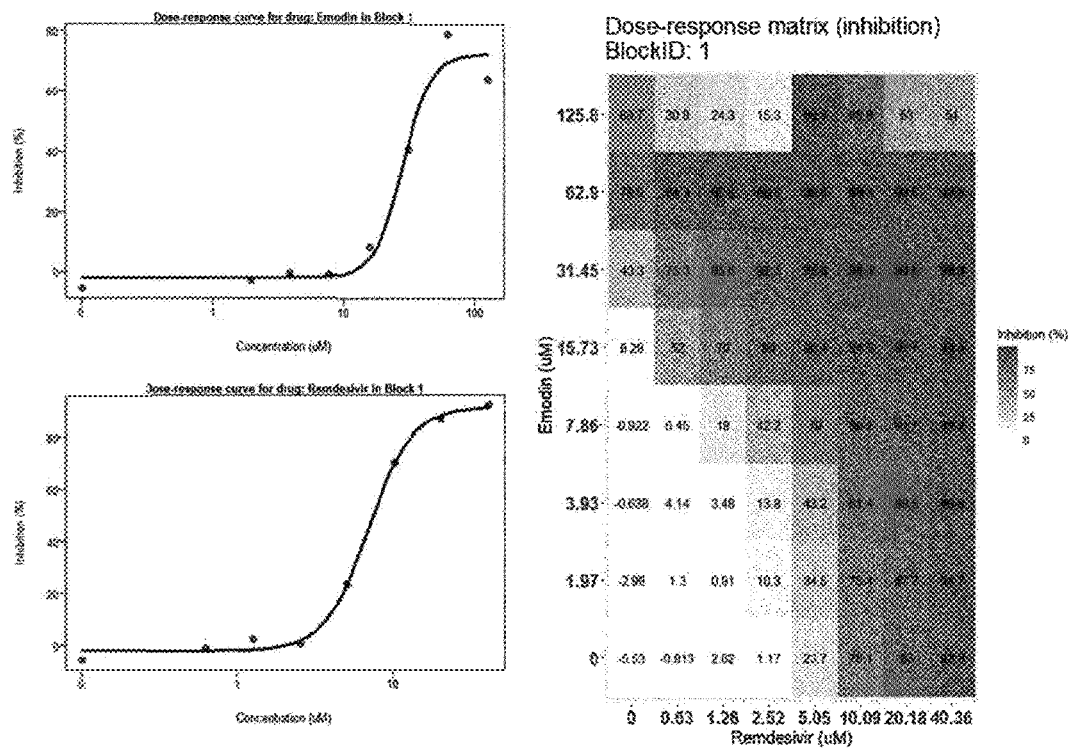
FIG. 49 shows the dose-dependent antiviral effects of a drug combination (emodin and remdesivir) used in the present invention. The left shows a dose-response curve of each single drug, and the right shows a dose-response matrix depending on the dose of each single drug.
Figure 50:
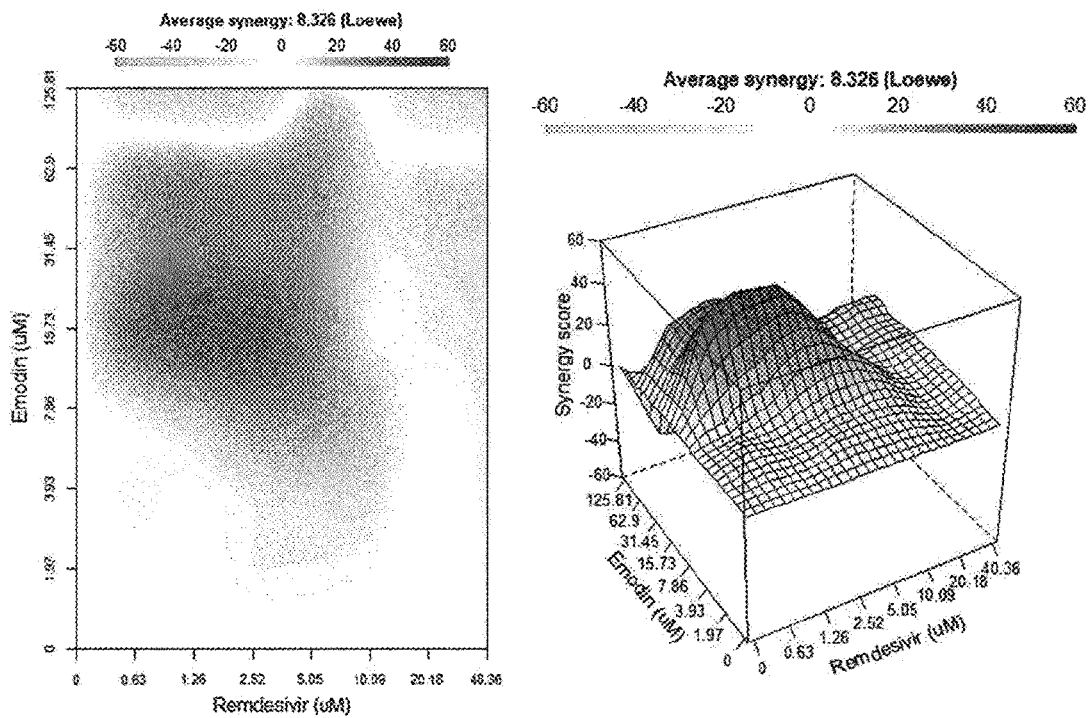
FIG. 50 shows the synergistic antiviral effect of a drug combination (emodin and remdesivir), used in the present invention, based on the Loewe additivity model.

The synergistic effect of the combination of emodin and omipalisib was found in the section where the emodin concentration was 0 to 125.81 µM and the omipalisib concentration was 0 to 1.97 µM, based on the drug combination prediction model (FIGS. 45 to 48). In particular, in the section where the emodin concentration was around 15 µM and the omipalisib concentration was around 0.25 µM, the antiviral activity improved by 40% compared to the expected effect of the drug combination prediction model (FIG. 48).

Figure 51:
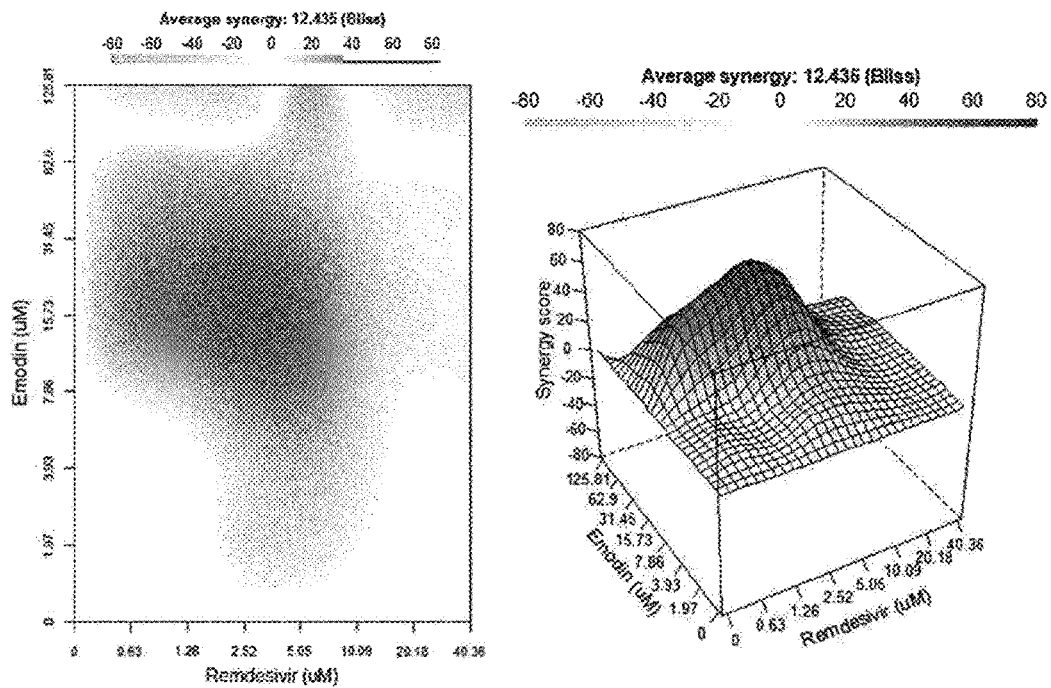
FIG. 51 shows the synergistic antiviral effect of a drug combination (emodin and remdesivir), used in the present invention, based on the Bliss independence model.
Figure 52:
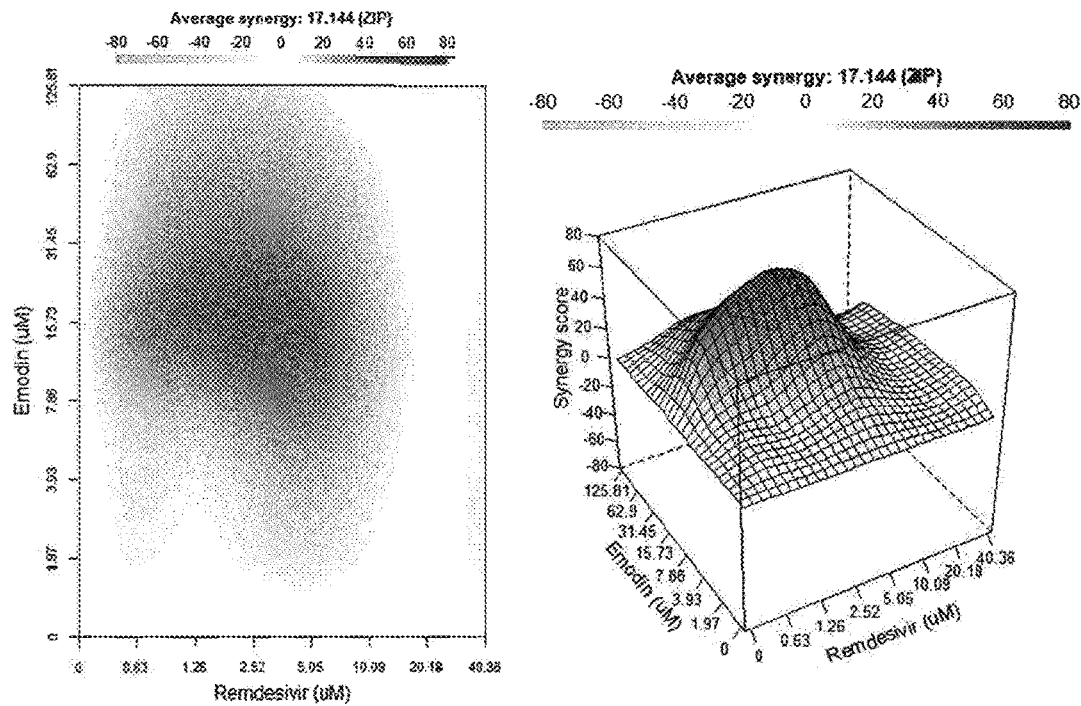
FIG. 52 shows the synergistic antiviral effect of a drug combination (emodin and remdesivir), used in the present invention, based on the Zero Interaction Potency (ZIP) model.
Figure 53:
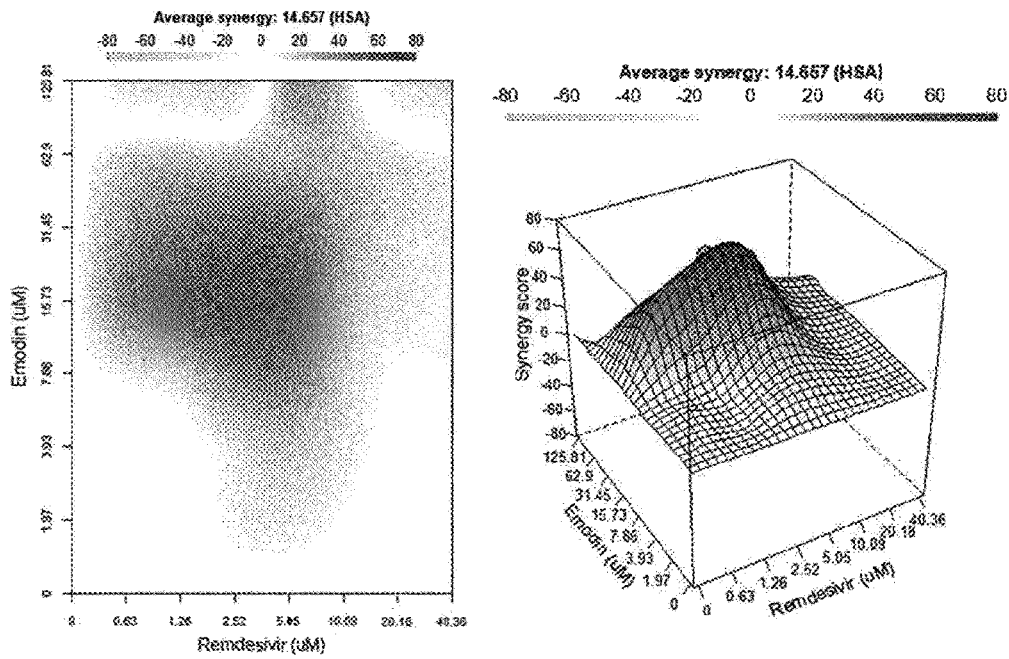
FIG. 53 shows the synergistic antiviral effect of a drug combination (emodin and remdesivir), used in the present invention, based on the Highest Single Agent (HSA) model.
Figure 54:
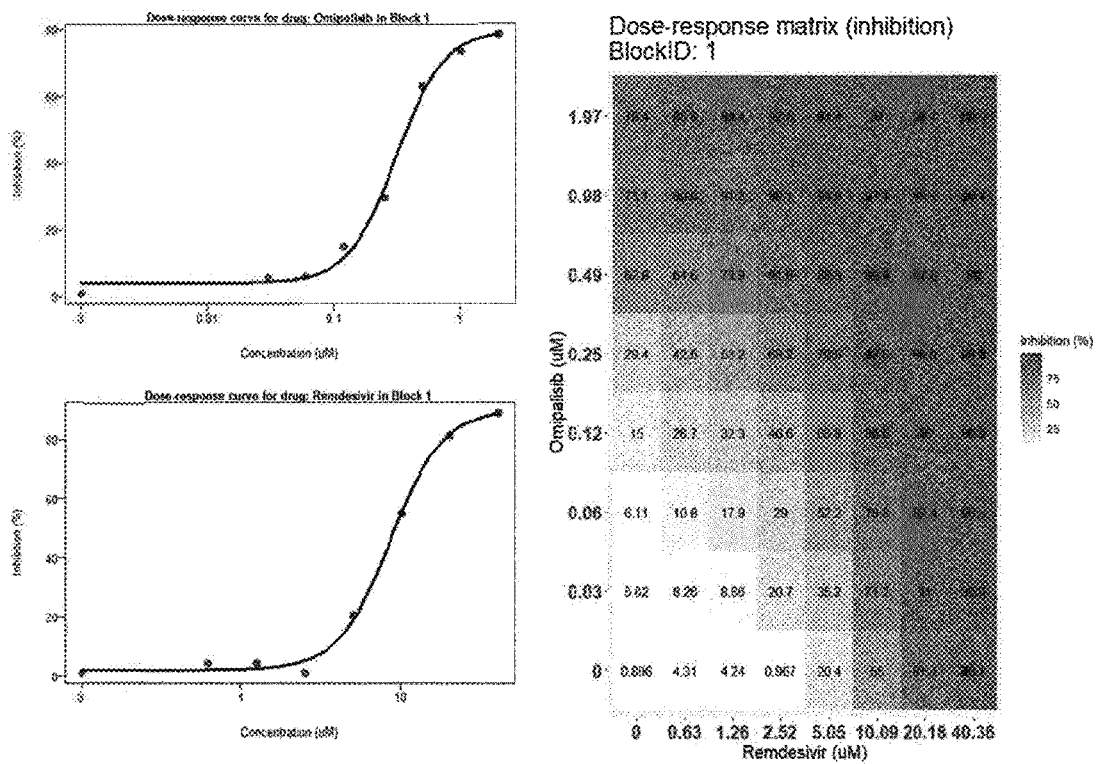
FIG. 54 shows the dose-dependent antiviral effect of a drug combination (omipalisib and remdesivir) used in the present invention. The left shows a dose-response curve of each single drug, and the right shows a dose-response matrix depending on the dose of each single drug.
Figure 55:
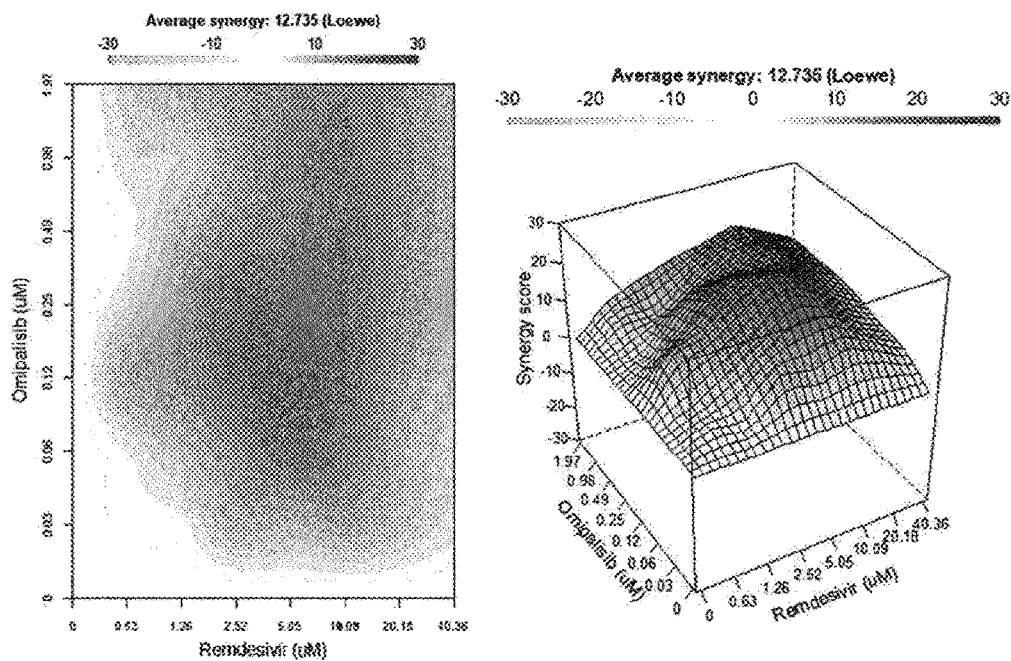
FIG. 55 shows the synergistic antiviral effect of a drug combination (omipalisib and remdesivir), used in the present invention, based on the Loewe additivity model.

The synergistic effect of the combination of emodin and remdesivir was found in the section where the emodin concentration was 0 to 125.81 µM and the remdesivir concentration was 0 to 40.36 µM based on the drug combination prediction model (FIGS. 50 to 53). In particular, in the section where the emodin concentration was around 15 µM and the remdesivir concentration was around 4 µM, the antiviral activity improved by 60% to 80% compared to the expected effect of the drug combination prediction model (FIGS. 51 to 53).

Figure 56:
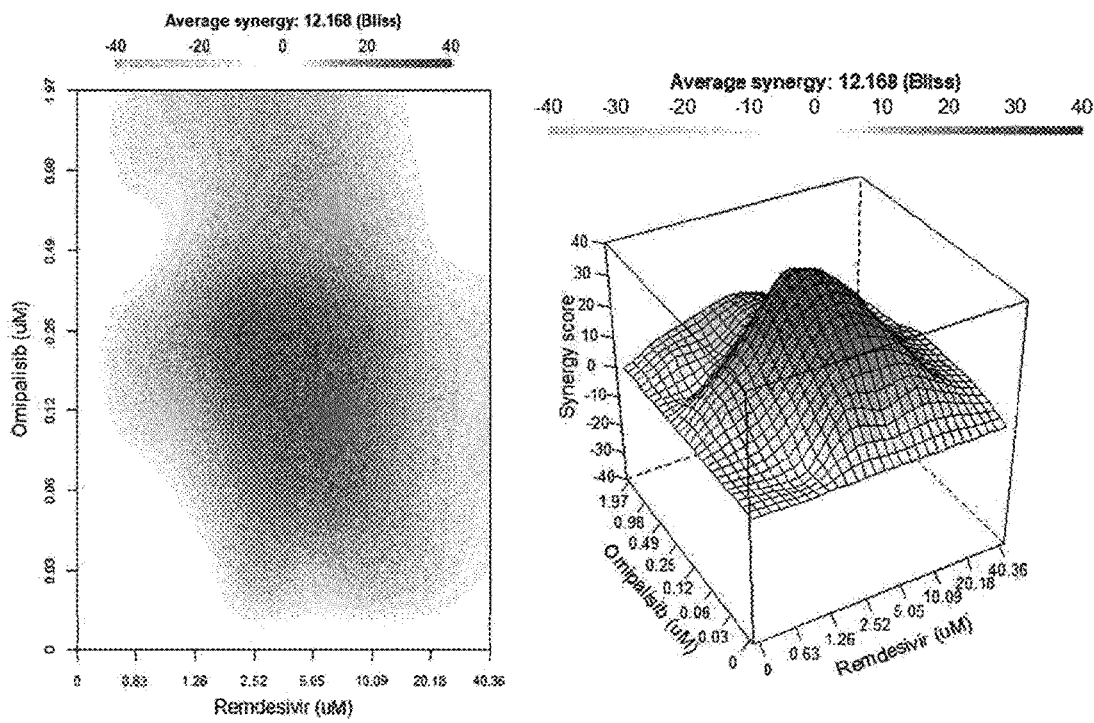
FIG. 56 shows the synergistic antiviral effect of a drug combination (omipalisib and remdesivir), used in the present invention, based on the Bliss independence model.
Figure 57:
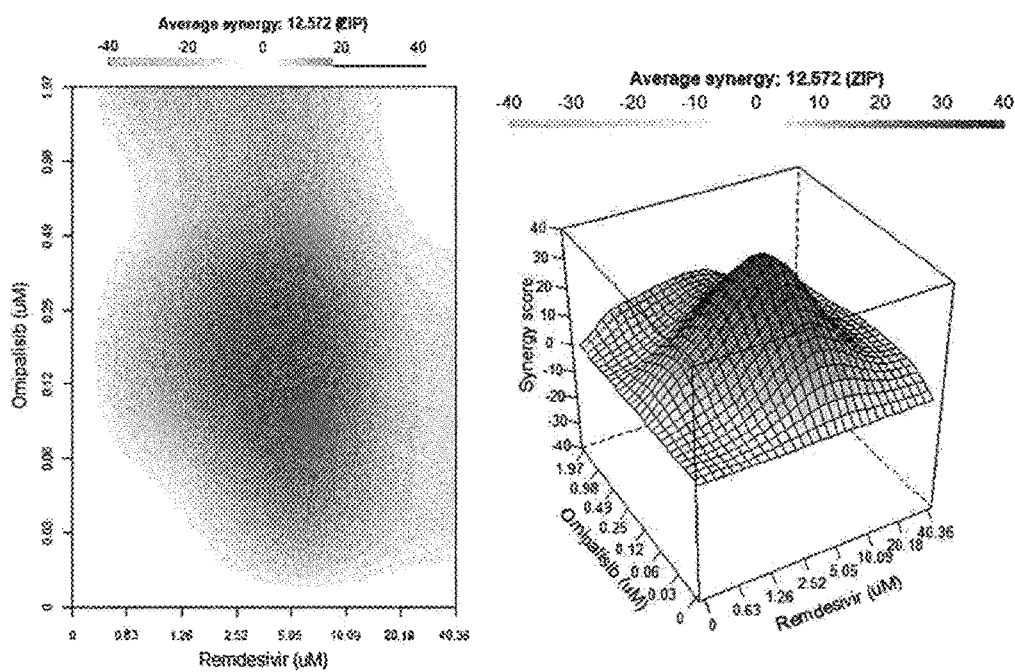
FIG. 57 shows the synergistic antiviral effect of a drug combination (omipalisib and remdesivir), used in the present invention, based on the Zero Interaction Potency (ZIP) model.
Figure 58:
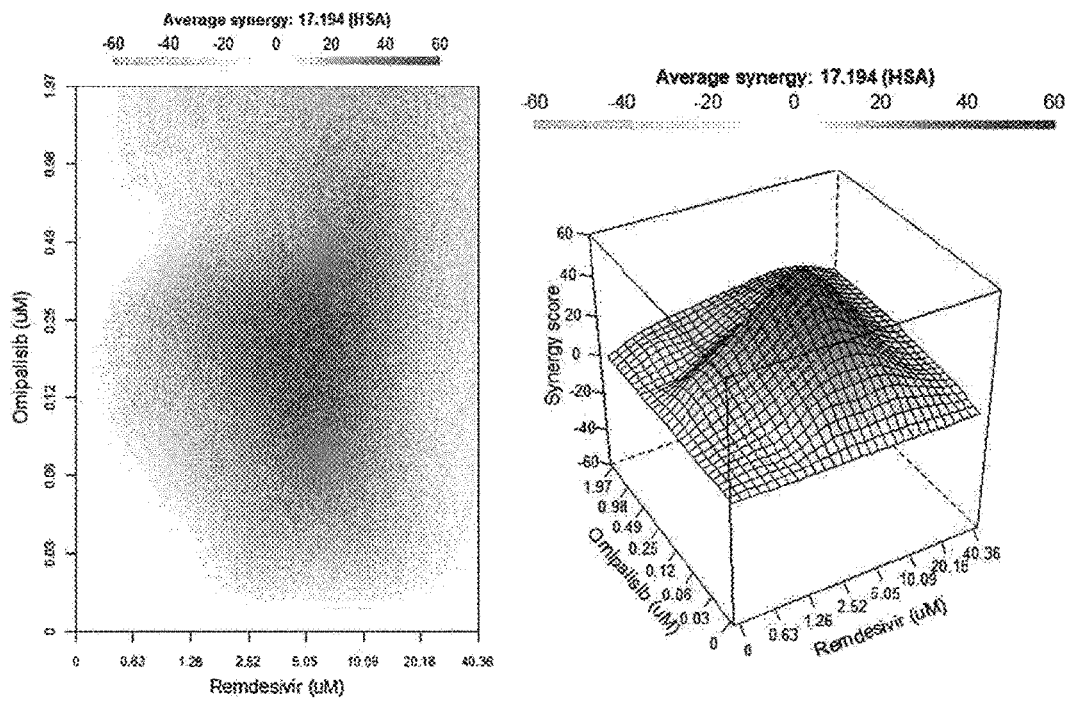
FIG. 58 shows the synergistic antiviral effect of a drug combination (omipalisib and remdesivir), used in the present invention, based on the Highest Single Agent (HSA) model.

The synergistic effect of the combination of omipalisib and remdesivir was found in the section where the omipalisib concentration was 0 to 1.97 µM and the remdesivir concentration was 0 to 40.36 µM based on the drug combination prediction model (FIGS. 55 to 58). In particular, in the section where the omipalisib concentration was around 0.2 µM and the remdesivir concentration was around 5 µM, the antiviral activity improved by 40% to 60% compared to the expected effect of the drug combination prediction model (FIGS. 56 to 58).

Based on the above results and the average synergy score values calculated by the SynergyFinder program, six drug combinations were identified that showed the greatest synergistic effect with an average synergy score of 10 or more in one or more evaluation models or showed a high synergy score in a specific concentration range (Table 12). Typically, a synergy score value of 10 or more means a very strong synergistic effect.

TABLE 12

| Combination No. | Drug combination |
| --- | --- |
| 1 | Remdesivir-tipifarnib |
| 2 | Omipalisib-emodin |
| 3 | Remdesivir-emodin |
| 4 | Remdesivir-omipalisib |
| 5 | Omipalisib-tipifarnib |
| 6 | Omipalisib-blonanserin |

Although the present invention has been described in detail with reference to specific features, it will be apparent to those skilled in the art that this description is only of a preferred embodiment thereof, and does not limit the scope of the present invention. Thus, the substantial scope of the present invention will be defined by the appended claims and equivalents thereto.

INDUSTRIAL APPLICABILITY

The pharmaceutical composition for preventing or treating coronavirus disease 2019 according to the present invention is a composition obtained by finding new uses for drugs, which have already been proven effective, for preventing or treating coronavirus disease 2019 by drug repositioning technology. The pharmaceutical composition is useful because it has significantly lower side effects than new drugs and can be rapidly applied to clinical practice.

What is claimed is:

1. A method of preventing or treating coronavirus disease 2019 (COVID-19) in a subject in need thereof, comprising:
   administering tipifarnib; and
   administering one or more compounds selected from the group consisting of omipalisib, blonanserin, emodin, and remdesivir.

2. The method of claim 1, comprising administering blonanserin, wherein the tipifarnib is administered at a concentration of 2.75 µM to 11 µM, and the blonanserin is administered at a concentration of 1.50 µM to 47.87 µM.

3. The method of claim 1, comprising administering emodin, wherein the tipifarnib is administered at a concentration of more than 0 µM and not more than 11 µM, and the emodin is administered at a concentration of 1.97 µM to 31.45 µM.

4. The method of claim 1, comprising administering omipalisib, wherein the tipifarnib is administered at a concentration of 1.38 µM to 11 µM, and the omipalisib is administered at a concentration of 0.25 µM to 1.97 µM; or the tipifarnib is administered at a concentration of more than 0 µM and not more than 11 µM, and the omipalisib is administered at a concentration of more than 0 µM and not more than 0.25 µM.

5. The method of claim 1, comprising administering remdesivir, wherein the remdesivir is administered at a concentration of more than 0 µM and not more than 20.18 µM, and the tipifarnib is administered at a concentration of more than 0 µM and not more than 11 µM.

* * * * *